US009425481B2

(12) United States Patent
Nishi et al.

(10) Patent No.: US 9,425,481 B2
(45) Date of Patent: Aug. 23, 2016

(54) ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Toshio Nishi, Saitama (JP); Masayuki Ihara, Fukushima (JP); Hideki Nakai, Saitama (JP); Akinori Kita, Fukushima (JP)

(73) Assignee: Sony Corporation, Tokyo (JP)

( * ) Notice: Subject to any disclaimer, the term of this patent is extended or adjusted under 35 U.S.C. 154(b) by 91 days.

(21) Appl. No.: 14/339,124

(22) Filed: Jul. 23, 2014

(65) Prior Publication Data

US 2015/0037620 A1 Feb. 5, 2015

(30) Foreign Application Priority Data

Jul. 30, 2013 (JP) .................................. 2013-157985
Jul. 18, 2014 (JP) .................................. 2014-147696

(51) Int. Cl.
*H01M 10/0525* (2010.01)
*H01M 10/0566* (2010.01)
(Continued)

(52) U.S. Cl.
CPC ...... *H01M 10/0525* (2013.01); *B60L 11/1851* (2013.01); *H01M 4/131* (2013.01);
(Continued)

(58) Field of Classification Search
CPC .................. H01M 10/0525; H01M 10/0566; H01M 10/4235; H01M 10/4257; H01M 2010/4271; H01M 2220/10; H01M 2220/20; H01M 2220/30; H01M 4/131; H01M 4/364; H01M 4/366; H01M 4/505; H01M 4/525; H01M 4/5825; H01M 4/622; H01M 4/625; H01M 4/628; B60L 11/1851
See application file for complete search history.

(56) References Cited

U.S. PATENT DOCUMENTS

| 2003/0091899 A1* | 5/2003 | Matsubara | ............... H01M 4/13 429/213 |
| 2013/0059178 A1* | 3/2013 | Ihara | ................... H01M 10/052 429/61 |
| 2013/0059202 A1* | 3/2013 | Nishimura | ............ H01M 4/366 429/213 |

FOREIGN PATENT DOCUMENTS

| JP | 2000-058122 | 2/2000 |
| JP | 3172388 | 6/2001 |

(Continued)

OTHER PUBLICATIONS

D. Chalasani, J. Li, N. M. Jackson, M. Payne, Brett L. Lucht. Methylene ethylene carbonate: Novel additive to improve the high temperature performance of lithium ion batteries, J. Power Sources, 208, (2012), 67-73.*

*Primary Examiner* — Carlos Barcena
(74) *Attorney, Agent, or Firm* — K&L Gates LLP

(57) ABSTRACT

A secondary battery includes: a cathode; an anode; and a non-aqueous electrolytic solution, wherein the cathode includes a second lithium-containing compound having an olivine-type crystal structure, a photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

14 Claims, 14 Drawing Sheets

(51) Int. Cl.
  *H01M 4/505* (2010.01)
  *H01M 4/525* (2010.01)
  *H01M 4/36* (2006.01)
  *H01M 10/42* (2006.01)
  *B60L 11/18* (2006.01)
  *H01M 4/131* (2010.01)
  *H01M 4/58* (2010.01)
  *H01M 4/62* (2006.01)

(52) U.S. Cl.
  CPC ........... *H01M 4/364* (2013.01); *H01M 4/366* (2013.01); *H01M 4/505* (2013.01); *H01M 4/525* (2013.01); *H01M 4/5825* (2013.01); *H01M 4/628* (2013.01); *H01M 10/0566* (2013.01); *H01M 10/4235* (2013.01); *H01M 10/4257* (2013.01); *H01M 4/622* (2013.01); *H01M 4/625* (2013.01); *H01M 2010/4271* (2013.01); *H01M 2220/10* (2013.01); *H01M 2220/20* (2013.01); *H01M 2220/30* (2013.01); *Y02E 60/122* (2013.01); *Y02T 10/7011* (2013.01)

(56) References Cited

FOREIGN PATENT DOCUMENTS

| | | |
|---|---|---|
| JP | 3691279 | 9/2005 |
| JP | 2010-533359 | 10/2010 |

\* cited by examiner

ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2013-157985 filed in the Japan Patent Office on Jul. 30, 2013, and JP 2014-147696 filed in the Japan Patent Office on Jul. 18, 2014, the entire content of which is hereby incorporated by reference.

BACKGROUND

The present application relates to an electrode including an active material layer, to a secondary battery using the electrode, and to a battery pack, an electric vehicle, an electric power storage system, an electric power tool, and an electronic apparatus that use the secondary battery.

In recent years, various electronic apparatuses such as a mobile phone and a personal digital assistant (PDA) have been widely used, and it has been demanded to further reduce the size and the weight of the electronic apparatuses and to achieve their long lives. Accordingly, as an electric power source for the electronic apparatuses, a battery, in particular, a small and light-weight secondary battery capable of providing high energy density has been developed.

In these days, it has been considered to apply such a secondary battery not only to the foregoing electronic apparatuses but also to other applications. Examples of such other applications may include a battery pack attachably and detachably mounted on the electronic apparatuses or the like, an electric vehicle such as an electric automobile, an electric power storage system such as a home electric power server, and an electric power tool such as an electric drill.

Secondary batteries utilizing various charge and discharge principles to obtain a battery capacity have been proposed. In particular, a secondary battery that obtains a battery capacity by utilizing insertion and extraction of an electrode reactant or precipitation and dissolution of an electrode reactant has attracted attention, since such a secondary battery provides higher energy density than a lead battery, a nickel-cadmium battery, and the like.

The secondary battery includes a cathode, an anode, and an electrolytic solution. The cathode includes a cathode active material layer provided on a cathode current collector, and the cathode active material layer contains a cathode active material engaging in a charge-discharge reaction. The electrolytic solution contains a solvent and an electrolyte salt. Since the configuration of the cathode and the composition of the electrolytic solution largely affect battery characteristics of the secondary battery, various considerations have been made on the configuration of the cathode, the composition of the electrolytic solution, and the like.

Specifically, in order to improve charge-discharge cycle characteristics and the like, a coat formed of a metal oxide such as BeO is provided on the surface of a cathode (for example, see Japanese Patent No. 3172388). In order to improve thermal safety and the like, the surface of a cathode active material is coated with a metal oxide such as an oxide of Mg (for example, see Japanese Patent No. 3691279). In order to improve charge-discharge efficiency and the like, a cyclic ester carbonate such as 4-methylene-1,3-dioxolane-2-one is contained in a nonaqueous solvent (for example, see Japanese Unexamined Patent Application Publication No. 2000-058122 and Japanese Unexamined Patent Application Publication (Translation of PCT application) No. 2010-533359).

SUMMARY

Since high performance and multi-functions of the electronic apparatuses and the like have been increasingly achieved, and frequency in use of the electronic apparatuses and the like has been increased as well, secondary batteries tend to be frequently charged and discharged. Therefore, there is room for improvement of battery characteristics of the secondary battery.

It is desirable to provide an electrode, a secondary battery, a battery pack, an electric vehicle, an electric power storage system, an electric power tool, and an electronic apparatus that are capable of obtaining superior battery characteristics.

According to an embodiment of the present application, a secondary battery is provided including:
 a cathode;
 an anode; and
 a non-aqueous electrolytic solution, wherein
 the cathode includes any one of a first lithium-containing compound and a second lithium-containing compound, the first lithium-containing compound having a bedded salt-type crystal structure,
  the first lithium-containing compound includes one or more metal elements (M) other than lithium (Li),
  a photoelectron spectrum of oxygen 1s associated with the first-lithium containing compound and having a horizontal axis representative of binding energy in electron volt and a vertical axis representative of spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak,
  when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and
  when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1,
 wherein the second lithium-containing compound having an olivine-type crystal structure,
  a photoelectron spectrum of oxygen 1s associated with the second lithium-containing compound and having a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

According to an embodiment of the present application, an electrode is provided including any one of a first lithium-containing compound and a second lithium-containing compound, wherein the first lithium-containing compound having a bedded salt-type crystal structure, the first lithium-containing compound includes one or more metal elements (M) other than lithium (Li), a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volts and a vertical axis representative of a spectrum intensity, the photoelectron spectrum of oxygen 1s obtained by surface analysis with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

According to an embodiment of the present application, a battery pack is provided including:

a secondary battery;

a control section configured to control operation of the secondary battery; and a switch section configured to switch the operation of the secondary battery according to an instruction of the control section, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1 wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

According to an embodiment of the present application, an electric vehicle is provided including:

a secondary battery;

a conversion section configured to convert electric power supplied from the secondary battery into drive power;

a drive section configured to operate according to the drive power; and a control section configured to control operation of the secondary battery, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

According to an embodiment of the present application, an electric power storage system is provided including:

a secondary battery;

one or more electric devices configured to be supplied with electric power from the secondary battery; and a control section configured to control the supplying of the electric power from the secondary battery to the one or more electric devices, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

According to an embodiment of the present application, an electric power tool is provided including:

a secondary battery; and a movable section configured to be supplied with electric power from the secondary battery, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, the second lithium-containing compound having an olivine-type crystal structure, a photoelectron spectrum of oxygen 1s associated with second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

According an embodiment of the present application, an electronic apparatus is provided including a secondary battery as an electric power supply source, wherein the secondary battery includes a cathode, an anode, and a nonaqueous electrolytic solution, and the cathode includes any one of a first lithium-containing compound and a second lithium-containing compound the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen is obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

According to the electrode and the secondary battery according to the embodiments of the present application, the photoelectron spectrum of oxygen 1s obtained by surface analysis with the use of X-ray photoelectron spectroscopy satisfies the foregoing conditions, and therefore, superior battery characteristics are obtainable. Further, according to the battery pack, the electric vehicle, the electric power storage system, the electric power tool, and the electronic apparatus according to the embodiments of the present application, similar effects are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

An embodiment of the present application will be described below in detail with reference to the drawings. The description will be given in the following order.
1. Electrode
2. Secondary Battery Using Electrode
2-1. Lithium Ion Secondary Battery (Square-Type)
2-2. Lithium Ion Secondary Battery (Cylindrical-Type)
2-3. Lithium Ion Secondary Battery (Laminated-Film-Type)
2-4. Lithium Metal Secondary Battery
3. Other Secondary Battery Using Electrode
4. Applications of Secondary Battery
4-1. Battery Pack
4-2. Electric Vehicle
4-3. Electric Power Storage System
4-4. Electric Power Tool

[1. Electrode]

First, description will be given of an electrode (hereinafter simply referred to as "electrode") according to an embodiment of the present application. The electrode described here may be used as a cathode, or may be used as an anode.

[Configuration of Electrode]

Figure 1:
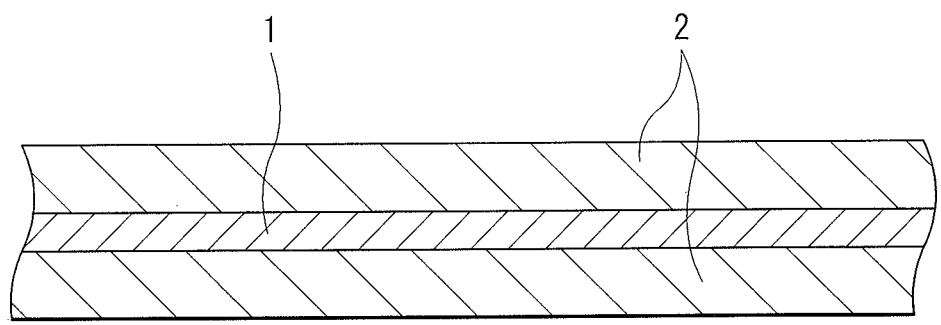
FIG. 1 is a cross-sectional view illustrating a configuration of an electrode according to an embodiment of the present application.

FIG. 1 illustrates a cross-sectional configuration of an electrode. The electrode includes a current collector 1 and an active material layer 2. Description will be given here of a case in which the electrode is used, for example, as a cathode.

[Current Collector]

The current collector 1 may contain, for example, one or more of electrically-conductive materials. Types of the electrically-conductive materials are not particularly limited, and may be, for example, a metal material such as aluminum (Al), nickel (Ni), and stainless steel. It is to be noted that the current collector 1 may have a single layer structure or a multilayer structure.

[Active Material Layer]

The active material layer 2 is provided on the current collector 1. However, the active material layer 2 may be provided only on a single surface of the current collector 1, or may be provided on both surfaces of the current collector 1.

The active material layer 2 contains any one or more of electrode materials as active materials capable of inserting and extracting an electrode reactant. The term "electrode reactant" refers to a material engaging in an electrode reaction. For example, in the case where a battery capacity is obtained by utilizing insertion and extraction of lithium (Li), the electrode reactant is lithium. However, the active material layer 2 may further contain any one or more of other materials such as a binder and an electric conductor.

The electrode material may be preferably a lithium-containing compound, and more specifically, may be preferably one or both of a lithium-containing composite oxide and a lithium-containing phosphate compound, since thereby, high energy density is obtained.

The term "lithium-containing composite oxide" refers to an oxide (a first lithium-containing compound) that contains lithium and one or more metal elements (M: one or more elements other than lithium (Li)) as constituent elements, and has a bedded salt-type crystal structure. In the following description, the lithium-containing composite oxide having a bedded salt-type crystal structure is referred to as "bedded salt-type lithium-containing composite oxide."

The term "lithium-containing phosphate compound" refers to a phosphate compound (a second lithium-containing compound) that contains lithium and one or more metal elements (one or more metal elements other than lithium) as constituent elements, and has an olivine-type crystal structure. In the following description, the lithium-containing phosphate compound having an olivine-type crystal structure is referred to as "olivine-type lithium-containing phosphate compound."

Types of metal elements M contained in each of the bedded salt-type lithium composite oxide and the olivine-type lithium-containing phosphate compound are not particularly limited, as long as the types of the metal elements M are any one or more of metal elements.

The composition of the bedded salt-type lithium-containing composite oxide is not particularly limited, as long as the bedded salt-type lithium-containing composite oxide contains the foregoing specific types of constituent elements (lithium, the metal element M, and oxygen), and the bedded salt-type crystal structure is secured. Specifically, the bedded salt-type lithium-containing composite oxide may preferably contain any one or more of compounds represented by the following Formula (4), since thereby, higher energy density is obtained. In particular, M1 may preferably contain cobalt, since thereby, higher effects are obtained.

 (4)

In Formula (4), M1 is one or more of elements (other than nickel (Ni) and manganese (Mn)) belonging to Group 2 to Group 15 in long-period periodic table; X is one or more of elements (other than oxygen (O)) belonging to Group 16 and Group 17 in the long-period periodic table; and a to e satisfy $0 \leq a \leq 1.5$, $0 \leq b \leq 1$, $0 \leq c \leq 1$, $-0.1 \leq d \leq 0.2$, and $0 \leq e \leq 0.2$.

In particular, the bedded salt-type lithium-containing composite oxide may preferably contain any one or more of compounds represented by the following Formula (41) to the following Formula (43), since thereby, higher effects are obtained.

$$Li_aMn_{(1-b-c)}Ni_bM41_cO_{(2-d)}F_e \qquad (41)$$

In Formula (41), M41 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W); and a to e satisfy $0.8 \leq a \leq 1.2$, $0 < b < 0.5$, $0 \leq c \leq 0.5$, $(b+c)<1$, $-0.1 \leq d \leq 0.2$, and $0 \leq e \leq 0.1$, where the composition of lithium varies according to the charge-discharge state, and a is a value in a fully-discharged state.

$$Li_aNi_{(1-b)}M42_bO_{(2-c)}F_d \qquad (42)$$

In Formula (42), M42 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and a to d satisfy $0.8 \leq a \leq 1.2$, $0.005 \leq b \leq 0.5$, $-0.1 \leq c \leq 0.2$, and $0 \leq d \leq 0.1$, where the composition of lithium varies according to the charge-discharge state, and a is a value in a fully-discharged state.

$$Li_aCo_{(1-b)}M43_bO_{(2-c)}F_d \qquad (43)$$

In Formula (43), M43 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and a to d satisfy $0.8 \leq a \leq 1.2$, $0 \leq b < 0.5$, $-0.1 \leq c \leq 0.2$, and $0 \leq d \leq 0.1$, where the composition of lithium varies according to the charge-discharge state, and a is a value in a fully-discharged state.

Specific examples of the bedded salt-type lithium-containing composite oxide may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. However, the bedded salt-type lithium-containing composite oxide may be other compound having any of the compositions represented by Formula (4) and Formula (41) to Formula (43).

The composition of the olivine-type lithium-containing phosphate compound is not particularly limited, as long as the olivine-type lithium-containing phosphate compound contains the foregoing specific types constituent elements (lithium, the metal element, phosphorus, and oxygen), and the olivine-type crystal structure is secured. In particular, the olivine-type lithium-containing phosphate compound may preferably contain any one or more of compounds represented by the following Formula (5), since thereby, higher energy density is obtained.

$$Li_aM2_bPO_4 \qquad (5)$$

In Formula (5), M2 is one or more of elements belonging to Group 2 to Group 15 in the long-period periodic table; and a and b satisfy $0 \leq a \leq 2$ and $0.5 \leq b \leq 2$.

In particular, the olivine-type lithium-containing phosphate compound may preferably contain any one or more of compounds represented by the following Formula (51), since thereby, higher effects are obtained.

$$Li_aM21PO_4 \qquad (51)$$

In Formula (51), M21 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr); and a satisfies $0.9 \leq a \leq 1.1$, where the composition of lithium varies according to the charge-discharge state, and a is a value in a fully-discharged state.

Specific examples of the olivine-type lithium-containing phosphate compound may include $LiFePO_4$, $LiMnPO_4$, $LiFe_{0.5}Mn_{0.5}PO_4$, and $LiFe_{0.3}Mn_{0.7}PO_4$. However, the olivine-type lithium-containing phosphate compound may be other compound having any of the compositions represented by Formula (5) and Formula (51).

It is to be noted that the active material layer 2 may further contain any one or more of other electrode materials, as long as the active material layer 2 contains the foregoing electrode material as an active material. Such other electrode material may be preferably, for example, a lithium-containing compound (other than compounds corresponding to the foregoing bedded salt-type lithium-containing composite oxide and the foregoing olivine-type lithium-containing phosphate compound), since thereby, high energy density is obtained.

Specifically, such other electrode material may be, for example, a compound represented by the following Formula (8). Such a compound is a lithium-containing composite oxide (a spinel-type lithium-containing composite oxide) having a spinel-type crystal structure. Specific examples of the spinel-type lithium-containing composite oxide may include $LiMn_2O_4$. However, the spinel-type lithium-containing composite oxide may be other compound having a composition represented by Formula (8).

$$Li_aMn_{(2-b)}M5_bO_cF_d \qquad (8)$$

In Formula (8), M5 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W); and a to d satisfy $0.9 \leq a \leq 1.1$, $0 \leq b \leq 0.6$, $3.7 \leq c \leq 4.1$, and $0 \leq d \leq 0.1$, where the composition of lithium varies according to the charge-discharge state, and a is a value in a fully-discharged state.

In addition thereto, such other electrode material may be, for example, any one or more of an oxide, a disulfide, a chalcogenide, an electrically-conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the electrically-conductive polymer may include sulfur, polyaniline, and polythiophene. It goes without saying that such other electrode material may be a material other than the foregoing materials.

The binder may include, for example, one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

Examples of the electric conductor may include any one or more of carbon materials and the like. Examples of the carbon materials may include graphite, carbon black, acetylene black, and Ketjen black. It is to be noted that the cathode electric conductor may be other material such as a metal material and an electrically-conductive polymer as long as the material has electric conductivity.

[Physicality of Electrode]

In order to obtain superior battery characteristics, the active material layer 2 may be preferably stable chemically.

More specifically, the active material layer 2 contains a highly-reactive active material. Therefore, in the case where the active material is activated at the time of electrode reaction, the active material easily reacts with an electrolytic solution. When the active material reacts with the electrolytic solution, a decomposition reaction of the electrolytic solution is promoted, and therefore, battery characteristics of the secondary battery are easily lowered. However, in the case where the active material layer 2 is stable chemically, the active material is less likely to react with the electrolytic solution, and therefore, a decomposition reaction of the electrolytic solution is suppressed. In this case, even if the active material layer 2 is stable chemically, insertion and extraction of the electrode reactant are less likely to be inhibited at the time of an electrode reaction, as long as the electrode reactant is smoothly inserted and extracted in the active material layer 2. Therefore, the battery characteristics of the secondary battery are improved.

It is to be noted that the foregoing chemical stabilization of the active material layer 2 may be achieved, for example, by a coat (not illustrated in FIG. 1) formed on the surface of the active material layer 2. As described later, the coat may be previously formed on the surface of the active material layer 2 upon assembling the secondary battery, or may be formed on the surface of the active material layer 2 with the use of a charge-discharge reaction after assembling the secondary battery.

In order to secure the foregoing chemical stable state of the active material layer 2, physicality of the electrode satisfies two types of conditions according to the type of electrode material with regard to an analytical result by X-ray photoelectron spectroscopy (XPS). The term "analytical result" refers to a photoelectron spectrum of oxygen 1s, and is hereinafter simply referred to as "photoelectron spectrum (O1s)." In the photoelectron spectrum, the horizontal axis indicates binding energy (eV), and the vertical axis indicates spectrum intensity.

In the first condition, the electrode (the active material layer 2) contains an electrode material (a bedded salt-type lithium-containing composite oxide) having a bedded salt-type crystal structure as an active material.

In this case, in the case where a photoelectron spectrum (O1s) is obtained by surface analysis of the electrode with the use of XPS, the photoelectron spectrum (O1s) shows two peaks P1 and P2 (a first and a second peaks). The peak P1 has an apex in the range in which binding energy E satisfies 531 eV≤E≤535 eV. The peak P2 has an apex in the range in which the binding energy E satisfies 529 eV≤E≤531 eV. However, spectrum intensity of the peak P2 is smaller than spectrum intensity of the peak P1.

In the first condition, the condition to fulfill with regard to the foregoing photoelectron spectrum (O1s) includes two cases according to the composition of the bedded salt-type lithium-containing composite oxide. Specifically, in the case where an atomic ratio (Co/M) of cobalt in the metal element M is equal to or larger than 0.5, where spectrum intensity of the peak P2 is IA and spectrum intensity in the case of the binding energy=535 eV is IB, a ratio IB/IA between the intensities IA and IB is larger than 1 (IB/IA>1). In contrast, in the case where the atomic ratio (Co/M) of cobalt in the metal element M is less than 0.5, where the spectrum intensity of the peak P2 is IA and spectrum intensity in the case of the binding energy=536 eV is IC, a ratio IC/IA between the intensities IA and IC is larger than 1 (IC/IA>1). However, cases where the atomic weight (Co/M) is less than 0.5 include a case where the atomic weight of cobalt is 0. That is, the bedded salt-type lithium-containing composite oxide does not necessarily contain cobalt as a constituent element.

In the second condition, the electrode (the active material layer 2) contains an electrode material (an olivine-type lithium-containing phosphate compound) having an olivine-type crystal structure as an active material.

In this case, in the case where a photoelectron spectrum (O1s) is obtained by surface analysis of a coat 3 with the use of XPS, the photoelectron spectrum (O1s) shows two peaks P3 and P4 (a third and a fourth peaks). The peak P3 has an apex in the range in which the binding energy E satisfies 530 eV≤E<533 eV. The peak P4 has an apex in the range in which the binding energy E satisfies 533 eV≤E≤536 eV. However, spectrum intensity of the peak P4 is smaller than spectrum intensity of the peak P3.

In the case where the spectrum intensity of the peak P3 is ID and the spectrum intensity of the peak P4 is IE, a ratio IE/ID between the spectrum intensities ID and IE is larger than ¼ (IE/ID>¼). In particular, the ratio IE/ID may be preferably larger than ½.

The reason why the first condition is satisfied with regard to the photoelectron spectrum (O1s) is as follows.

Out of the photoelectron spectrum (O1s), attention is focused on the range in which the binding energy E satisfies 529 eV≤E<531 eV. One reason for this is that, the specific peak P2 attributable to the crystal structure (bedded salt-type) of the bedded salt-type lithium-containing composite oxide is detected in such a range. Therefore, the spectrum intensity of the peak P2, that is, the spectrum intensity IA in the apex position of the peak P2 becomes a reference in the case where change (change of a spectrum shape) of the photoelectron spectrum (O1s) attributable to presence or absence of the coat is examined.

Further, attention is focused on the position where the binding energy E is 535 eV. One reason for this is that, in this position, the foregoing change (local increase of the spectrum intensity) of the spectrum shape attributable to existence of the coat occurs.

In the case where the coat is not provided on the active material layer 2, the spectrum intensity IB in the binding energy of 535 eV is sufficiently small with respect to the spectrum intensity IA of the peak P2 as the reference. Therefore, the ratio IB/IA becomes equal to or less than 1 (IB/IA≤1). In contrast, in the case where the coat is provided on the active material layer 2, the spectrum intensity IB in the binding energy of 535 eV is sufficiently large with respect to the spectrum intensity IA of the peak P2 as the reference. Therefore, the ratio IB/IA becomes larger than 1 (IB/IA>1). Therefore, a value of the ratio IB/IA becomes an index for determining whether or not the coat exists on the surface of the active material layer 2 in the case where the bedded salt-type lithium-containing composite oxide is used.

The foregoing reason why the foregoing first condition is satisfied is applied not only to the case where attention is focused on the position where the binding energy E is 535 eV, but also to a case where attention is focused on the position where the binding energy E is 536 eV.

Further, the reason why the second condition is satisfied with regard to the photoelectron spectrum (O1s) is as follows.

Out of the photoelectron spectrum (O1s), attention is focused on the range in which the binding energy E satisfies 530 eV≤E<533 eV. One reason for this is that, the specific peak P3 attributable to the crystal structure (olivine-type) of the olivine-type lithium-containing phosphate compound is detected. Therefore, the spectrum intensity of the peak P3, that is, the spectrum intensity ID in the apex position of the peak P3 becomes a reference in the case where change (change of a shape) of the photoelectron spectrum (O1s) attributable to presence or absence of the coat is examined.

Further, attention is focused on the range where the binding energy E satisfies 533 eV≤E≤536 eV. One reason for this is that, in this range, the foregoing change (local increase of the spectrum intensity) of the spectrum shape attributable to existence of the coat occurs.

In the case where the coat is not provided on the active material layer 2, the spectrum intensity IE of the peak P4 is sufficiently small with respect to the spectrum intensity ID of the peak P3 as the reference. Therefore, the ratio IE/ID becomes equal to or less than ¼ (IE/ID≤¼). In contrast, in the case where the coat is provided on the active material layer 2, the spectrum intensity IE of the peak P4 is sufficiently large with respect to the spectrum intensity ID of the peak P3 as the reference. Therefore, the ratio IE/ID becomes larger than ¼ (IE/ID>¼). Therefore, a value of the ratio IE/ID becomes an index for determining whether or not the coat exists on the surface of the active material layer 2 in the case where the olivine-type lithium-containing phosphate compound is used.

For examining the composition of the electrode material used as an active material, for example, the electrode material may be analyzed with the use of any one or more of X-ray diffraction (XRD), inductively-coupled plasma (ICP) emission spectrochemical analysis, energy-dispersive X-ray analysis (EDX), and the like. The composition of the electrode material may include, for example, types of constituent elements, the content ratio of the constituent elements, the atomic ratio (Co/M), and the like. Further, for examining the type of the crystal structure of the electrode material, for example, the electrode material may be analyzed with the use of any one or more of XRD, Raman spectrum method, and the like.

Conditions of surface analysis of the coat with the use of XPS may be, for example, as follows. As an analysis equipment, an X-ray photoelectron spectrometry equipment Quantera SXM available from ULVAC-PHI, Incorporated is used. At the time of analysis, a sample for analytical use is irradiated (beam size: about 100 μmφ) with monochrome Al—Kα ray (1486.6 eV), and a photoelectron spectrum is measured under condition that pass energy is 69 eV. In this case, for performing energy calibration of the photoelectron spectrum, the position of a main peak existing on the lowest binding energy side of the carbon 1s (C1s) is set to 284.8 eV.

Formation materials of the coat are not particularly limited, as long as the ratio IB/IA, the ratio IC/IA, and the ratio IE/ID are allowed to satisfy the foregoing first condition and the foregoing second condition with the use of the formation materials.

[Method of Manufacturing Electrode]

For a method of manufacturing the electrode, description will be given together with after-described method of manufacturing a secondary battery.

[Function and Effect of Electrode]

According to the electrode, the photoelectron spectrum (O1s) obtained by surface analysis with the use of XPS satisfies the foregoing first condition and the foregoing second condition. In this case, as described above, the active material layer 2 is stable chemically. Therefore, at the time of an electrode reaction, a decomposition reaction of the electrolytic solution is suppressed without large inhibition of insertion and extraction of the electrode reactant by the active material. Therefore, battery characteristics of the secondary battery are allowed to be improved.

In particular, in the case where the bedded salt-type lithium-containing composite oxide contains any one or more of compounds represented by Formula (4), higher effects are obtainable. Further, in the case where the olivine-type lithium-containing phosphate compound contains any one or more of compounds represented by Formula (5), higher effects are obtainable.

[2. Secondary Battery Using Electrode]

Next, description will be given of application examples of the foregoing electrode. The electrode may be used, for example, for the following secondary batteries.

[2-1. Lithium Ion Secondary Battery (Square-Type)]

Figure 2:
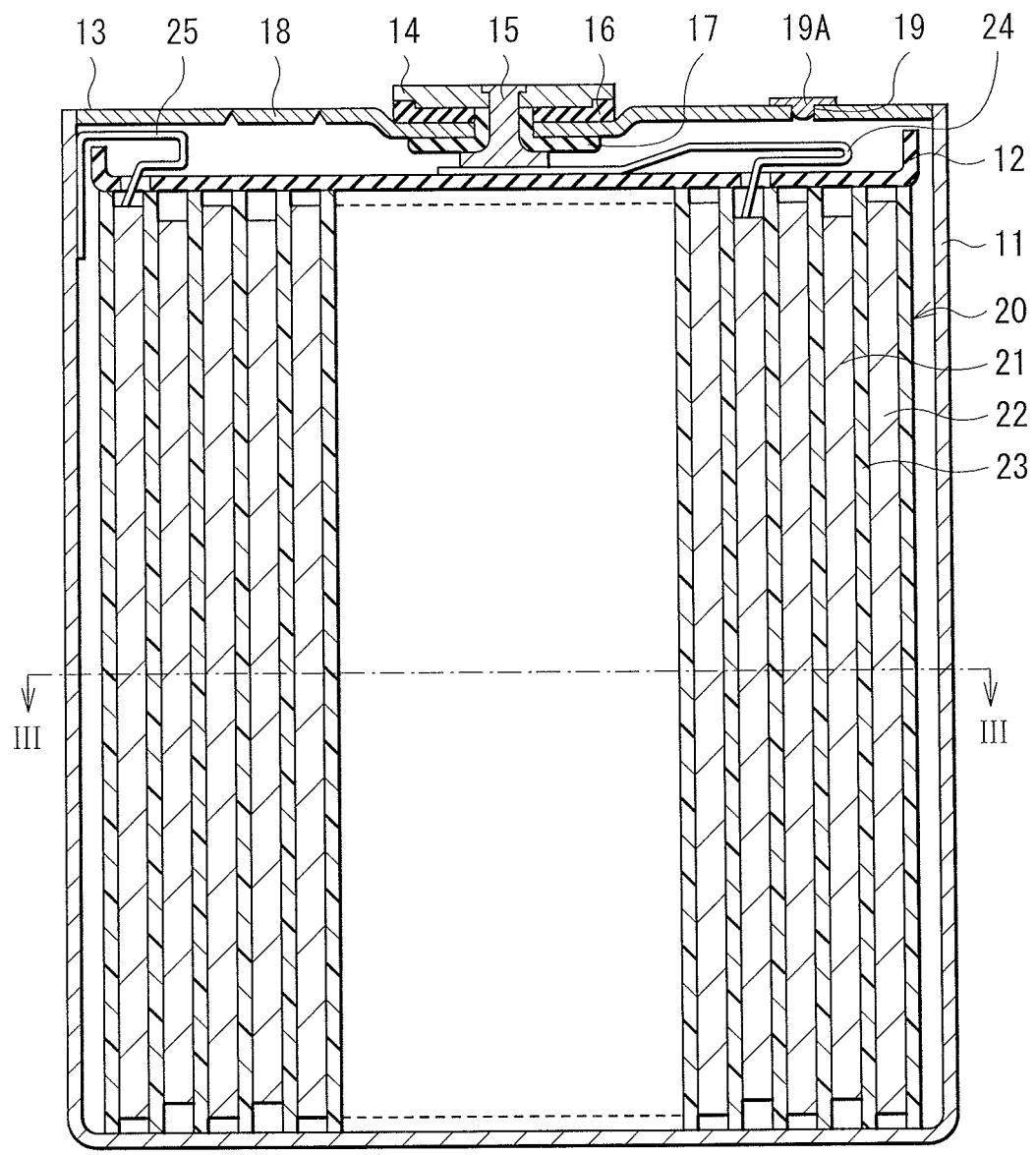
FIG. 2 is a cross-sectional view illustrating a configuration of a secondary battery (square-type) using the electrode according to the embodiment of the present application.
Figure 3:
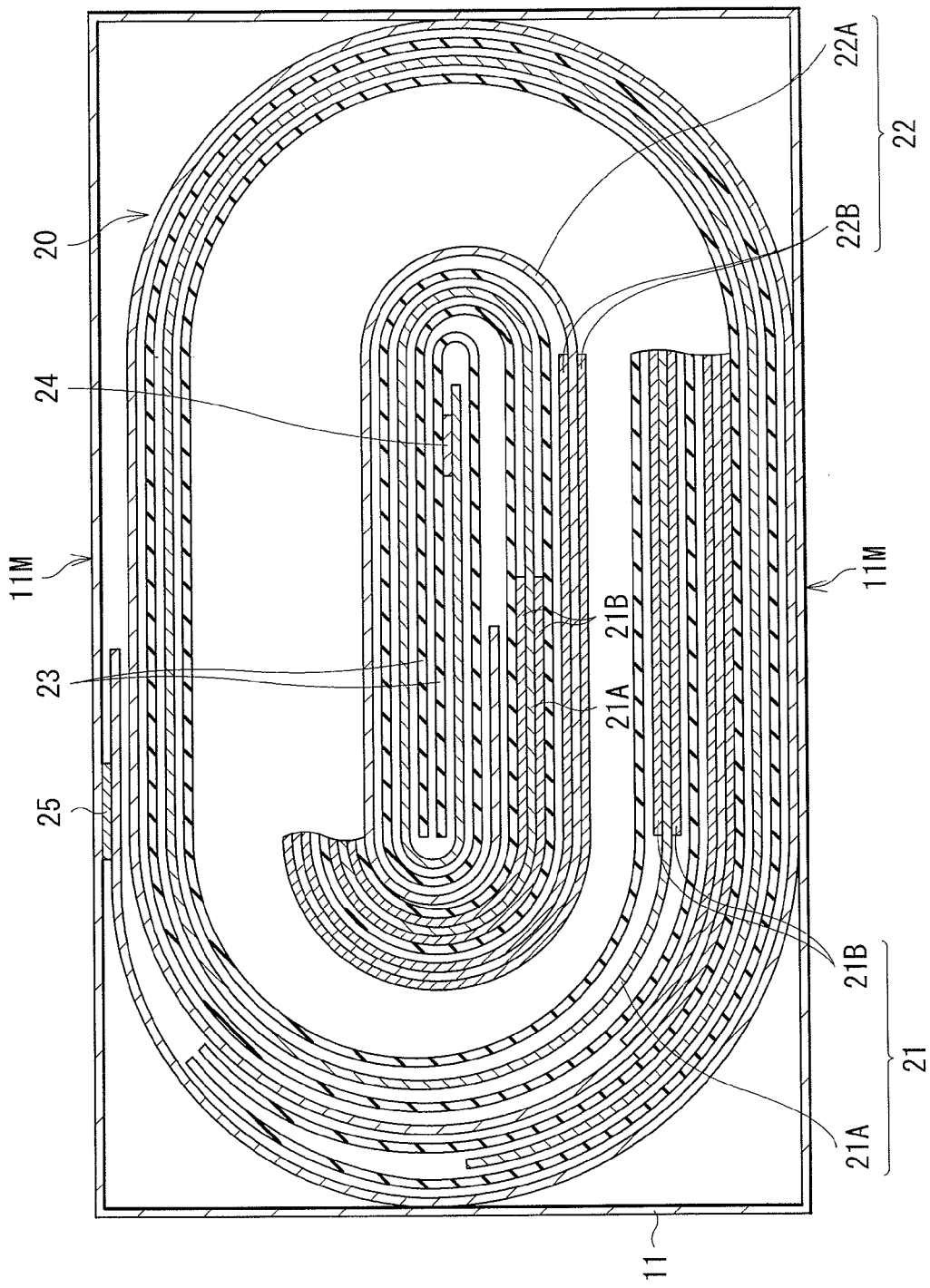
FIG. 3 is a cross-sectional view taken along a line III-III of the secondary battery illustrated in FIG. 2.
Figure 4:
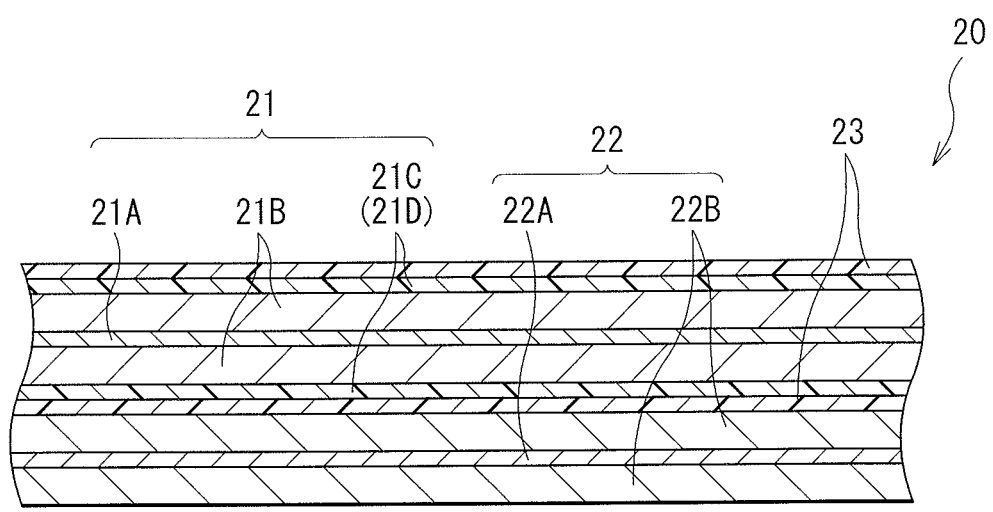
FIG. 4 is a cross-sectional view illustrating an enlarged part of a battery element illustrated in FIG. 3.

FIG. 2 and FIG. 3 illustrate cross-sectional configurations of a secondary battery. FIG. 3 illustrates a cross section taken along a line III-III of the secondary battery illustrated in FIG. 2. FIG. 4 illustrates enlarged part of a battery element 20 illustrated in FIG. 3.

[Whole Configuration of Secondary Battery]

The secondary battery described here is a lithium secondary battery (a lithium ion secondary battery) in which the battery capacity of an anode 22 is obtained by insertion and extraction of lithium (lithium ions) as an electrode reactant, and has a so-called square-type battery structure. In this example, the foregoing electrode is applied to, for example, a cathode 21.

The secondary battery may mainly contain, for example, as illustrated in FIG. 2 and FIG. 3, the battery element 20 inside a battery can 11. The battery element 20 may be formed by, for example, laminating the cathode 21 and the anode 22 with a separator 23 in between, and subsequently spirally winding the resultant laminated body. The battery element 20 has a flat shape correspondingly to the shape of the battery can 11. The separator 23 is impregnated with a nonaqueous electrolytic solution (hereinafter simply referred to as "electrolytic solution") as a liquid electrolyte.

The battery can 11 may be, for example, a square package member. As illustrated in FIG. 3, the square package member has a shape in which a cross section in a longitudinal direction is rectangular or substantially rectangular (including a curved line partly), and is applied not only to a square-type battery in the shape of a rectangle but also to a square-type battery in the shape of an oval. That is, the square package member is a serving-dish-like member in the shape of a rectangle with a base or in the shape of an oval with a base, which has a rectangular opening or an opening having a substantially rectangular shape (an oval shape) obtained by connecting arcs by straight lines. It is to be noted that FIG. 3 illustrates a case in which the battery can 11 has a rectangular cross-sectional shape.

The battery can 11 may be made, for example, of any one or more of electrically-conductive materials such as iron, aluminum, and alloys thereof, and may also have a function as an electrode terminal. In particular, in order to utilize rigidity (difficulty in deformation) to suppress swollenness of the battery can 11 at the time of charge and discharge, iron that is more rigid than aluminum may be preferable. It is to be noted that, in the case where the battery can 11 is made of iron, the surface of the battery can 11 may be plated with a metal material such as nickel.

Further, the battery can 11 may have, for example, a hollow structure in which one end of the battery can 11 is opened and the other end of the battery can 11 is closed. The battery can 11 is hermetically sealed by an insulating plate 12 and a battery cover 13 that are attached to the open end. The insulating plate 12 is provided between the battery element 20 and the battery cover 13, and may be made, for example, of an insulating material such as polypropylene. The battery cover 13 may be made, for example, of a material similar to that of the battery can 11, and may serve as an electrode terminal as the battery can 11.

Outside the battery cover 13, a terminal plate 14 as a cathode terminal is provided. The terminal plate 14 is electrically insulated from the battery cover 13 with an insulating case 16 in between. The insulating case 16 may be made, for example, of an insulating material such as polyethylene terephthalate. In the substantial center of the battery cover 13, a through-hole is provided. A cathode pin 15 is inserted into the through-hole so that the cathode pin 15 is electrically connected to the terminal plate 14 and is electrically insulated from the battery cover 13 with a gasket 17 in between. The gasket 17 may be made, for example, of an insulating material. The surface of the gasket 17 may be coated, for example, with asphalt.

In the periphery of the battery cover 13, a cleavage valve 18 and an injection hole 19 are provided. The cleavage valve 18 is electrically connected to the battery cover 13. In the case where the internal pressure of the battery becomes a certain level or more by internal short circuit, external heating, or the like, the cleavage valve 18 is separated from the battery cover 13 to release the internal pressure. The injection hole 19 may be sealed, for example, by a sealing member 19A such as a stainless steel corundum.

A cathode lead 24 made of an electrically-conductive material such as aluminum may be attached to an end (such as the internal end) of the cathode 21. An anode lead 25 made of an electrically-conductive material such as nickel may be attached to an end (such as the outer end) of the anode 22. The cathode lead 24 is welded to one end of the cathode pin 15, and is electrically connected to the terminal plate 14. The anode lead 25 is welded to the battery can 11, and is electrically connected to the battery can 11.

[Cathode]

The cathode 21 may have, for example, as illustrated in Table 4, a cathode active material layer 21B and a coat 21C on both surfaces of a cathode current collector 21A. Configurations of the cathode current collector 21A and the cathode active material layer 21B are similar to the configurations of the current collector 1 and the active material layer 2.

The coat 21C is provided on the cathode active material layer 21B. However, it is enough that the coat 21C covers only part or all of the cathode active material layer 21B. That is, the coat 21C may cover all of the surface of the cathode active material layer 21B, or may cover only part of the surface of the cathode active material layer 21B. In the case where the coat 21C covers part of the cathode active material layer 21B, a plurality of coats 21C may exist on the surface of the cathode active material layer 21B.

The coat 21C has a function to chemically protect the cathode active material layer 21B for chemically stabilizing the cathode active material layer 21B. More specifically, the cathode active material layer 21B contains a highly-reactive active material. Therefore, in the case where the active material is activated at the time of electrode reaction, the active material easily reacts with the electrolytic solution. When the active material reacts with the electrolytic solution, a decomposition reaction of the electrolytic solution is promoted, and therefore, battery characteristics of the secondary battery are easily lowered. However, in the case where the cathode active material layer 21B is covered with the coat 21C, the cathode active material layer 21B is chemically protected by the coat 21C, and therefore, a decomposition reaction of the electrolytic solution is suppressed. Furthermore, the coat 21C has characteristics to smoothly transmit the electrode reactant. Therefore, even if the cathode active material layer 21B is covered with the coat 21C, insertion and extraction of the electrode reactant is less likely to be inhibited at the time of charge and discharge. Therefore, battery characteristics of the secondary battery are improved.

In order to secure the protection function of the coat 21C, physicality of the cathode 21 satisfies the foregoing first condition and the foregoing second condition. Since details of the first condition and the second condition have been described above, the description thereof will be omitted here.

As described above, formation materials of the coat 21C are not particularly limited, as long as the formation materials are allowed to satisfy the first and the second conditions.

In particular, the coat 21C may preferably contain a polymer compound, and the polymer compound may preferably contain one or more oxygen atoms (O) as a constituent element in a repeating unit. One reason for this is that, in this case, physical strength and chemical strength of the coat 21C are improved, and the foregoing change (local increase of the spectrum intensity) of the spectrum shape attributable to existence of the coat 21C easily occurs.

In particular, the polymer compound may preferably contain a carbonic acid bond (—O—C(=O)—O—) in a repeating unit, since thereby, the protective function of the coat 21C is further improved.

More specifically, the polymer compound containing a carbonic acid bond in a repeating unit may contain, for example, any one or more of compounds represented by the following Formula (1) and the following Formula (2). It is to be noted that types of terminal groups of the compounds shown in Formula (1) and Formula (2) are not particularly limited. Each of the terminal groups may be, for example, a hydrogen group, a hydrocarbon group such as an alkyl group, or a group other than the foregoing groups.

(1)

In Formula (1), X is a divalent group in which one number of =C—CH$_2$—, m-number of >C=CR1R2, and n-number of >CR3R4 are bonded in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more thereof; any two or more of R1 to R4 may be bound to one another; and k1, m, and n satisfy k1≥1, m≥0 and n≥0.

(2)

In Formula (2), R5 is one of a divalent hydrocarbon group, a divalent oxygen-containing hydrocarbon group, a divalent halogenated hydrocarbon group, a divalent halogenated oxygen-containing hydrocarbon group, and a group obtained by binding two or more thereof; and k2 satisfies k2≥1.

The compound shown in Formula (1) is a compound (hereinafter referred to as "cyclic carbonic acid compound") in which a repeating unit has a cyclic structure. In contrast, the carbonic acid compound shown in Formula (2) is a compound (hereinafter referred to as "chain carbonic acid compound") in which a repeating unit has a chain structure. It is to be noted that the cyclic carbonic acid compound and the chain carbonic acid compound are also simply referred to as "carbonic acid compound" collectively.

X in Formula (1) is a group obtained by binding one number of $\equiv$C—CH$_2$—, m-number of >C=CR1R2, and n-number of >CR3R4 so that the valency becomes divalent as a whole. In other words, X in Formula (1) is a group obtained by binding one number of $\equiv$C—CH$_2$—, m-number of >C=CR1R2, and n-number of >CR3R4 so that each thereof has each free binding hand (a hand capable of being bound to other group) on both ends thereof. "$\equiv$" represents three free binding hands, ">" represents two free binding hands, and "—" represents one free binding hand respectively. Adjacent groups (groups bound to each other) may be the same type of group such as >C=CR1R2 and >C=CR1R2, or may be different from each other such as a combination of $\equiv$C—CH$_2$— and >C=CR1R2. The number (m) of >C=CR1R2 used for forming a divalent group and the number (n) of >CR3R4 used for forming the divalent group may be any number, and the binding order of $\equiv$C—CH$_2$—, >C=CR1-R2, and >CR3R4 may be any order.

$\equiv$C—CH$_2$— is obtained by cutting one carbon-carbon bond out of >CH=CH$_2$ having two carbon-carbon bonds. A plurality of repeating units are polymerized by biding adjacent $\equiv$C—CH$_2$—. >C=CR1R2 is a divalent unsaturated group having a carbon-carbon double bond, and >CR3R4 is a divalent saturated group not having a carbon-carbon double bond.

Values of m and n are not particularly limited as long as each of m and n is an integer number equal to or larger than 0. In this case, since m is equal to or larger than 0 and n is equal to or larger than 0, each of >C=CR1R2 as an unsaturated group and >CR3R4 as a saturated group may be included in X, or may not be included in X. That is, X may be configured of only $\equiv$C—CH$_2$—, may be configured of $\equiv$C—CH$_2$— and >C=CR1R2, may be configured of $\equiv$C—CH$_2$— and >C=CR3R4, or may be configured of $\equiv$C—CH$_2$—, >C=CR1R2, and >C=CR3R4. One reason for this is that, while $\equiv$C—CH$_2$— necessary for polymerization should be certainly included in X, >C=CR1R2 and >C=CR3R4 not necessary for polymerization are not necessarily included in X.

A value of k1 representing the number of repeating units is not particularly limited as long as k1 is an integer number equal to or larger than 1. However, in order to secure physical strength, chemical strength, and the like of the coat 21C, the value of k1 may be preferably large as much as possible.

It is to be noted that any two or more of R1 to R4 in >C=CR1R2 and >CR3R4 may be bound to one another, and the bound groups may form a ring. As an example, R1 may be bound to R2, R3 may be bound to R4, and R2 may be bound to R3 or R4.

Details of R1 to R4 are described below. R1 to R4 may be the same type of group, or may be groups different from one another. Any two or three of R1 to R4 may be the same type of group.

Each type of R1 to R4 is not particularly limited as long as each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more thereof. One reason for this is that, in this case, the protective function of the coat 21C is obtained without depending on the types of R1 to R4.

The halogen group may be, for example, any one or more of a fluorine group (—F), a chlorine group (—Cl), a bromine group (—Br), an iodine group (—I), and the like. In particular, the fluorine group may be preferable, since a higher effect is thereby obtainable.

"Monovalent hydrocarbon group" is a generic term used to refer to monovalent groups configured of carbon (C) and hydrogen (H), and may have a straight-chain structure or a branched structure having one or more side chains. Examples of the monovalent hydrocarbon group may include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive.

More specific examples of the alkyl group may include a methyl group (—CH$_3$), an ethyl group (—C$_2$H$_5$), and a propyl group (—C$_3$H$_7$). Examples of the alkenyl group may include a vinyl group (—CH=CH$_2$) and an allyl group (—CH$_2$—CH=CH$_2$). Examples of the alkynyl group may include an ethynyl group (—C$\equiv$CH). Examples of the aryl group may include a phenyl group and a naphtyl group. Examples of the cycloalkyl group may include a cyclopropyl group, a cyclobutyl group, a cyclopentyl group, a cyclohexyl group, a cycloheptyl group, and a cyclooctyl group.

"Monovalent oxygen-containing hydrocarbon group" is a generic term used to refer to monovalent groups configured of oxygen (O) together with carbon and hydrogen. Examples of the monovalent oxygen-containing hydrocarbon group may include an alkoxy group with carbon number from 1 to 12 both inclusive. More specific examples of the alkoxy group may include a methoxy group (—OCH$_3$) and an ethoxy group (—OC$_2$H$_5$).

"Monovalent halogenated hydrocarbon group" is obtained by substituting (halogenating) each of part or all of hydrogen groups (—H) out of the foregoing monovalent hydrocarbon group by a halogen group. Similarly, "monovalent halogenated oxygen-containing hydrocarbon group" is obtained by substituting each of part or all of hydrogen groups out of the foregoing monovalent oxygen-containing hydrocarbon group by a halogen group. In either case, types of halogen groups substituting for hydrogen groups are similar to the types of halogen groups described above.

Examples of the monovalent halogenated hydrocarbon group may include a group obtained by halogenating the foregoing alkyl group or the like. That is, the monovalent halogenated hydrocarbon group is a group obtained by substituting each of part or all of hydrogen groups of the foregoing alkyl group or the like by a halogen group. More specific examples of the group obtained by halogenating an alkyl group or the like may include a trifluoromethyl group (—CF$_3$) and a pentafluoroethyl group (—C$_2$F$_5$). Further, examples of the monovalent halogenated oxygen-containing hydrocarbon group may include a group obtained by substituting each of part or all of hydrogen groups of the foregoing alkoxy group or the like by a halogen group. More specific examples of the group obtained by halogenating an alkoxy group or the like may include a trifluoromethoxy group (—OCF$_3$) and a pentafluoroethoxy group (—OC$_2$F$_5$).

The foregoing "group obtained by binding two or more thereof" may be a group obtained by binding two or more of the foregoing groups so that the whole valency becomes monovalent. Examples thereof may include a group obtained by binding an alkyl group to an aryl group and a group obtained by binding an alkyl group to a cycloalkyl group. More specific examples of the group obtained by binding an alkyl group to an aryl group may include a benzyl group.

It is to be noted that each of R1 to R4 may be a group other than the foregoing groups. Specifically, each of R1 to R4 may be, for example, a derivative of each of the foregoing groups. The derivative is obtained by introducing one or more substituent groups to each of the foregoing groups. Types of the substituent groups may be any types.

Type of R5 in Formula (2) is not particularly limited, as long as R5 is one of a divalent hydrocarbon group, a divalent oxygen-containing hydrocarbon group, a divalent halogenated hydrocarbon group, a divalent halogenated oxygen-containing hydrocarbon group, and a group obtained by binding two or more thereof to one another. One reason for this is that, in this case, the protective function of the coat 3 is obtained without depending on the type of R5. Details of k2 representing the number of repeating units are similar to those of k1 described above.

"Divalent hydrocarbon group" is a generic term used to refer to divalent groups configured of carbon and hydrogen, and may have a straight-chain structure or a branched structure having one or more side chains. Examples of the divalent hydrocarbon group may include an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, and a cycloalkylene group with carbon number from 3 to 18 both inclusive.

More specific examples of the alkylene group may include a methylene group (—CH$_2$—), an ethylene group (—C$_2$H$_4$—), and a propylene group (—C$_3$H$_6$—). Examples of the alkylene group may include a vinylene group (—CH═CH—). Examples of the alkynylene group may include an ethynylene group (—CH≡CH—). Examples of the arylene group may include a phenylene group. Examples of the cycloalkylene group may include a cyclopropylene group and a cyclobutylene group.

"Divalent oxygen-containing hydrocarbon group" is a generic term used to refer to divalent groups configured of oxygen together with carbon and hydrogen, and may be, for example, a group obtained by binding one or more divalent hydrocarbon groups and one or more oxygen bonds (—O—) in any order or the like. More specific examples thereof may include a group obtained by binding one alkylene group to an oxygen bond and a group obtained by binding two alkylene groups with an oxygen bond in between.

"Divalent halogenated hydrocarbon group" is obtained by substituting each of part or all of hydrogen groups of the foregoing divalent hydrocarbon group by a halogen group. Further, "divalent halogenated oxygen-containing hydrocarbon group" is obtained by substituting each of part or all of hydrogen groups of the foregoing monovalent oxygen-containing hydrocarbon group by a halogen group. In either case, types of halogen groups substituted for hydrogen groups are similar to the foregoing types of halogen groups.

The foregoing "divalent halogenated hydrocarbon group" may be obtained, for example, by halogenating the foregoing alkylene group or the like. That is, the foregoing "divalent halogenated hydrocarbon group" may be obtained by substituting each of part or all of an alkylene group and the like by a halogen group. More specifically, examples of a group obtained by halogenating an alkylene group or the like may include a difluoromethyl group (—CF$_2$—). Further, the "divalent halogenated oxygen-containing hydrocarbon group" may be obtained, for example, by substituting each of part or all of hydrogen groups of the foregoing group obtained by binding an alkylene group to an oxygen bond by a halogen group. More specifically, examples of the group obtained by halogenating a group obtained by binding an alkylene group to an oxygen bond may include —CF$_2$—O—CF$_2$—.

The foregoing "group obtained by binding two or more thereof" may be, for example, a group obtained by binding two or more of the foregoing groups so that the valency becomes divalent as a whole. Examples thereof may include a group obtained by binding an alkylene group to an arylene group and a group obtained by binding an alkylene group to a cycloalkylene group. More specifically, the group obtained by binding an alkylene group to an arylene group may include a benzylidene group.

It is to be noted that R5 may be a group other than the foregoing groups. Specifically, R5 may be a derivative of any of the foregoing groups. Such a derivative is obtained by introducing one or more substituent groups to any of the foregoing groups. Types of the substituent groups may be any types.

In particular, the cyclic carbonic acid compound may be preferably a compound represented by the following Formula (3), since thereby, synthesis is implemented easily and stably.

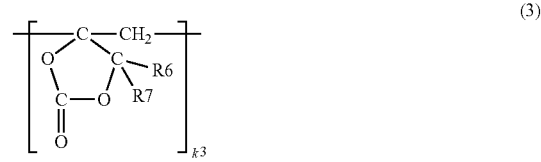

In Formula (3), each of R6 and R7 is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by binding two or more thereof; R6 and R7 may be bound to each other; and k3 satisfies k3≥1.

The compound shown in Formula (3) is a compound in which X of the cyclic carbonic acid compound shown in Formula (1) includes one ═C—CH$_2$— and one >CR3R4 (>CR6R7 in Formula (3)). R6 and R7 may be the same type of group, or may be different from each other. Each type of R6 and R7 is not particularly limited, as long as each thereof is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by binding two or more thereof. One reason for this is that, in this case, the protective function of the coat 3 is obtained without depending on the types of R6 and R7. Details of k3 representing the number of repeating units are similar to those of k1 described above. Details of R6 and R7 other than the foregoing description are similar to those of R1 to R4 described above.

Specific examples of the cyclic carbonic acid compound shown in Formula (1), more specifically, specific examples of the compound shown in Formula (3) may include any one or more of compounds respectively represented by the following Formula (3-1) to the following Formula (3-13). However, examples thereof may include other compound satisfying the conditions shown in Formula (3).

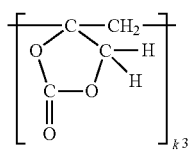 (3-1)

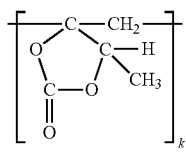 (3-2)

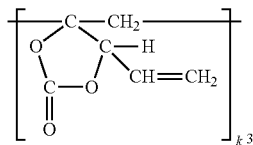 (3-3)

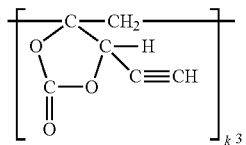 (3-4)

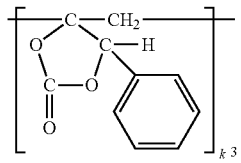 (3-5)

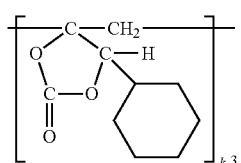 (3-6)

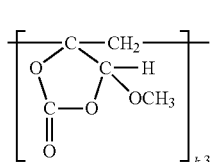 (3-7)

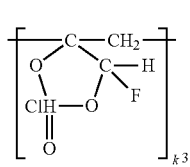 (3-8)

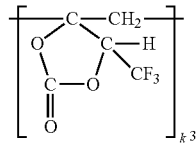 (3-9)

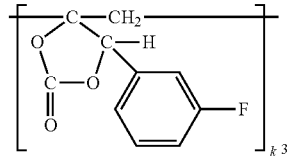 (3-10)

In the formulas, k3 satisfies k3≥1.

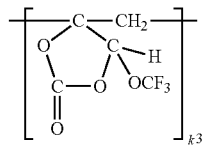 (3-11)

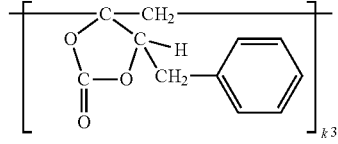 (3-12)

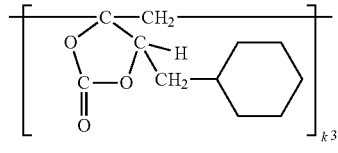 (3-13)

In the formulas, k3 satisfies k3≥1.

Specific examples of the chain carbonic acid compound shown in Formula (2) may include any one or more of compounds respectively represented by the following Formula (2-1) to Formula (2-9). However, examples thereof may include other compound satisfying the conditions shown in Formula (2).

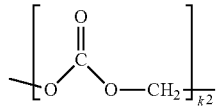 (2-1)

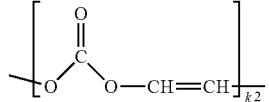 (2-2)

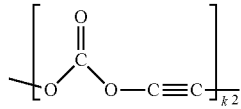 (2-3)

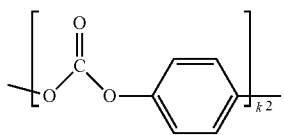
(2-4)

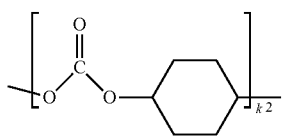
(2-5)

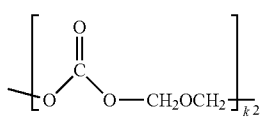
(2-6)

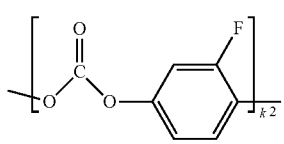
(2-7)

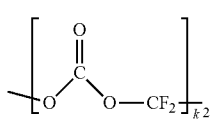
(2-8)

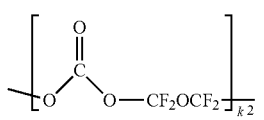
(2-9)

In the formulas, k2 satisfies $k2 \geq 1$.

Although the average molar weight (weight average molar weight) of the carbon acid compound is not particularly limited, the average molar weight may be preferably large as much as possible. One reason for this is that, in this case, physical strength and chemical strength of the coat 3 are improved. Specifically, the average molar weight of the carbon acid compound may be preferably, for example, from 50000 to 100000 both inclusive.

[Anode]

For example, as illustrated in Table 4, the anode 22 may have an anode active material layer 22B on both surfaces of an anode current collector 22A.

The anode current collector 22A may be made, for example, of any one or more of electrically-conductive materials such as copper, nickel, and stainless steel. The surface of the anode current collector 22A may be preferably roughened. Thereby, due to a so-called anchor effect, adhesibility of the anode active material layer 22B with respect to the anode current collector 22A is improved. In this case, it is enough that the surface of the anode current collector 22A in a region opposed to the anode active material layer 22B is roughened at minimum. Examples of roughening methods may include a method of forming fine particles by utilizing electrolytic treatment. The electrolytic treatment is a method of providing concavity and convexity on the surface of the anode current collector 22A by forming fine particles on the surface of the anode current collector 22A with the use of an electrolytic method in an electrolytic bath. A copper foil fabricated by an electrolytic method is generally called "electrolytic copper foil."

The anode active material layer 22B contains any one or more of anode materials capable of inserting and extracting lithium ions as anode active materials, and may further contain any one or more of other materials such as an anode binder and an anode electric conductor. Details of the anode binder and the anode electric conductor may be, for example, similar to those of the cathode binder and the cathode electric conductor. The chargeable capacity of the anode material may be preferably larger than the discharged capacity of the cathode 21 in order to prevent lithium metal from being unintentionally precipitated on the anode 22 in the middle of charge. That is, the electrochemical equivalent of the anode material capable of inserting and extracting lithium may be preferably larger than the electrochemical equivalent of the cathode 21.

Examples of the anode materials may include, for example, any one or more of carbon materials. In the carbon materials, crystal structure change at the time of insertion and extraction of lithium is extremely small. Therefore, the carbon materials provide high energy density and superior cycle characteristics. Further, the carbon materials serve as anode electric conductors as well. Examples of the carbon materials may include graphitizable carbon, non-graphitizable carbon, and graphite. The spacing of (002) plane of the non-graphitizable carbon may be preferably equal to or greater than 0.37 nm, and the spacing of (002) plane of the graphite may be preferably equal to or smaller than 0.34 nm. More specifically, examples of the carbon materials may include pyrolytic carbons, cokes, glassy carbon fiber, an organic polymer compound fired body, activated carbon, and carbon blacks. Examples of the cokes may include pitch coke, needle coke, and petroleum coke. The organic polymer compound fired body is obtained by firing (carbonizing) a polymer compound such as a phenol resin and a furan resin at appropriate temperature. In addition thereto, examples of the carbon materials may include low crystalline carbon and amorphous carbon that are heat-treated at temperature equal to or less than about 1000 deg C. It is to be noted that the shape of any of the carbon materials may be any of a fibrous shape, a spherical shape, a granular shape, and a scale-like shape.

Further, examples of the anode materials may include a material (a metal-based material) containing any one or more of metal elements and metalloid elements as constituent elements, since high energy density is thereby obtained. Such a metal-based material may be any of a simple substance, an alloy, and a compound, may be two or more thereof, or may be a material having one or more phases thereof in part or all thereof. It is to be noted that "alloy" includes a material containing one or more metal elements and one or more metalloid elements, in addition to a material configured of two or more metal elements. Further, the "alloy" may contain a non-metallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include any one or more of metal elements and metalloid elements that are capable of forming an alloy with lithium. Specific examples thereof may include Mg, B, Al, Ga, In, Si, Ge, Sn, Pb, Bi, Cd, Ag, Zn, Hf, Zr, Y, Pd, and Pt. In particular, silicon (Si), tin (Sn), or both may be preferable, since silicon and tin have a superior ability of inserting and extracting lithium ions, and therefore, provide high energy density.

A material containing silicon, tin, or both as constituent elements may be any of a simple substance, an alloy, and a compound of silicon or tin, may be two or more thereof, or may be a material having one or more phases thereof in part or all thereof. It is to be noted that, the term "simple substance" merely refers to a general simple substance (a small amount of impurity may be therein contained), and does not necessarily refer to a purity 100% simple substance.

The alloys of silicon may contain, for example, any one or more of elements such as Sn, Ni, Cu, Fe, Co, Mn, Zn, In, Ag, Ti, Ge, Bi, Sb, and Cr as constituent elements other than Si. The compounds of silicon may contain, for example, any one or more of C, O, and the like as constituent elements other than Si. It is to be noted that, for example, the compounds of silicon may contain any one or more of the elements described for the alloys of silicon as constituent elements other than Si.

Specific examples of the alloys of silicon and the compounds of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), and LiSiO. It is to be noted that v in $SiO_v$ may be in the range of 0.2<v<1.4.

The alloys of tin may contain, for example, any one or more of elements such as Si, Ni, Cu, Fe, Co, Mn, Zn, In, Ag, Ti, Ge, Bi, Sb, and Cr as constituent elements other than Sn. The compounds of tin may contain, for example, any one or more of elements such as C and O as constituent elements other than Sn. It is to be noted that the compounds of tin may contain, for example, any one or more of elements described for the alloys of tin as constituent elements other than Sn. Specific examples of the alloys of tin and the compounds of tin may include $SnO_w$ (0<w≤2), $SnSiO_3$, LiSnO, and $Mg_2Sn$.

In particular, as a material containing tin as a constituent element, for example, a material containing a second constituent element and a third constituent element in addition to Sn as a first constituent element may be preferable. Examples of the second constituent element may include any one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include any one or more of B, C, Al, P, and the like. In the case where the second constituent element and the third constituent element are contained, a high battery capacity, superior cycle characteristics, and the like are obtained.

In particular, a material (an SnCoC-containing material) containing Sn, Co, and C as constituent elements may be preferable. In the SnCoC-containing material, for example, the C content may be from 9.9 mass % to 29.7 mass % both inclusive, and the ratio of Sn and Co contents (Co/(Sn+Co)) may be from 20 mass % to 70 mass % both inclusive, since thereby, high energy density is obtained.

It may be preferable that the SnCoC-containing material have a phase containing Sn, Co, and C. Such a phase may be preferably low-crystalline or amorphous. The phase is a reaction phase capable of reacting with lithium. Therefore, due to existence of the reaction phase, superior characteristics are obtained. The half bandwidth of the diffraction peak obtained by X-ray diffraction of the phase may be preferably equal to or greater than 1 deg based on diffraction angle of 2θ in the case where CuKα ray is used as a specific X ray, and the insertion rate is 1 deg/min. Thereby, lithium is more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in the range of 2θ=from 20 deg to 50 deg both inclusive. Such a reaction phase may have, for example, the foregoing respective constituent elements, and the low crystalline or amorphous structure thereof possibly results from existence of carbon mainly.

In the SnCoC-containing material, part or all of carbon as a constituent element may be preferably bonded to a metal element or a metalloid element as other constituent element, since cohesion or crystallization of tin and/or the like is suppressed thereby. The binding state of elements is allowed to be checked with the use, for example, of XPS. In a commercially available device, for example, as a soft X ray, Al—Kα ray, Mg—Kα ray, or the like may be used. In the case where part or all of carbon are bound to a metal element, a metalloid element, or the like, the peak of a synthetic wave of 1s orbit of carbon (C1s) is shown in a region lower than 284.5 eV. It is to be noted that in the device, energy calibration is made so that the peak of 4 f orbit of gold atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis may be made with the use of commercially available software to isolate both peaks from each other. In the waveform analysis, the position of the main peak existing on the lowest bound energy side is the energy standard (284.8 eV).

It is to be noted that the SnCoC-containing material is not limited to the material (SnCoC) configured of only Sn, Co, and C as constituent elements. That is, the SnCoC-containing material may further contain, for example, any one or more of Si, Fe, Ni, Cr, In, Nb, Ge, Ti, Mo, Al, P, Ga, Bi, and the like as constituent elements in addition to Sn, Co, and C.

In addition to the SnCoC-containing material, a material (an SnCoFeC-containing material) containing Sn, Co, Fe, and C as constituent elements may be also preferable. The composition of the SnCoFeC-containing material may be arbitrarily set. For example, the composition in which the Fe content may be set small is as follows. That is, the C content may be from 9.9 mass % to 29.7 mass % both inclusive, the Fe content may be from 0.3 mass % to 5.9 mass % both inclusive, and the ratio (Co/(Sn+Co)) of contents of Sn and Co may be from 30 mass % to 70 mass % both inclusive. Further, the composition in which the Fe content is set large is as follows. That is, the C content may be from 11.9 mass % to 29.7 mass % both inclusive, the ratio ((Co+Fe)/(Sn+Co+Fe)) of contents of Sn, Co, and Fe may be from 26.4 mass % to 48.5 mass % both inclusive, and the ratio (Co/(Co+Fe)) of contents of Co and Fe may be from 9.9 mass % to 79.5 mass % both inclusive. In such a composition range, high energy density is obtained. It is to be noted that physicality (such as half bandwidth) of the SnCoFeC-containing material is similar to the physicality of the foregoing SnCoC-containing material.

In addition thereto, the anode material may be, for example, any one or more of metal oxides, polymer compounds, and the like. Examples of the metal oxides may include iron oxide, ruthenium oxide, and molybdenum oxide. Examples of the polymer compounds may include polyacetylene, polyaniline, and polypyrrole.

The anode active material layer 22B may be formed, for example, by any one or more of a coating method, a vapor-phase deposition method, a liquid-phase deposition method, a spraying method, a firing method (a sintering method), and the like. The coating method may be a method in which, for example, after a particulate (powder) anode active material is mixed with an anode binder and/or the like, the resultant mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method may be a method in which after the anode current collector 22A is coated with a mixture dispersed in a solvent with the use, for example, of a coating method, heat treatment is performed at temperature higher than the melting point of the anode binder and/or the like. Examples of the firing method may include an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is larger than the electrochemical equivalent of the cathode. Further, in the case where the open circuit voltage (that is, a battery voltage) at the time of fully-charged state is equal to or greater than 4.25 V, the extraction amount of lithium per unit mass is larger than that in the case where the open circuit voltage is 4.20 V even if the same cathode active material is used. Therefore, amounts of the cathode active material and the anode active material are adjusted accordingly. Thereby, high energy density is obtainable.

[Separator]

The separator 23 separates the cathode 21 from the anode 22, and passes lithium ions while preventing current short circuit resulting from contact of both electrodes. The separator 23 may be, for example, a porous film made of a synthetic resin, ceramics, and/or the like. The separator 23 may be a laminated film in which two or more types of porous films are laminated. Examples of the synthetic resin may include polytetrafluoroethylene, polypropylene, and polyethylene.

In particular, the separator 23 may include, for example, a polymer compound layer on a single surface or both surfaces of the foregoing porous film (the base material layer). Thereby, adhesibility of the separator 23 with respect to the cathode 21 and the anode 22 is improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance is less likely to be increased, and battery swollenness is suppressed.

The polymer compound layer may contain, for example, a polymer material such as polyvinylidene fluoride, since such a polymer material has a superior physical strength and is electrochemically stable. However, the polymer material may be a polymer material other than polyvinylidene fluoride. In the case of forming the polymer compound layer, for example, after a solution in which the polymer material is dissolved is prepared, the base material layer is coated with the solution, and the solution is subsequently dried. Alternatively, the base material layer may be soaked in the solution and the solution may be subsequently dried.

[Electrolytic Solution]

The separator 23 is impregnated with an electrolytic solution as a liquid electrolyte. The electrolytic solution contains a solvent and an electrolyte salt, and may further contain any one or more of other materials such as an additive.

The solvent contains any one or more of non-aqueous solvents such as an organic solvent. The electrolytic solution containing a non-aqueous solvent is a so-called non-aqueous electrolytic solution.

Examples of the non-aqueous solvents may include a cyclic ester carbonate, a chain ester carbonate, lactone, a chain carboxylic ester, and nitrile, since thereby, a superior battery capacity, superior cycle characteristics, superior conservation characteristics, and the like are obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, examples of the non-aqueous solvents may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Thereby, a similar advantage is obtained.

In particular, any one or more of ethylene carbonate, propylene carbonate, dimethyl carbonate, diethyl carbonate, and ethyl methyl carbonate may be preferable, since thereby, a superior battery capacity, superior cycle characteristics, superior conservation characteristics, and the like are obtained. In this case, a combination of a high viscosity (high dielectric constant) solvent (for example, specific dielectric constant $\in\geq 30$) such as ethylene carbonate and propylene carbonate and a low viscosity solvent (for example, viscosity$\leq 1$ mPa·s) such as dimethyl carbonate, ethylmethyl carbonate, and diethyl carbonate may be more preferable. One reason for this is that the dissociation property of the electrolyte salt and ion mobility are improved.

In particular, the solvent may contain any one or more of an unsaturated cyclic ester carbonate, a halogenated ester carbonate, sultones (cyclic sulfonic esters), and acid anhydrides, since thereby, chemical stability of the electrolytic solution is improved. The unsaturated cyclic ester carbonate is a cyclic ester carbonate having one or more unsaturated bonds (carbon-carbon double bonds), and may be, for example, vinylene carbonate, vinylethylene carbonate, methyleneethylene carbonate, or the like. The halogenated ester carbonate is a cyclic ester carbonate or a chain ester carbonate containing one or more halogens as constituent elements. Examples of the cyclic halogenated ester carbonate may include 4-fluoro-1,3-dioxole-2-one, and 4,5-difluoro-1,3-dioxole-2-one. Examples of the chain halogenated ester carbonate may include fluoromethyl methyl carbonate, bis(fluoromethyl) carbonate, and difluoromethyl methyl carbonate. Examples of the sultones may include propane sultone and propene sultone. Examples of the acid anhydrides may include a succinic anhydride, an ethane disulfonic anhydride, and a sulfobenzoic anhydride. However, examples of the solvent are not limited to the above-described materials, and may include other materials.

The electrolyte salt may contain, for example, any one or more of salts such as lithium salts. However, the electrolyte salt may contain, for example, a salt other than the lithium salt. Examples of "the salt other than the lithium salt" may include a light metal salt other than the lithium salt.

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained.

In particular, any one or more of $LiPF_6$, $LiBF_4$, $LiClO_4$, and $LiAsF_6$ may be preferable, and $LiPF_6$ may be more preferable, since the internal resistance is thereby lowered, and therefore, a higher effect is obtained. However, examples of the electrolyte salt are not limited to the foregoing materials, and may include other materials.

Although the content of the electrolyte salt is not particularly limited, in particular, the content thereof may be preferably from 0.3 mol/kg to 3.0 mol/kg both inclusive with respect to the solvent, since high ion conductivity is obtained thereby.

[Operation of Secondary Battery]

The secondary battery may operate, for example, as follows. At the time of charge, lithium ions extracted from the cathode 21 are inserted in the anode 22 through the electrolytic solution. In contrast, at the time of discharge, lithium ions extracted from the anode 22 are inserted in the cathode 21 through the electrolytic solution.

The upper limit value (the upper limit charging voltage) of a voltage at the time of charge and the lower limit value (the lower limit discharging voltage) of a voltage at the time of discharge are not particularly limited. In particular, the upper limit charging voltage may be preferably equal to or larger than 4.2 V, and may be more preferably from 4.2 V to 4.8 V both inclusive. Further, the lower limit discharging voltage may be preferably equal to or smaller than 3.3 V, and may be more preferably from 2.0 V to 3.3 V both inclusive. One reason for this is that, in this case, a high battery capacity is obtainable stably.

[Method of Manufacturing Secondary Battery]

The secondary battery may be manufactured, for example, by the following procedure.

First, the cathode 21 is fabricated. In this case, a cathode active material is mixed with a cathode binder, a cathode electric conductor, and the like to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, and the cathode mixture slurry is dried to form the cathode active material layer 21B. Subsequently, the cathode active material layer 21B may be compression-molded with the use of a roll pressing machine and/or the like. In this case, compression-molding may be performed on heating, or compression-molding may be repeated several times. Subsequently, formation materials of the coat 21C are dispersed or dissolved in a solvent such as an organic solvent to prepare a process solution. Subsequently, the surface of the cathode active material layer 21B is coated with the process solution, and the process solution is dried to form the coat 21C. Upon forming the coat 21C, instead of coating the cathode active material layer 21B with the process solution, it is possible that the cathode active material layer 21B is immersed in the process solution and taken out, and subsequently, the cathode active material layer 21B is dried.

Next, the anode 22 is fabricated. In this case, an anode active material is mixed with an anode binder, an anode electric conductor, and the like to prepare an anode mixture. Subsequently, the anode mixture is dispersed in an organic solvent or the like to form paste anode mixture slurry. Subsequently, both surfaces of the anode current collector 22A are coated with the anode mixture slurry, and the anode mixture slurry is dried to form the anode active material layer 22B. Subsequently, the anode active material layer 22B may be compression-molded with the use of a roll pressing machine and/or the like. In this case, compression-molding may be performed on heating, or compression-molding may be repeated several times.

Next, an electrolyte salt is dispersed in a solvent to prepare an electrolytic solution.

Next, the battery element 20 is fabricated. In this case, the cathode lead 24 is attached to the cathode current collector 21A with the use of a welding method and/or the like, and the anode lead 25 is attached to the anode current collector 22A with the use of a welding method and/or the like. Subsequently, the cathode 21 and the anode 22 are layered with the separator 23 in between to form a laminated body, and thereafter, the laminated body is spirally wound in the longitudinal direction to form a spirally-wound body. Subsequently, the spirally-wound body is formed in the flat shape.

Finally, the secondary battery is assembled. In this case, first, the battery element 20 is contained in the battery can 11, and thereafter, the insulating plate 12 is laid on the battery element 20. Subsequently, the cathode lead 24 is attached to the cathode pin 15 with the use of a welding method and/or the like, and the anode lead 25 is attached to the battery can 11 with the use of a welding method and/or the like. In this case, the battery cover 13 is fixed to the open end of the battery can 11 by a laser welding method and/or the like. Finally, an electrolyte solution is injected into the battery can 11 from the injection hole 19, the separator 23 is impregnated with the electrolytic solution, and thereafter, the injection hole 19 is sealed by the sealing member 19A.

[Function and Effect of Secondary Battery]

According to the square-type secondary battery, the physicality of the cathode 21 satisfies the foregoing first condition and the foregoing second condition. Therefore, a decomposition reaction of the electrolytic solution is suppressed without large inhibition of insertion and extraction of lithium by the cathode active material. Therefore, battery characteristics are allowed to be improved. Other functions and other effects are similar to those of the electrode.

In particular, in the case where the coat 21C contains a polymer compound, and the polymer compound contains a carbonic acid bond in a repeating unit, the protective function of the coat 21C is allowed to be further improved. In this case, in the case where the polymer compound contains any one or more of compounds represented by Formula (1) to Formula (3), higher effects are obtainable.

[2-2. Lithium Ion Secondary Battery (Cylindrical-Type)]

Figure 5:
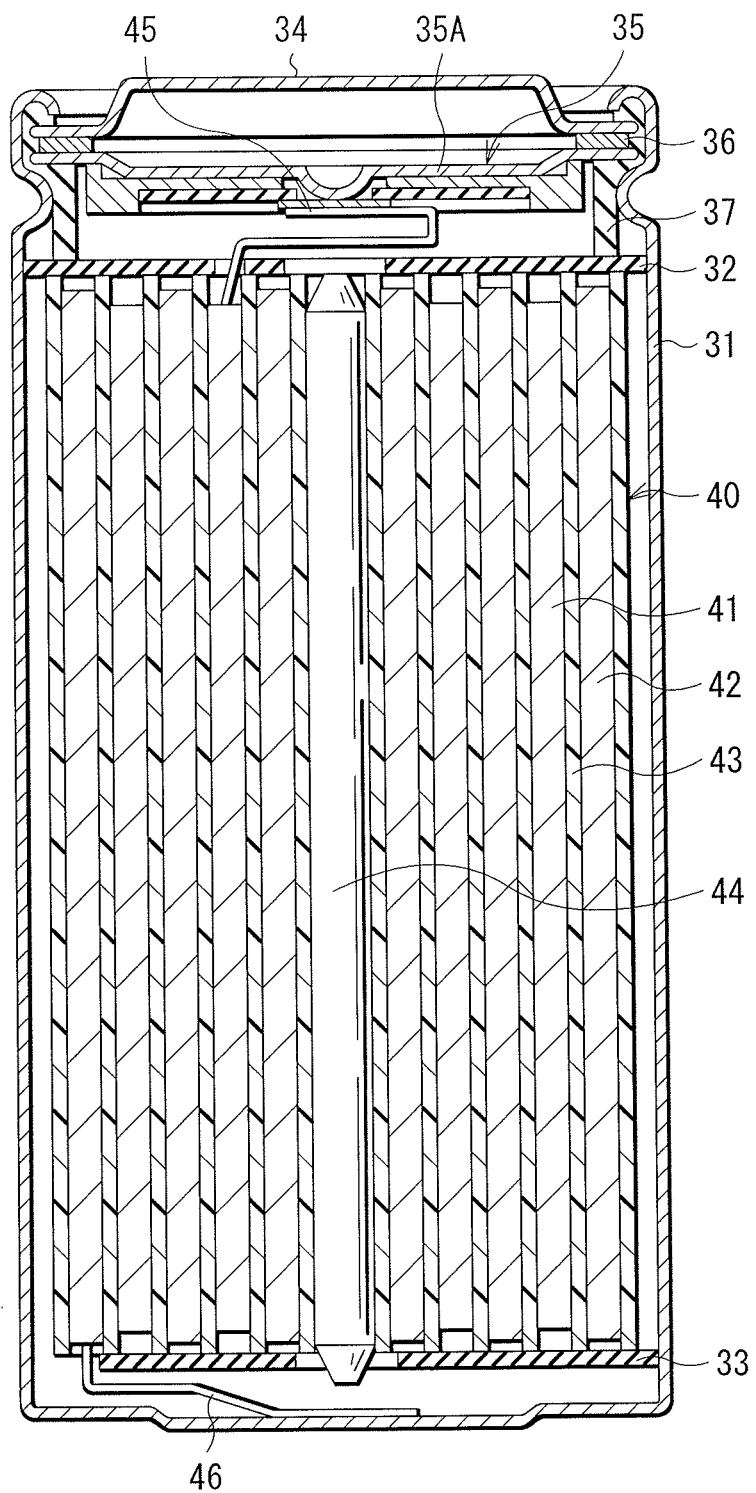
FIG. 5 is a cross-sectional view illustrating a configuration of another secondary battery (cylindrical-type) using the electrode according to the embodiment of the present application.
Figure 6:
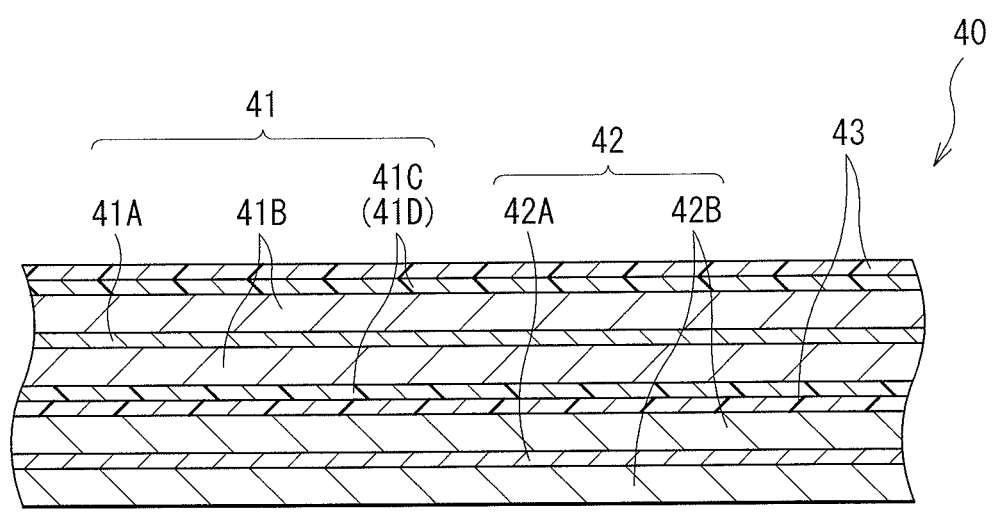
FIG. 6 is a cross-sectional view illustrating an enlarged part of a spirally wound electrode body illustrated in FIG. 5.

FIG. 5 and FIG. 6 illustrate cross-sectional configurations of another secondary battery. FIG. 6 illustrates enlarged part of a spirally wound electrode body 40 illustrated in FIG. 5. In the following description, the components of the above-described square-type secondary battery will be used as appropriate.

[Whole Configuration of Secondary Battery]

The secondary battery described here is a lithium ion secondary battery, and has a so-called cylindrical-type battery structure. For example, the foregoing electrode is applied to a cathode 41 here.

Specifically, for example, as illustrated in FIG. 5, the secondary battery may contain a pair of insulating plates 32 and 33 and the spirally wound electrode body 40 inside a battery can 31 in the shape of a hollow cylinder. The spirally wound electrode body 40 may be formed, for example, by laminating a cathode 41 and an anode 42 with a separator 43 in between, and subsequently spirally winding the resultant laminated body.

The battery can 31 may have, for example, a hollow structure in which one end of the battery can 31 is closed and the other end of the battery can 31 is opened. The battery can 31 may be made, for example, of any or more of iron, aluminum, an alloy thereof, and the like. The surface of the battery can 31 may be plated with nickel or the like. The pair of insulating plates 32 and 33 is arranged to sandwich the spirally wound electrode body 40 in between, and to extend perpendicularly to the spirally wound periphery surface of the spirally wound electrode body 40.

At the open end of the battery can 31, a battery cover 34, a safety valve mechanism 35, and a positive temperature coefficient device (PTC element) 36 are attached by being swaged with a gasket 37. Thereby, the battery can 31 is hermetically sealed. The battery cover 34 may be made, for example, of a material similar to that of the battery can 31. The safety valve mechanism 35 and the PTC element 36 are provided inside the battery cover 34. The safety valve mechanism 35 is electrically connected to the battery cover 34 through the PTC element 36. In the safety valve mechanism 35, in the case where the internal pressure becomes a certain level or more by internal short circuit, external heating, or the like, a disk plate 35A inverts to cut electric connection between the battery cover 34 and the spirally wound electrode body 40. The PTC element 36 prevents abnormal heat generation resulting from a large current. As temperature rises, resistance of the PTC element 36 is increased accordingly. The gasket 37 may be made, for example, of an insulating material. The surface of the gasket 37 may be coated with asphalt.

In the hollow space of the center of the spirally wound electrode body 40, for example, a center pin 44 may be inserted. However, the center pin 44 is not necessarily included therein. For example, a cathode lead 45 made of an electrically-conductive material such as aluminum may be connected to the cathode 41. For example, an anode lead 46 made of an electrically-conductive material such as nickel may be connected to the anode 42. For example, the cathode lead 45 may be welded to the safety valve mechanism 35, and may be electrically connected to the battery cover 34. For example, the anode lead 46 may be welded to the battery can 31, and may be electrically connected to the battery can 31.

[Cathode, Anode, Separator, and Electrolytic Solution]

As illustrated in FIG. 6, the cathode 41 may have, for example, a cathode active material layer 41B and a coat 41C on both surfaces of a cathode current collector 41A. The anode 42 may have, for example, an anode active material layer 42B on both surfaces of an anode current collector 42A. The configurations of the cathode current collector 41A, the cathode active material layer 41B, the coat 41C, the anode current collector 42A, and the anode active material layer 42B are similar to the configurations of the cathode current collector 21A, the cathode active material layer 21B, the coat 21C, the anode current collector 22A, and the anode active material layer 22B, respectively. That is, the cathode 41 has a configuration similar to that of the foregoing electrode.

The configuration of the separator 35 is similar to the configuration of the separator 23. Further, the composition of the electrolytic solution with which the separator 35 is impregnated is similar to the composition of the electrolytic solution in the square-type-secondary battery.

[Operation of Secondary Battery]

The secondary battery may operate, for example, as follows. At the time of charge, lithium ions extracted from the cathode 41 are inserted in the anode 42 through the electrolytic solution. In contrast, at the time of discharge, lithium ions extracted from the anode 42 are inserted in the cathode 41 through the electrolytic solution.

[Method of Manufacturing Secondary Battery]

The secondary battery may be manufactured, for example, by the following procedure.

First, the cathode 41 and the anode 42 are fabricated by a fabrication procedure similar to that of the cathode 21 and the anode 22. In this case, after the cathode active material layer 41B is formed on both surfaces of the cathode current collector 41A, the coat 41C is formed on the surface of the cathode active material layer 41B to fabricate the cathode 41. Further, the anode active material layer 42B is formed on both surfaces of the anode current collector 42A to fabricate the anode 42.

Finally, a secondary battery is assembled with the use of the cathode 41 and the anode 42. The cathode lead 45 is attached to the cathode current collector 41A with the use of a welding method and/or the like, and the anode lead 46 is attached to the anode current collector 42A with the use of a welding method and/or the like. Subsequently, the cathode 41 and the anode 42 are layered with the separator 43 in between and are spirally wound to fabricate the spirally wound electrode body 40. Thereafter, in the center of the spirally wound electrode body 40, the center pin 44 is inserted. Subsequently, the spirally wound electrode body 40 is sandwiched between the pair of insulating plates 32 and 33, and is contained in the battery can 31. In this case, an end tip of the cathode lead 45 is attached to the safety valve mechanism 35 with the use of a welding method and/or the like, and an end tip of the anode lead 46 is attached to the battery can 31 with the use of a welding method and/or the like. Subsequently, the electrolytic solution is injected into the battery can 31, and the separator 43 is impregnated with the electrolytic solution. Subsequently, the battery cover 34, the safety valve mechanism 35, and the PTC element 36 are attached to the open end of the battery can 31, and are fixed by being swaged with the gasket 37.

[Function and Effect of Secondary Battery]

According to the cylindrical-type secondary battery, the physicality of the cathode 41 satisfies the foregoing first condition and the foregoing second condition. Therefore, battery characteristics are allowed to be improved for a reason similar to that of the square-type secondary battery. Other functions and other effects are similar to those of the square-type secondary battery.

[2-3. Lithium Ion Secondary Battery (Laminated-Film-Type)]

Figure 7:
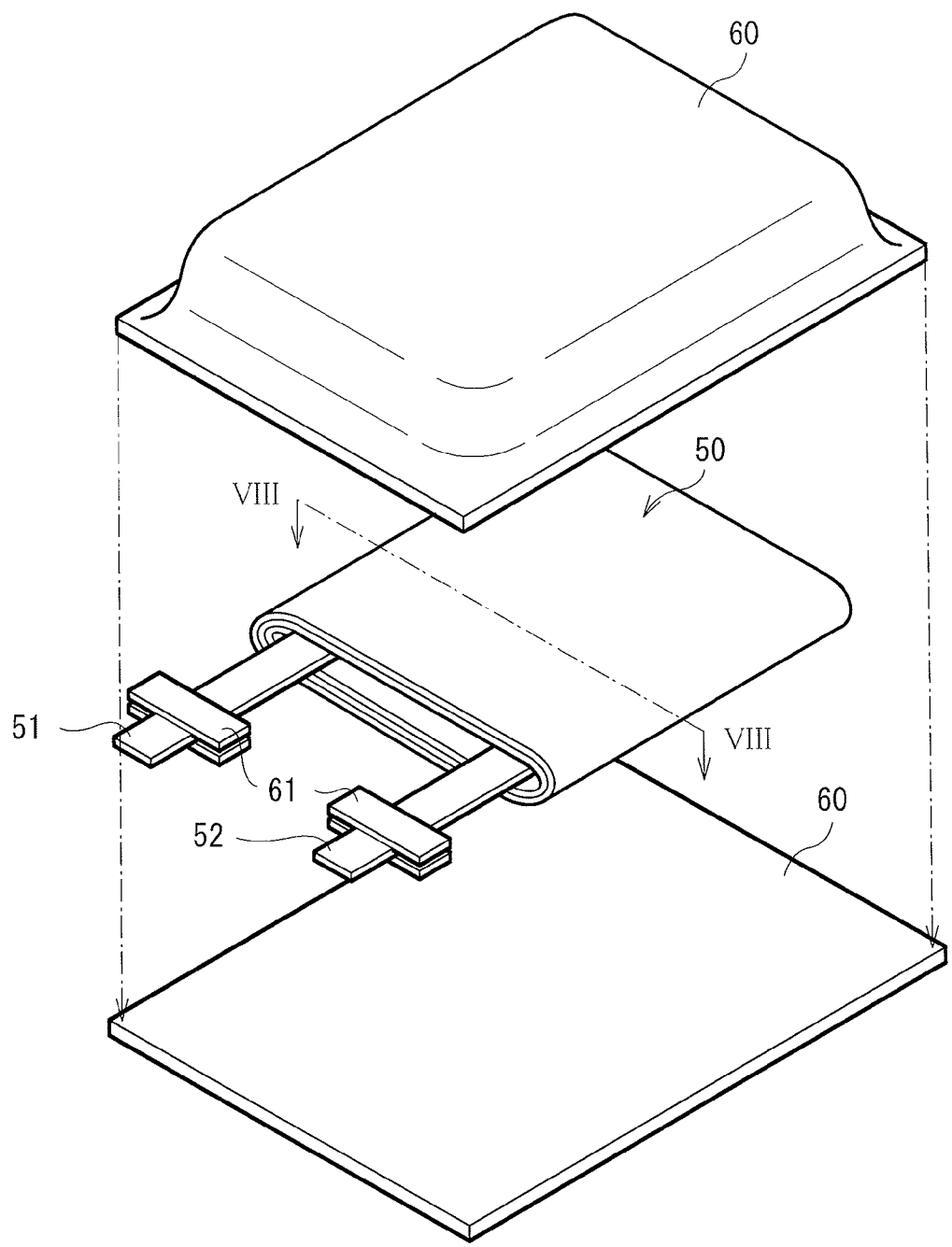
FIG. 7 is a perspective view illustrating a configuration of still another secondary battery (laminated-film-type) using the electrode according to the embodiment of the present application.
Figure 8:
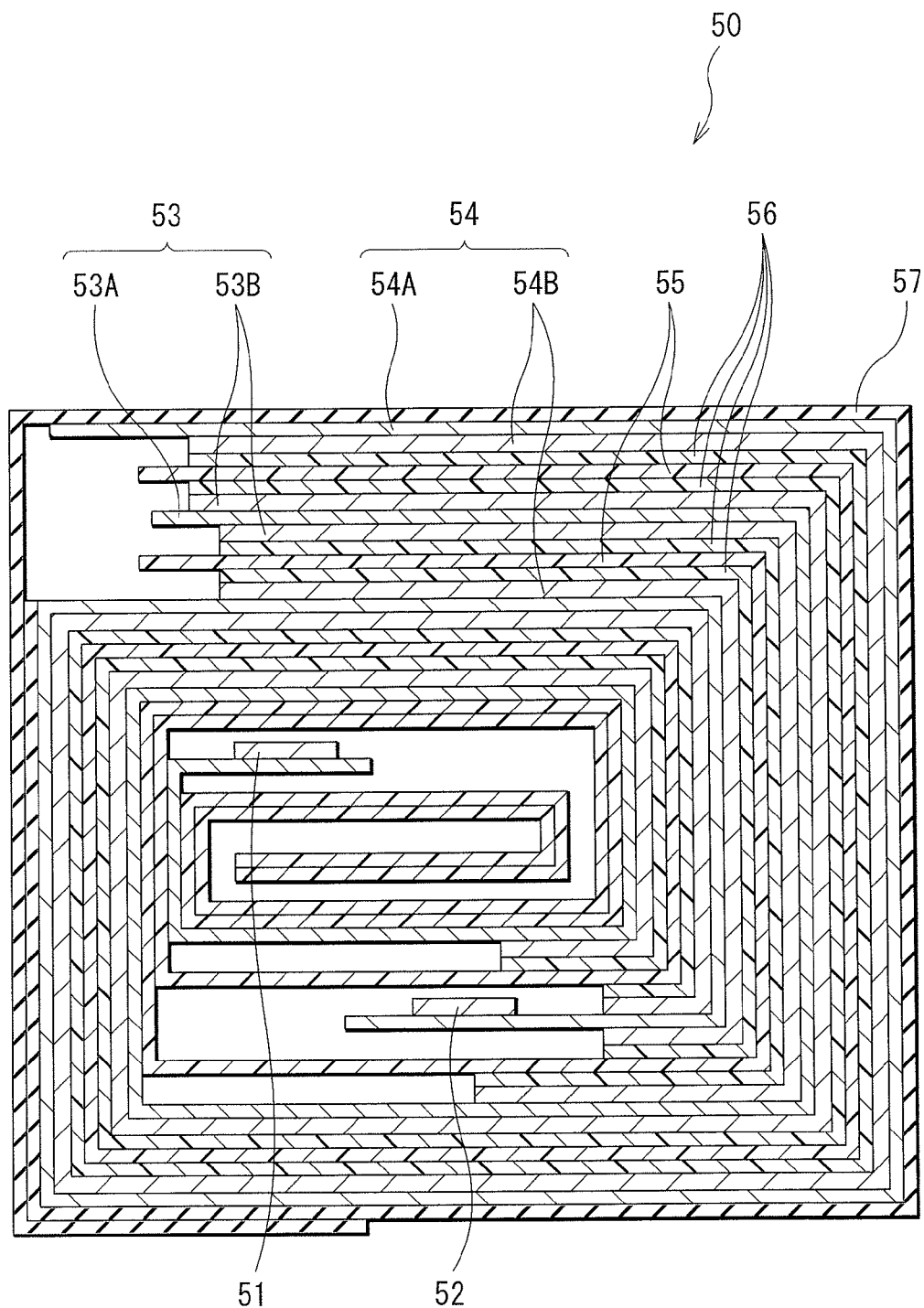
FIG. 8 is a cross-sectional view taken along a line VIII-VIII of a spirally wound electrode body illustrated in FIG. 7.
Figure 9:
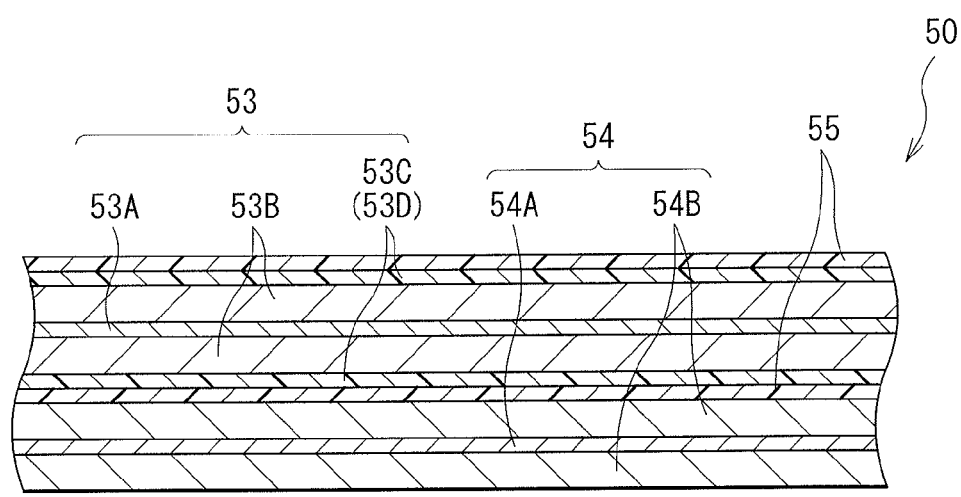
FIG. 9 is a cross-sectional view illustrating an enlarged part of the spirally wound electrode body illustrated in FIG. 8.

FIG. 7 illustrates a perspective configuration of still another secondary battery. FIG. 8 illustrates a cross-section taken along a line VIII-VIII of a spirally wound electrode body 50 illustrated in FIG. 7. FIG. 9 illustrates an enlarged part of the spirally wound electrode body 50 illustrated in FIG. 8. It is to be noted that FIG. 7 illustrates a state in which the spirally winding electrode body 50 is separated from two package members 60. In the following description, the components of the square-type secondary battery described above will be used as necessary.

[Whole Configuration of Secondary Battery]

The secondary battery described here is a lithium ion secondary battery, and has a so-called laminated-film-type battery structure. For example, the foregoing electrode is applied to a cathode 51 here.

Specifically, for example, as illustrated in FIG. 7 and FIG. 8, the secondary battery contains the spirally wound electrode body 50 in a film-like outer package member 60. The spirally wound electrode body 50 may be formed, for example, by laminating a cathode 53 and an anode 54 with a separator 55 and an electrolyte layer 56 in between, and subsequently spirally winding the resultant laminated body. A cathode lead 51 is attached to the cathode 53, and an anode lead 52 is attached to the anode 54. The outermost periphery of the spirally wound electrode body 50 is protected by a protective tape 57.

The cathode lead 51 and the anode lead 52 may be, for example, led out from inside to outside of the outer package member 60 in the same direction. The cathode lead 51 may be made, for example, of any one or more of electrically-conductive materials such as aluminum. The anode lead 52 may be made, for example, of any one or more of electrically-conducive materials such as copper, nickel, and stainless steel. These electrically-conductive materials may be in the shape, for example, of a thin plate or mesh.

The outer package member 60 may be a laminated film in which, for example, a fusion bonding layer, a metal layer, and a surface protective layer are laminated in this order. The outer package member 60 may be formed, for example, by layering two laminated films so that the fusion bonding layers and the spirally wound electrode body 50 are opposed to each other, and subsequently fusion-bonding the respective outer edges of the fusion bonding layers to each other. Alternatively, the two laminated films may be attached to each other by an adhesive or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, as the outer package member 60, an aluminum laminated film in which a polyethylene film, an aluminum foil, and a nylon film are laminated in this order may be preferable. However, the outer package member 60 may be made of a laminated film having other laminated structure, a polymer film such as polypropylene, or a metal film.

For example, an adhesive film 61 to protect from outside air intrusion may be inserted between the outer package member 60 and the cathode lead 51 and between the outer package member 60 and the anode lead 52. The adhesive film 61 is made of a material having adhesibility with respect to the cathode lead 51 and the anode lead 52. Examples of the material having adhesibility may include a polyolefin resin. More specific examples thereof may include polyethylene, polypropylene, modified polyethylene, and modified polypropylene.

[Cathode, Anode, Separator, and Electrolytic Solution]

As illustrated in FIG. 9, the cathode 53 may have, for example, a cathode active material layer 53B and a coat 53C on both surfaces of a cathode current collector 53A. The anode 54 may have, for example, an anode active material layer 54B on both surfaces of an anode current collector 54A. The configurations of the cathode current collector 53A, the cathode active material layer 53B, the coat 53C, the anode current collector 54A, and the anode active material layer 54B are similar to the configurations of the cathode current collector 21A, the cathode active material layer 21B, the coat 21C, the anode current collector 22A, and the anode active material layer 22B, respectively. That is, the cathode 53 has a configuration similar to that of the foregoing electrode. The configuration of the separator 55 is similar to the configuration of the separator 23. It is to be noted that, in FIG. 8, illustration of the coat 53C is omitted.

[Electrolyte Layer]

In the electrolyte layer 56, an electrolytic solution is supported by a polymer compound. The electrolyte layer 56 is a so-called gel electrolyte, since thereby, high ion conductivity (such as 1 mS/cm or more at room temperature) is obtained and liquid leakage of the electrolytic solution is prevented. The electrolyte layer 56 may further contain other material such as an additive.

The polymer compound contains any one or more of polymer materials. Examples of the polymer materials may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. In addition thereto, examples of the polymer materials may include a copolymer. Examples of the copolymer may include a copolymer of vinylidene fluoride and hexafluoro propylene. In particular, polyvinylidene fluoride or the copolymer of vinylidene fluoride and hexafluoro propylene may be preferable, and polyvinylidene fluoride may be more preferable, since such a polymer compound is electrochemically stable.

For example, the composition of the electrolytic solution may be similar to the composition of the electrolytic solution of the square-type secondary battery. However, in the electrolyte layer 56 as a gel electrolyte, the term "solvent" of the electrolytic solution refers to a wide concept including not only a liquid solvent but also a material having ion conductivity capable of dissociating an electrolyte salt. Therefore, in the case where a polymer compound having ion conductivity is used, the polymer compound is also included in the solvent.

It is to be noted that the electrolytic solution may be used as it is instead of the gel electrolyte layer 56. In this case, the separator 55 is impregnated with the electrolytic solution.

[Operation of Secondary Battery]

The secondary battery may operate, for example, as follows. At the time of charge, lithium ions extracted from the cathode 53 are inserted in the anode 54 through the electrolyte layer 56. In contrast, at the time of discharge, lithium ions extracted from the anode 54 are inserted in the cathode 53 through the electrolyte layer 56.

[Method of Manufacturing Secondary Battery]

The secondary battery including the gel electrolyte layer 56 may be manufactured, for example, by the following three types of procedures.

In the first procedure, the cathode 53 and the anode 54 are fabricated by a fabrication procedure similar to that of the cathode 21 and the anode 22. In this case, the cathode active material layer 53B is formed on both surfaces of the cathode current collector 53A, and subsequently, the coat 53C is formed on the surface of the cathode active material layer 53B to form the cathode 53. Further, the anode active material layer 54B is formed on both surfaces of the anode current collector 54A to form the anode 54. Subsequently, a precursor solution including an electrolytic solution, a polymer compound, and a solvent such as an organic solvent is prepared. Thereafter, the cathode 53 and the anode 54 are coated with the precursor solution to form the gel electrolyte layer 56. Subsequently, the cathode lead 51 is attached to the cathode current collector 53A with the use of a welding method and/or the like, and the anode lead 52 is attached to the anode current collector 54A with the use of a welding method and/or the like. Subsequently, the cathode 53 and the anode 54 are layered with the separator 55 in between and are spirally wound to fabricate the spirally wound electrode body 50. Thereafter, the protective tape 57 is adhered to the outermost periphery thereof. Subsequently, after the spirally wound electrode body 50 is sandwiched between two pieces of film-like outer package members 60, the outer edges of the outer package members 60 are bound with the use of a thermal fusion bonding method and/or the like. Thereby, the spirally wound electrode body 50 is enclosed into the outer package members 60. In this case, the adhesive films 61 are inserted between the cathode lead 51 and the outer package member 60 and between the anode lead 52 and the outer package member 60.

In the second procedure, the cathode lead 51 is attached to the cathode 53, and the anode lead 52 is attached to the anode 54. Subsequently, the cathode 53 and the anode 54 are layered with the separator 55 in between and are spirally wound to fabricate a spirally wound body as a precursor of the spirally wound electrode body 50. Thereafter, the protective tape 57 is adhered to the outermost periphery thereof. Subsequently, after the spirally wound body is arranged between two pieces of the film-like outer package members 60, the outermost peripheries except for one side are bonded with the use of a thermal fusion bonding method and/or the like to obtain a pouched state, and the spirally wound body is contained in the pouch-like outer package member 60. Subsequently, an electrolytic solution, a monomer as a raw material for the polymer compound, a polymerization initiator, and other materials such as a polymerization inhibitor are mixed to prepare a composition for electrolyte. Subsequently, the composition for electrolyte is injected into the pouch-like outer package member 60. Thereafter, the outer package member 60 is hermetically sealed with the use of a thermal fusion bonding method and/or the like. Subsequently, the monomer is thermally polymerized, and thereby, a polymer compound is formed. Accordingly, the polymer compound is impregnated with the electrolytic solution, the polymer compound gelates, and accordingly, the electrolyte layer 56 is formed.

In the third procedure, the spirally wound body is fabricated and contained in the pouch-like outer package member 60 in a manner similar to that of the foregoing second procedure described above, except that the separator 55 with both surfaces coated with a polymer compound is used. Examples of the polymer compound with which the separator 55 is coated may include a polymer (a homopolymer, a copolymer, or a multicomponent copolymer) containing vinylidene fluoride as a component. Specific examples of the homopolymer may include polyvinylidene fluoride. Specific examples of the copolymer may include a binary copolymer containing vinylidene fluoride and hexafluoro propylene as components. Specific examples of the multicomponent copolymer may include a ternary copolymer containing vinylidene fluoride, hexafluoro propylene, and chlorotrifluoroethylene as components. It is to be noted that, in addition to the polymer containing vinylidene fluoride as a component, other one or more polymer compounds may be used. Subsequently, an electrolytic solution is prepared and injected into the outer package member 60. Thereafter, the opening of the outer package member 60 is hermetically sealed with the use of a thermal fusion bonding method and/or the like. Subsequently, the resultant is heated while a weight is applied to the outer package member 60, and the separator 55 is adhered to the cathode 53 and the anode 54 with the polymer compound in between. Thereby, the polymer compound is impregnated with the electrolytic solution, and accordingly, the polymer compound is gelated to form the electrolyte layer 56.

In the third procedure, swollenness of the secondary battery is suppressed more than in the first procedure. Further, in the third procedure, the monomer as a raw material of the polymer compound, the solvent, and the like are less likely to be left in the electrolyte layer 56 compared to in the second procedure. Therefore, the formation step of the polymer compound is favorably controlled. Therefore, the cathode 53, the anode 54, and the separator 55 sufficiently adhere to the electrolyte layer 56.

[Function and Effect of Secondary Battery]

According to the laminated-film-type secondary battery, the physicality of the cathode 53 satisfies the foregoing first condition and the foregoing second condition. Therefore, battery characteristics are allowed to be improved for a reason similar to that of the square-type secondary battery. Other functions and other effects are similar to those of the square-type secondary battery.

[2-4. Lithium Metal Secondary Battery]

A secondary battery described here is a lithium secondary battery (a lithium metal secondary battery) in which the capacity of the anode 22 is represented by precipitation and dissolution of lithium metal. The secondary battery has a configuration similar to that of the foregoing lithium ion secondary battery (the square-type lithium ion secondary battery), except that the anode active material layer 22B is formed of the lithium metal, and is manufactured by a procedure similar to that of the foregoing lithium ion secondary battery (the square-type lithium ion secondary battery).

In the secondary battery, the lithium metal is used as an anode active material, and therefore, higher energy density is obtainable. The anode active material layer 22B may exist at the time of assembling, or the anode active material layer 22B does not necessarily exist at the time of assembling and may be formed of the lithium metal precipitated at the time of charge. Further, the anode active material layer 22B may be used as a current collector, and thereby, the anode current collector 22A may be omitted.

The secondary battery may operate, for example, as follows. At the time of charge, when lithium ions are discharged from the cathode 21, the lithium ions are precipitated as the lithium metal on the surface of the anode current collector 22A through the electrolytic solution. In contrast, at the time of discharge, when the lithium metal is eluded in the electrolytic solution as lithium ions from the anode active material layer 22B, the lithium ions are inserted in the cathode 21 through the electrolytic solution.

According to the square-type lithium metal secondary battery, the physicality of the cathode 22 satisfies the foregoing first condition and the foregoing second condition. Therefore, battery characteristics are allowed to be improved for a reason similar to that of the lithium ion secondary battery. Other functions and other effects are similar to those of the square-type lithium ion secondary battery. It is to be noted that the battery structure of the lithium metal secondary battery described here is not limited to the square type, and may be cylindrical type or a laminated-film type. In that case, similar effects are obtainable as well.

[3. Other Secondary Battery Using Electrode]
[Configuration and Operation of Secondary Battery]

The secondary battery described here has a configuration similar to that of the foregoing square-type secondary battery described in [2. Secondary Battery Using Electrode], except that the configuration of the cathode 21 and the composition of the electrolytic solution are different, and operates as the square-type secondary battery does. In the following description, explanation of configurations similar to those of the square-type secondary battery will be omitted as needed.

The cathode 21 in steps before an after-mentioned conservation step of the secondary battery may have a configuration similar to that of the cathode 21 in the foregoing square-type secondary battery, except that, for example, the cathode 21 does not include the coat 21C. In contrast, the cathode 21 in steps after the conservation step of the secondary battery may have a configuration similar to that of the cathode 21 in the foregoing square-type secondary battery, except that, for example, the cathode 21 includes a coat 21D instead of the coat 21C, for example, as illustrated in FIG. 4. The coat 21D is subsequently formed after assembling the secondary battery (in the conservation step), differently from the coat 21C previously formed before assembling the secondary battery (at the time of fabricating the cathode 21).

The electrolytic solution has a composition similar to that of the electrolytic solution in the foregoing square-type secondary battery, except that the electrolytic solution described here contains any one or more of unsaturated cyclic compounds represented by the following Formula (8).

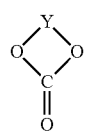

(8)

In Formula (8), Y is a divalent group in which p-number of >C=CR8R9 and q-number of >CR10R11 are bound in any order; each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more thereof; any two or more of R8 to R11 may be bound to one another; and p and q satisfy $p \geq 1$ and $q \geq 0$.

The unsaturated cyclic compound refers to a cyclic ester carbonate having one or more unsaturated bonds (>C=C< as carbon-carbon double bonds). However, the foregoing unsaturated cyclic ester carbonate (such as vinylene carbonate) is excluded from the unsaturated cyclic compound described here. One reason why the electrolytic solution contains the unsaturated cyclic compound is that, in this case, by the conservation step of the secondary battery, the coat 21D attributable to the unsaturated cyclic compound is formed on the surface of the cathode active material layer 21B. Therefore, even if the coat 21C is not previously formed on the surface of the cathode active material layer 21B, the coat 21D having a protective function similar to that of the coat 21C is obtained.

Y in Formula (8) is a group obtained by binding p-number of >C=CR8R9 to q-number of >CR10R11 so that the valency becomes divalent as a whole (one binding hand exists on each of both ends). Adjacent groups (groups bound to each other) may be the same type of group such as >C=CR8R9 and >C=CR8R9, or may be different from each other such as >C=CR8R9 and >CR10R11. That is, the number (p) of >C=CR8R9 and the number (q) of >CR10R11 that are used for forming the divalent group may be any number, and the binding order thereof may also be any order.

While >C=CR8R9 is a divalent unsaturated group having the foregoing carbon-carbon double bond, >CR10R11 is a divalent saturated group not having a carbon-carbon double bond. Since q satisfies $q \geq 0$, >CR10R11 as a saturated group may be included in Y, and is not necessarily included in Y. In contrast, since p satisfies $p \geq 1$, it may be necessary to include one or more >C=CR8R9 as an unsaturated group in Y typically. Accordingly, Y may be configured of only >C=CR8R9, or may be configured of both >C=CR8R9 and >CR10R11. One reason for this is that it may be necessary to include one or more unsaturated groups in a chemical structure of the unsaturated cyclic compound.

Values of p and q are not particularly limited as long as the conditions of $p \geq 1$ and $q \geq 0$ are satisfied. In particular, in the case where >C=CR8R9 is >C=CH$_2$ and >CR10R11 is >CH$_2$, $(p+q) \leq 5$ may be preferably satisfied. One reason for this is that, in this case, the carbon number of Y is not excessively large, and therefore, the solubility and the compatibility of the unsaturated cyclic compound are secured.

It is to be noted that any two or more of R8 to R11 in >C=CR8R9 and >CR10R11 may be bound to one another, and the bound groups may form a ring. As an example, R8 may be bound to R9, R10 may be bound to R11, and R9 may be bound to R10 or R11.

Details of R8 to R11 will be described below. R8 to R11 may be the same type of group, or may be groups different from one another. Any two or three of R8 to R11 may be the same type of group.

Each type of R8 to R11 is not particularly limited as long as each of R8 to R11 is any one or more of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more thereof. One reason for this is that, since, in this case, Y has one or more carbon-carbon double bonds (>C=CR8R9), the foregoing advantage is obtainable without depending on the types of R8 to R11.

The halogen group may be, for example, one or more of a fluorine group (—F), a chlorine group (—Cl), a bromine group (—Br), an iodine group (—I), and the like. In particular, the fluorine group may be preferable, since a higher effect is thereby obtainable.

"Monovalent hydrocarbon group" is a generic term used to refer to monovalent groups configured of carbon and hydrogen, and may have a straight-chain structure or a branched structure having one or more side chains. Examples of the monovalent hydrocarbon group may include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive. One reason for this is that the foregoing advantage is thereby obtained while the solubility, the compatibility, and the like of the unsaturated cyclic compound are secured.

More specific examples of the alkyl group may include a methyl group (—CH$_3$), an ethyl group (—C$_2$H$_5$), and a propyl group (—C$_3$H$_7$). Examples of the alkenyl group may include a vinyl group (—CH=CH$_2$) and an allyl group (—CH$_2$—CH=CH$_2$). Examples of the alkynyl group may include an ethynyl group (—C≡CH). Examples of the aryl group may include a phenyl group and a naphtyl group. Examples of the cycloalkyl group may include a cyclopropyl group, a cyclobutyl group, a cyclopentyl group, a cyclohexyl group, a cycloheptyl group, and a cyclooctyl group.

"Monovalent oxygen-containing hydrocarbon group" is a generic term used to refer to monovalent groups configured of oxygen together with carbon and hydrogen. Examples of the monovalent oxygen-containing hydrocarbon group may include an alkoxy group with carbon number from 1 to 12 both inclusive. One reason for this is that the foregoing advantage is thereby obtained while the solubility, the compatibility, and the like of the unsaturated cyclic ester carbonate are secured. More specific examples of the alkoxy group may include a methoxy group (—OCH$_3$) and an ethoxy group (—OC$_2$H$_5$).

"Monovalent halogenated hydrocarbon group" is obtained by substituting (halogenating) each of part or all of hydrogen groups (—H) out of the foregoing monovalent hydrocarbon group by a halogen group. Similarly, "monovalent halogenated oxygen-containing hydrocarbon group" is obtained by substituting each of part or all of hydrogen groups out of the foregoing monovalent oxygen-containing hydrocarbon group by a halogen group. In either case, types of the halogen group substituting for a hydrogen group are similar to the types of the halogen group described above.

Examples of the monovalent halogenated hydrocarbon group may include a group obtained by halogenating the foregoing alkyl group or the like. That is, the monovalent halogenated hydrocarbon group is a group obtained by substituting each of part or all of hydrogen groups of the foregoing alkyl group or the like by a halogen group. More specific examples of the group obtained by halogenating an alkyl group or the like may include a trifluoromethyl group (—CF$_3$) and a pentafluoroethyl group (—C$_2$F$_5$). Further, examples of the monovalent halogenated oxygen-containing hydrocarbon group may include a group obtained by substituting each of part or all of hydrogen groups of the foregoing alkoxy group or the like by a halogen group. More specific examples of the group obtained by halogenating an alkoxy group or the like may include a trifluoromethoxy group (—OCF$_3$) and a pentafluoroethoxy group (—OC$_2$F$_5$).

The foregoing "group obtained by binding two or more thereof" may be, for example, a group obtained by binding two or more of the foregoing alkyl group and the like so that the whole valency becomes monovalent as a whole. Examples thereof may include a group obtained by binding an alkyl group to an aryl group and a group obtained by binding an alkyl group to a cycloalkyl group. More specific examples of the group obtained by binding an alkyl group to an aryl group may include a benzyl group.

It is to be noted that each of R8 to R11 may be a group other than the foregoing groups. Specifically, each of R8 to R11 may be, for example, a derivative of each of the foregoing groups. The derivative is obtained by introducing one or more substituent groups to each of the foregoing groups. Substituent group types may be any type.

In particular, the unsaturated cyclic compound may preferably contain any one or more of compounds represented by the following Formula (9) and the following Formula (10). One reason for this is that, in this case, the foregoing advantage is obtained, and such compounds are allowed to be easily synthesized.

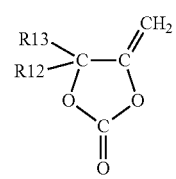

(9)

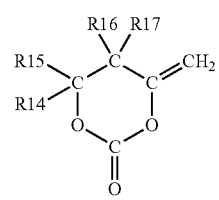

(10)

In Formulas (9) and (10), each of R12 to R17 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more thereof; R12 and R13 may be bound to each other; and any two or more of R14 to R17 may be bound to one another.

Focusing attention on a relation between Formula (8) and Formula (9), the unsaturated cyclic compound shown in Formula (9) has, as Y in Formula (8), one unsaturated group (>C=CH$_2$) corresponding to >C=CR8R9 and one saturated group (>CR12R13) corresponding to >CR10R11. In contrast, focusing attention on a relation between Formula (8) and Formula (10), the unsaturated cyclic compound shown in Formula (10) has, as Y, one unsaturated group (>C=CH$_2$) corresponding to >C=CR8R9 and two saturated groups (>CR14R15 and >CR16R17) corresponding to >CR10R11. However, the foregoing one unsaturated group and the foregoing two saturated groups are bound in order of >CR14R15, >CR16R17, and C=CH$_2$.

Details of R12 and R13 in Formula (9) and R14 to R17 in Formula (10) are similar to those of R8 to R11 in Formula (8), and therefore, description thereof will be omitted.

Specific examples of the unsaturated cyclic compound may include any one or more of compounds represented by the following Formula (8-1) to the following Formula (8-56). Such compounds include a geometric isomer. However, specific examples of the unsaturated cyclic carbonic acid compound are not limited to the compounds listed in Formula (8-1) to Formula (8-56).

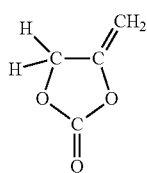
(8-1)

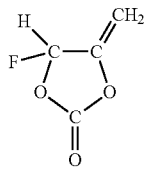
(8-2)

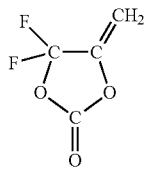
(8-3)

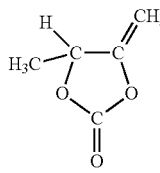
(8-4)

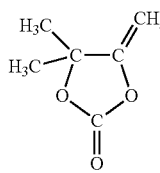
(8-5)

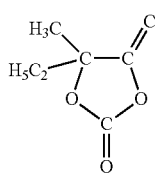
(8-6)

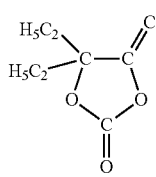
(8-7)

-continued

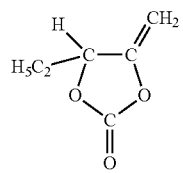
(8-8)

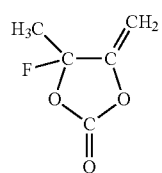
(8-9)

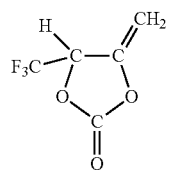
(8-10)

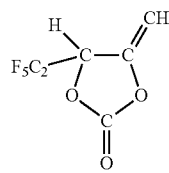
(8-11)

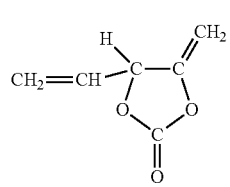
(8-12)

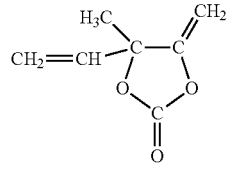
(8-13)

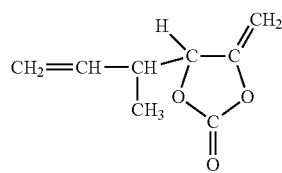
(8-14)

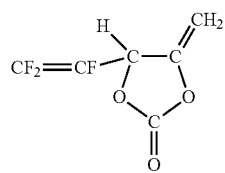
(8-15)

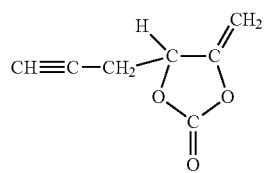
(8-16)

(8-17) 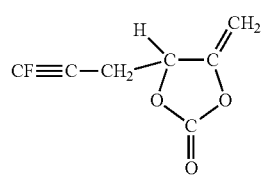
(8-18) 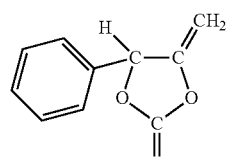
(8-19) 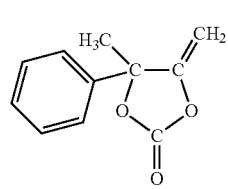
(8-20) 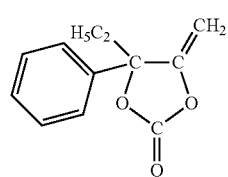
(8-21) 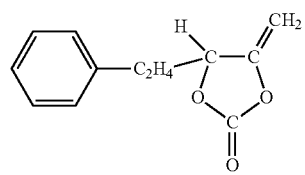
(8-22) 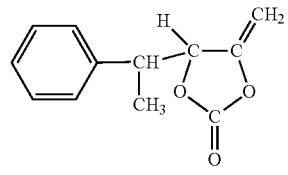
(8-23) 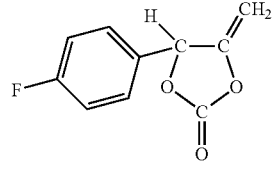
(8-24) 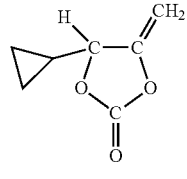
(8-25) 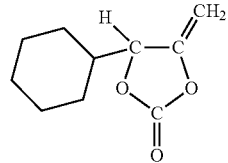
(8-26) 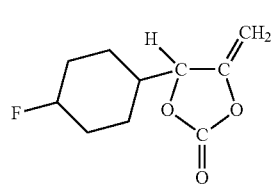
(8-27) 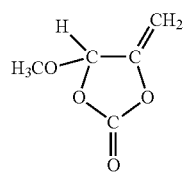
(8-28) 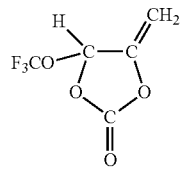
(8-29) 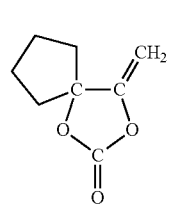
(8-30) 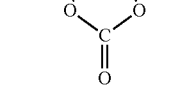
(8-31) 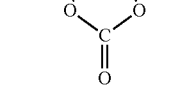
(8-32) 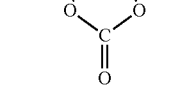
(8-33) 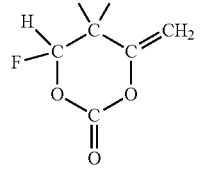

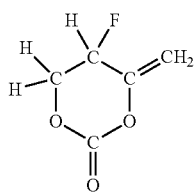 (8-34)
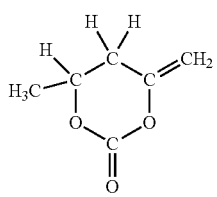 (8-35)
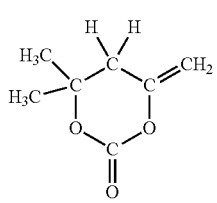 (8-36)
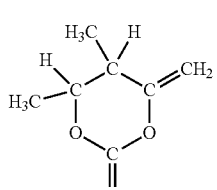 (8-37)
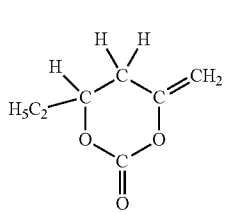 (8-38)
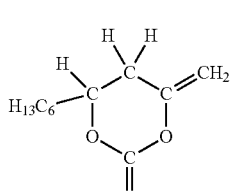 (8-39)
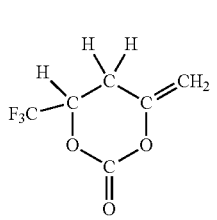 (8-40)
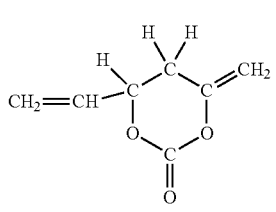 (8-41)
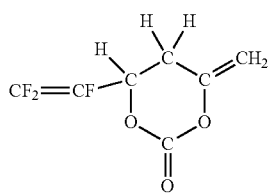 (8-42)
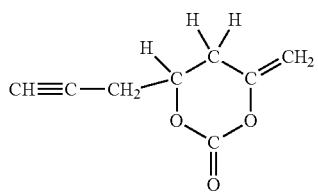 (8-43)
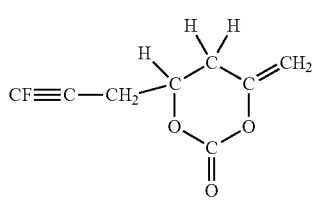 (8-44)
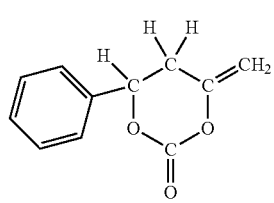 (8-45)
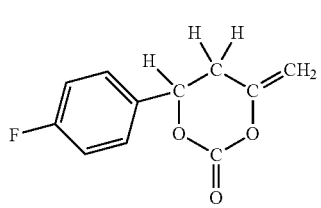 (8-46)
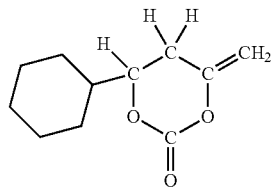 (8-47)
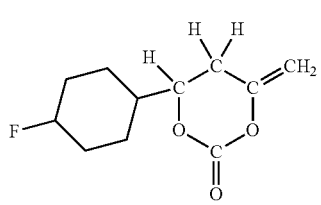 (8-48)
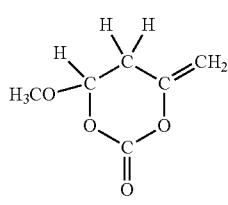 (8-49)

-continued

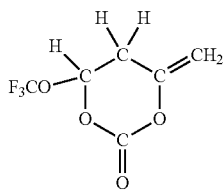
(8-50)

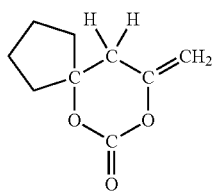
(8-51)

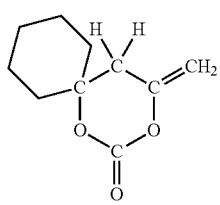
(8-52)

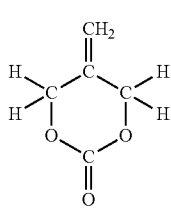
(8-53)

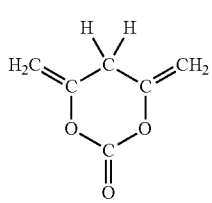
(8-54)

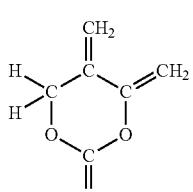
(8-55)

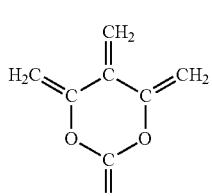
(8-56)

In particular, Formula (8-1) and the like corresponding to Formula (9) or Formula (8-32) and the like corresponding to Formula (10) may be preferable, since a higher effect is thereby obtainable.

Although the content of the unsaturated cyclic compound in the electrolytic solution is not particularly limited, in particular, the content thereof may be preferably from 0.01 wt % to 10 wt % both inclusive, and may be more preferably from 1 wt % to 5 wt % both inclusive, since a higher effect is thereby obtainable.

[Method of Manufacturing Secondary Battery]

The secondary battery may be manufactured, for example, by the following procedure.

First, the secondary battery is assembled by a procedure similar to the foregoing method of manufacturing the square-type secondary battery, except that the cathode 21 not containing the coat 21C is fabricated and an electrolytic solution containing an unsaturated cyclic compound is prepared. At the time of assembling the secondary battery, the coat 21D is not formed on the surface of the cathode active material layer 21B yet.

Next, after the secondary battery is charged and discharged until a fully-discharged state, the secondary battery is conserved in such a fully-discharged state.

Although the charge-discharge conditions are not particularly limited, the charge-discharge conditions may be, for example, as follows. The environmental temperature may be, for example, ambient temperature (about 23 deg C.). It may be preferable that, for example, the number of charge and discharge be not excessively large, and be about two (two cycles). The charge-discharge conditions may be arbitrary, as long as the secondary battery is allowed to be discharged until a fully-discharged state. For example, the upper limit value (the upper limit charging voltage) of a voltage at the time of charge may be equal to or larger than about 4.2 V, and may be preferably from about 4.2 V to about 4.8 V both inclusive. The lower limit value (the lower limit discharging voltage) of a voltage at the time of discharge may be equal to or smaller than about 3.3 V, and may be preferably from about 2 V to about 3.3 V both inclusive. Further, both a charging current and a discharging current may be, for example, from about 0.2 C to about 1 C both inclusive. It is to be noted that the term "fully-discharged state" refers to a state in which the secondary battery is discharged until the foregoing lower limit discharging voltage. Further, "0.2 C" refers to a current value at which the battery capacity (theoretical capacity) is fully discharged in five hours, and "1 C" refers to a current value at which the battery capacity is fully discharged in one hour.

Although the conservation conditions are not particularly limited, the conservation conditions may be, for example, as follows. Although the environmental temperature may be, for example, normal temperature, the environmental temperature may be preferably high temperature equal to or higher than 45 deg C. One reason for this is that, in this case, the coat 21D becomes further rigid. The conservation time may be, for example, equal to or longer than several hours, may be preferably equal to or longer than several days, and may be preferably from about one week to about two weeks both inclusive. One reason for this is that, in this case, the coat 21D may be easily formed, and physical strength of the coat 21D and the like are improved and stabilized.

By the foregoing conservation step, the coat 21D attributable to the unsaturated cyclic compound in the electrolytic is formed on the surface of the cathode active material layer 21B. Since mainly the secondary battery that has been charged and discharged until the appropriate battery state (the fully-discharged state) is conserved (left), the coat 21D may be formed on the surface of the cathode active material layer 21B while, for example, the unsaturated compounds in the electrolytic are polymerized.

Thereby, the secondary battery is completed. It is to be noted that in the secondary battery in its completed state (after forming the coat 21D), the unsaturated cyclic compound may remain in the electrolytic solution, or may not remain in the electrolytic. However, the unsaturated cyclic compound may preferably remain in the electrolytic solution. One reason for this is that, in the course of charge and discharge after completion of the secondary battery (such as at the point of use of the secondary battery), the coat 21D is easily formed additionally on the surface of the cathode active material layer 21B even if the coat 21D is, for example, decomposed being influenced by such charge and discharge.

[Coat]

The configuration (formation materials, physicality, and the like) of the coat 21D formed by the foregoing conservation step is similar to the configuration of the coat 21C. Accordingly, in order to secure the protective function of the coat 21D, the surface analytical result of the cathode 21 by XPS satisfies the conditions (the first and the second conditions) similar to those of the square-type secondary battery including the coat 21C.

As described below, the coat 21D is formed firstly in the specific conservation step of the secondary battery, and is not formed in a general conservation step.

In general, the secondary battery after completion is shipped in a so-called semi-discharged state. The term "semi-discharged state" is a state in which the battery voltage of the secondary battery is higher than the voltage in the foregoing fully-discharged state, and such a battery voltage is a voltage higher than the foregoing lower limit discharging voltage. Thereby, in a general conservation step, even if a secondary battery is conserved for any purpose before shipment, the secondary battery is not conserved in a fully-discharged state, and therefore, the coat 21D is not formed.

In contrast, in the specific conservation step, in order to create a special battery state allowing the coat 21D to be formed in its conservation course, a secondary battery after assembly and before shipment is conserved (left) in a fully-discharged state. In this case, an unsaturated cyclic compound in the electrolytic solution is reacted, and a reactant of the unsaturated cyclic compound and the like form a film on the surface of the cathode active material layer 21B. Thereby, the coat 21D attributable to the unsaturated cyclic compound is formed on the surface of the cathode active material layer 21B. The secondary battery after being subjected to the special conservation step is shipped in a state in which the coat 21D is formed instead of the coat 12C even if the coat 21C is not formed before the conservation step.

[Function and Effect of Secondary Battery]

According to the secondary battery, the physicality of the cathode 21 satisfies the foregoing first condition and the foregoing second condition. In this case, for a reason similar to that of the foregoing square-type secondary battery, a decomposition reaction of the electrolytic solution is suppressed without large inhibition of insertion and extraction of lithium by the cathode active material. Therefore, battery characteristics are allowed to be improved. Other functions and other effects are similar to those of the foregoing square-type secondary battery.

It is to be noted that the configuration of the secondary battery described here is not limited to the square type, and may be applied to the cylindrical type or a laminated-film type. In the cylindrical-type secondary battery, for example, as illustrated in FIG. 6, by a conservation step, a coat 41D having a function similar to that of the coat 21D is formed on the surface of the cathode active material layer 41B. Further, in the laminated-film-type secondary battery, for example, as illustrated in FIG. 9, a coat 53D having a function similar to that of the coat 21D is formed on the surface of the cathode active material layer 53B. It goes without saying that since the coats 41D and 53D are formed, the foregoing first condition and the foregoing second condition are satisfied with regard to photoelectron spectrums (O1s) obtained by surface analysis of the cathodes 41 and 53 with the use of XPS. Therefore, effects similar to those of the square-type secondary battery are obtainable.

[4. Applications of Secondary Battery]

Next, description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the case where the secondary battery is used as an auxiliary electric power source, the main electric power source type is not limited to the secondary battery.

Examples of applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used for a notebook personal computer or the like as an attachable and detachable electric power source; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved with the use of the secondary battery according to the embodiment of the present application. It is to be noted that the battery pack is an electric power source using a secondary battery, and is a so-called assembled battery or the like. The electric vehicle is a vehicle that works (runs) with the use of a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, since electric power is stored in the secondary battery as an electric power storage source, the electric power is utilized, and thereby, home electric products and the like become usable. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Description will be specifically given of some application examples of the secondary battery. It is to be noted that the configurations of the respective application examples explained below are merely examples, and may be changed as appropriate.

[4-1. Battery Pack]

Figure 10:
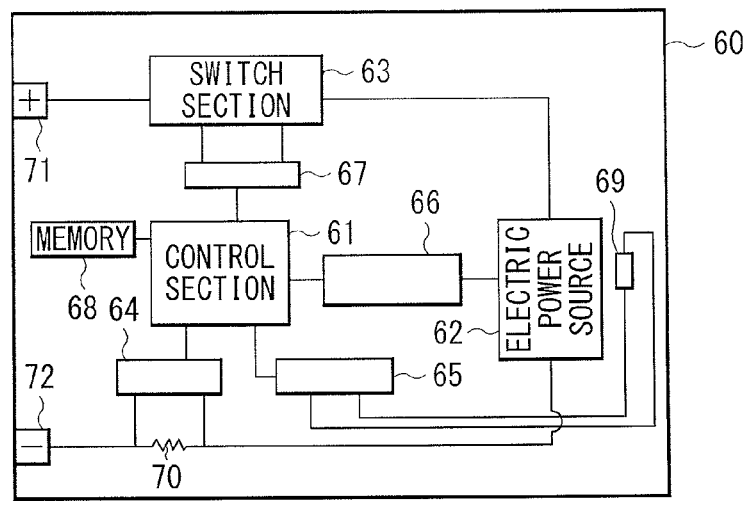
FIG. 10 is a block diagram illustrating a configuration of an application example (a battery pack) of the secondary battery.

FIG. 10 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection element 69, a current detection resistance 70, a cathode terminal 71, and an anode terminal 72 in a housing 60 made of a plastic material and/or the like.

The control section 61 controls operation of the whole battery pack (including operation of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type of these secondary batteries may be a series-connected type, may be a parallel-connected type, or a mixed type thereof. As an example, the electric power source 62 may include six secondary batteries connected in a manner of dual-parallel and three-series.

The switch section 63 switches the operation of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection element 69, and outputs the measurement result to the control section 61. The temperature measurement result may be used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 executes control so that a charging current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charging current.

Further, the switch control section 67 executes control so that a discharging current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. It is to be noted that, for example, in the case where a large current flows at the time of discharge, the switch control section 67 blocks the discharging current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a non-volatile memory or the like. The memory 68 may store, for example, numerical values calculated by the control section 61, information of the secondary battery measured in a manufacturing step (such as an internal resistance in the initial state), and the like. It is to be noted that, in the case where the memory 68 stores a full charging capacity of the secondary battery, the control section 61 is allowed to comprehend information such as a remaining capacity.

The temperature detection element 69 measures temperature of the electric power source 62, and outputs the measurement result to the control section 61. The temperature detection element 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

[4-2. Electric Vehicle]

Figure 11:
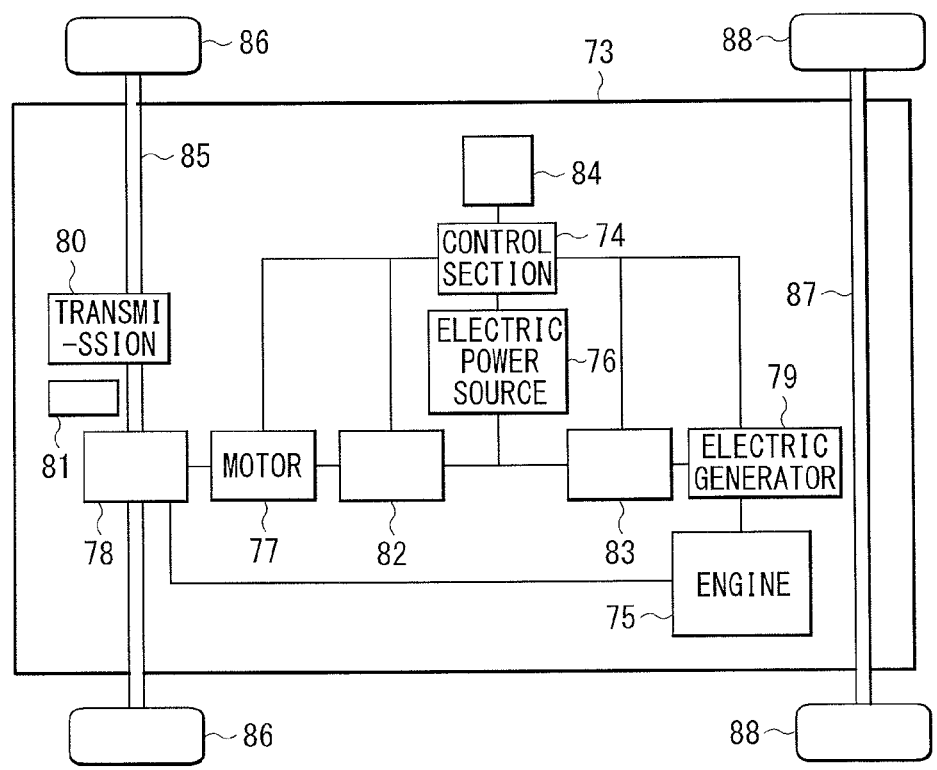
FIG. 11 is a block diagram illustrating a configuration of an application example (an electric vehicle) of the secondary battery.

FIG. 11 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle may run with the use, for example, of one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. Due to the torque, the electric generator 79 generates alternating-current electric power. The alternating-current electric power is converted into direct-current electric power through the inverter 83, and the converted power is stored in the electric power source 76. In contrast, in the case where the motor 77 as a conversion section is used as a power source, electric power (direct-current electric power) supplied from the electric power source 76 is converted into alternating-current electric power through the inverter 82. The motor 77 may be driven by the alternating-current electric power. Drive power (torque) obtained by converting the electric power by the motor 77 may be transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It may be preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

It is to be noted that the description has been given above of the hybrid automobile as an electric vehicle. However, examples of the electric vehicles may include a vehicle (electric automobile) working with the use of only the electric power source 76 and the motor 77 without using the engine 75.

[4-3. Electric Power Storage System]

Figure 12:
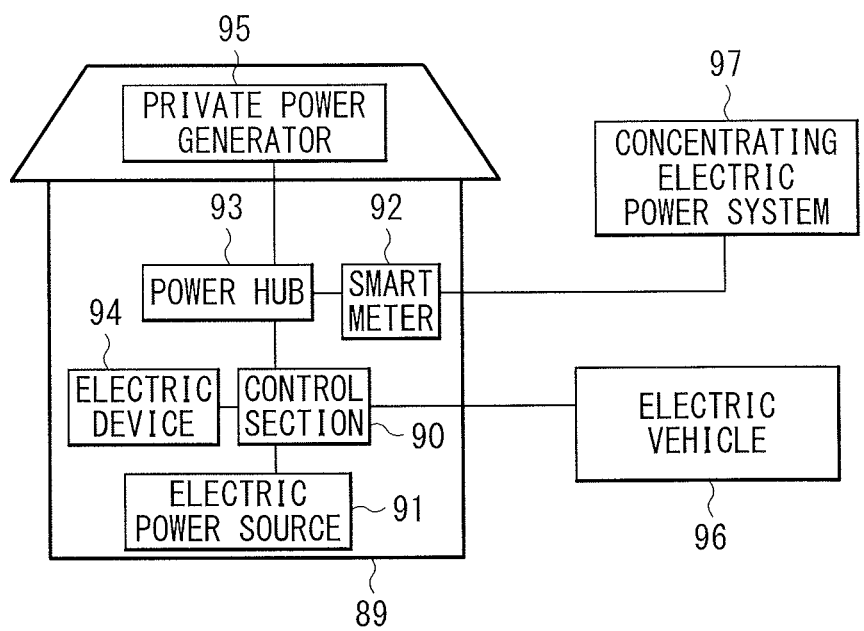
FIG. 12 is a block diagram illustrating a configuration of an application example (an electric power storage system) of the secondary battery.

FIG. 12 illustrates a block configuration of an electric power storage system. For example, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connected to an electric vehicle 96 parked outside the house 89. Further, for example, the electric power source 91 may be connected to a private power generator 95 arranged inside the house 89 through the power hub 93, and may be connected to an external concentrating electric power system 97 thorough the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including operation of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside, the smart meter 92 controls the balance between supply and demand in the house 89 and allows effective and stable energy supply.

In the electric power storage system, for example, electric power may be stored in the electric power source 91 from the concentrating electric power system 97 as an external electric power source through the smart meter 92 and the power hub 93, and electric power may be stored in the electric power source 91 from the private power generator 95 as an independent electric power source through the power hub 93. The electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

It is to be noted that the foregoing electric power storage system may be arranged for each household (family unit), or may be arranged for a plurality of households (family units).

[4-4. Electric Power Tool]

Figure 13:
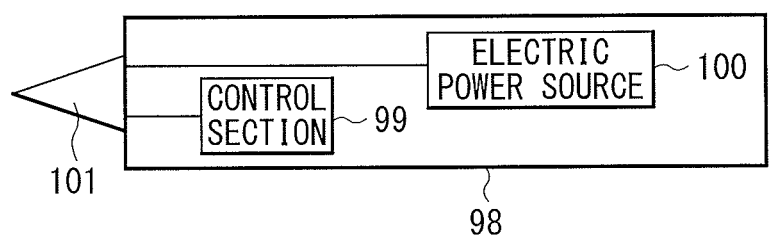
FIG. 13 is a block diagram illustrating a configuration of an application example (an electric power tool) of the secondary battery.

FIG. 13 illustrates a block configuration of an electric power tool. For example, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including operation of the electric power source 100), and may include, for example, a CPU and/or the like. The electric power source 100 includes one or more secondary batteries (not illustrated). The control section 99 allows electric power to be supplied from the electric power source 100 to the drill section 101 according to operation of an unillustrated operation switch to operate the drill section 101.

EXAMPLES

Specific Examples according to the embodiment of the present application will be described in detail.

Examples 1-1 to 1-12

The square-type lithium ion secondary battery illustrated in FIG. 2 to FIG. 4 was fabricated by the following procedure.

Upon fabricating the cathode 21, first, 91 parts by mass of a cathode active material (a bedded salt-type lithium-containing composite oxide: LiO1), 3 parts by mass of a cathode binder (polyvinylidene fluoride), and 6 part by mass of a cathode electric conductor (graphite) were mixed to obtain a cathode mixture. The composition of the bedded salt-type lithium-containing composite oxide was as illustrated in Table 1. Subsequently, the cathode mixture was dispersed in an organic solvent (N-methyl-2-pyrrolidone) to obtain paste cathode mixture slurry. Subsequently, both surfaces of the strip-shaped cathode current collector 21A (an aluminum foil being 20 μm thick) were uniformly coated with the cathode mixture slurry with the use of a coating equipment, and the cathode mixture slurry was dried to form the cathode active material layer 21B. In this case, the thickness of the cathode active material layer 21B was adjusted so that lithium metal was not precipitated on the anode 22 at the time of usage of the secondary battery (at the time of full charge). Subsequently, the cathode active material layer 21B was compression-molded with the use of a roll pressing machine. Subsequently, a formation material (a polymer compound) of the coat 21C was dissolved in an organic solvent (N-methyl-2-pyrrolidone) to prepare a process solution. Types and molar weights (weight average molar weights) of the polymer compound were as illustrated in Table 1. Finally, the surface of the cathode active material layer 21B was coated with the process solution, and the process solution was dried to form the coat 21C. It is to be noted that for comparison, the cathode 21 was fabricated by a similar procedure, except that the coat 21C was not formed.

When surface analysis was performed on the coat 21C with the use of XPS, photoelectron spectrums (O1s) illustrated in FIG. 14 to FIG. 17 were obtained. Details of the analyzer and the analytical conditions were as described above. Numbers (1-1 to 1-4 and 1-9 to 1-12) affixed to the spectrums correspond to the numbers of Examples. Spectrum intensities IA to IC were examined with the use of photoelectron spectrums (O1s), and thereafter, the ratio IB/IA and the ratio IC/IA were obtained. Results illustrated in Table 1 were obtained.

Upon fabricating the anode 22, first, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (N-methyl-2-pyrrolidone) to obtain paste anode mixture slurry. Subsequently, both surfaces of the strip-shaped anode current collector 22A (an electrolytic copper foil being 15 μm thick) were uniformly coated with the anode mixture slurry with the use of a coating equipment, and the anode mixture slurry was dried to form the anode active material layer 22B. Finally, the anode active material layer 22B was compression-molded with the use of a roll pressing machine.

Upon preparing an electrolytic solution, an electrolyte salt ($LiPF_6$) was dissolved in a solvent (ethylene carbonate and dimethyl carbonate). In this case, the solvent composition at a weight ratio was ethylene carbonate:dimethyl carbonate=30:70, and the content of the electrolyte salt with respect to the solvent was 1 mol/kg.

Upon assembling the secondary battery, first, the cathode 21 and the anode 22 were layered with the separator 23 (a microporous polypropylene film being 25 μm thick) in between and were spirally wound to form a spirally wound body. Thereafter, the spirally-wound body was formed in the flat shape to fabricate the battery element 20. Subsequently, the battery element 20 was contained in the battery can 11 made of iron, and thereafter, the insulating plate 12 was laid on the battery element 20. Subsequently, the cathode lead 24 made of aluminum was welded to the cathode current collector 21A, and the anode lead 25 made of nickel was welded to the anode current collector 22A. In this case, the battery cover 13 was fixed to the open end of the battery can 11 with the use of a laser welding method. Finally, an electrolytic solution was injected into the battery can 11 from the injection hole 19, the separator 23 was impregnated with the electrolytic solution, and thereafter, the injection hole 19 was sealed by the sealing member 19A. Thereby, the square-type secondary battery was completed.

As battery characteristics of the secondary battery, cycle characteristics and conservation characteristics were examined. Results illustrated in Table 1 were obtained.

Upon examining the cycle characteristics, in order to stabilize the battery state, one cycle of charge and discharge was performed on the secondary battery in the ambient temperature environment (23 deg C.). Thereafter, the secondary battery was further charged and discharged one cycle in the same environment to measure the discharging capacity. Subsequently, the secondary battery was repeatedly charged and discharged in the same environment until the total number of cycles reached 100 cycles to measure the discharging capacity. From the measurement result, [cycle retention ratio (%)=(discharging capacity at the 100th cycle/discharging capacity at the second cycle)×100] was calculated. At the time of charge, charge was performed at current density of 1 mA/cm² until the voltage reached 4.2 V, and subsequently, charge was performed at a voltage of 4.2 V until the current density reached 0.02 mA/cm². At the time of discharge, discharge was performed at constant current density of 1 mA/cm² until the voltage reached 3.0 V.

Upon examining the conservation characteristics, a secondary battery with the battery state being stabilized by a procedure similar to that in the case of examining the cycle characteristics was used. Such a secondary battery was charged and discharged one cycle in ambient temperature environment (23 deg C.) to measure the discharging capacity. Subsequently, the secondary battery after being charged again was conserved for 10 days in an ambient temperature bath (at 80 deg C.), and thereafter, the secondary battery was discharged in ambient temperature environment to measure the discharging capacity. From the result, [conservation retention ratio (%)=(discharging capacity after conservation/discharging capacity before conservation)×100] was calculated. Charge-discharge conditions were similar to those of the case of examining the cycle characteristics.

TABLE 1

| Example | Cathode active material Type | Cathode active material Composition | Coat Type | Coat Molar weight | Coat Ratio IB/IA | Coat Ratio IC/IA | Cycle retention ratio (%) | Conservation retention ratio (%) |
|---|---|---|---|---|---|---|---|---|
| 1-1 | LiO1 | $LiCo_{0.98}Al_{0.01}Mg_{0.01}O_2$ | Formula (3-1) | 50000 | 1.51 | 0.51 | 85 | 90 |
| 1-2 | | $LiNi_{0.5}Co_{0.2}Mn_{0.3}O_2$ | | | 4.79 | 1.64 | 86 | 91 |
| 1-3 | | $LiNi_{0.8}Co_{0.15}Al_{0.05}O_2$ | | | 5.55 | 2.91 | 82 | 92 |
| 1-4 | | $Li_{1.2}Mn_{0.525}Ni_{0.175}Co_{0.1}O_2$ | | | 4.21 | 1.32 | 81 | 88 |
| 1-5 | | $LiCo_{0.98}Al_{0.01}Mg_{0.01}O_2$ | Formula | 100000 | 1.61 | 0.72 | 82 | 88 |

TABLE 1-continued

| | Cathode active material | | Coat | | Ratio IB/IA | Ratio IC/IA | Cycle retention ratio (%) | Conservation retention ratio (%) |
|---------|-------------------------|------|--------|--------|-------|-------|-----|-----|
| Example | Type | Composition | Type | Molar weight | | | | |
| 1-6 | | $LiNi_{0.5}Co_{0.2}Mn_{0.3}O_2$ | (3-1) | | 4.80 | 1.71 | 83 | 87 |
| 1-7 | | $LiNi_{0.8}Co_{0.15}Al_{0.05}O_2$ | | | 5.65 | 3.06 | 80 | 90 |
| 1-8 | | $Li_{1.2}Mn_{0.525}Ni_{0.175}Co_{0.1}O_2$ | | | 4.25 | 1.42 | 79 | 84 |
| 1-9 | | $LiCo_{0.98}Al_{0.01}Mg_{0.01}O_2$ | — | — | 0.56 | 0.20 | 76 | 81 |
| 1-10 | | $LiNi_{0.5}Co_{0.2}Mn_{0.3}O_2$ | | | 2.59 | 0.89 | 78 | 82 |
| 1-11 | | $LiNi_{0.8}Co_{0.15}Al_{0.05}O_2$ | | | 2.77 | 0.91 | 75 | 80 |
| 1-12 | | $Li_{1.2}Mn_{0.525}Ni_{0.175}Co_{0.1}O_2$ | | | 0.97 | 0.30 | 70 | 78 |
| 1-13 | | $LiCo_{0.98}Al_{0.01}Mg_{0.01}O_2$ | Formula (3-1) | 50000 | 0.94 | 0.32 | 80 | 88 |
| 1-14 | | $LiNi_{0.5}Co_{0.2}Mn_{0.3}O_2$ | | | 3.62 | 0.95 | 80 | 84 |
| 1-15 | | $LiNi_{0.8}Co_{0.15}Al_{0.05}O_2$ | | | 3.80 | 0.96 | 79 | 81 |
| 1-16 | | $Li_{1.2}Mn_{0.52}Ni_{0.175}Co_{0.10}O_2$ | | | 1.28 | 0.86 | 74 | 79 |

LiO1: bedded salt-type lithium-containing composite oxide

Both the cycle retention ratio and the conservation retention ratio were changed according to the ratio IB/IA and the ratio IC/IA. Specifically, the cycle retention ratio and the conservation retention ratio were significantly increased without depending on the molecular weight of the formation material (the polymer compound) of the coat 21C when each of the ratio IB/IA and the ratio IC/IA was larger than 1, compared to a case in which each of the ratio IB/IA and the ratio IC/IA was equal to or less than 1.

The foregoing result shows the following tendency. As is clear from correspondence relation between photoelectron spectrums (O1s) illustrated in FIG. 14 to FIG. 17 and the result illustrated in Table 1, each of the ratio IB/IA and the ratio IC/IA largely affects the cycle retention ratio and the conservation retention ratio.

Figure 14:
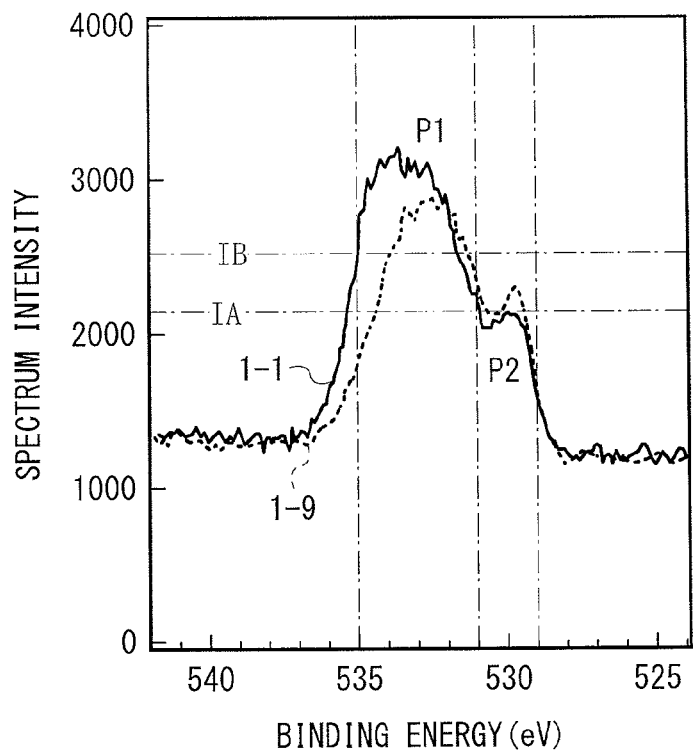
FIG. 14 illustrates photoelectron spectrums of oxygen 1s (Examples 1-1 and 1-9).
Figure 15:
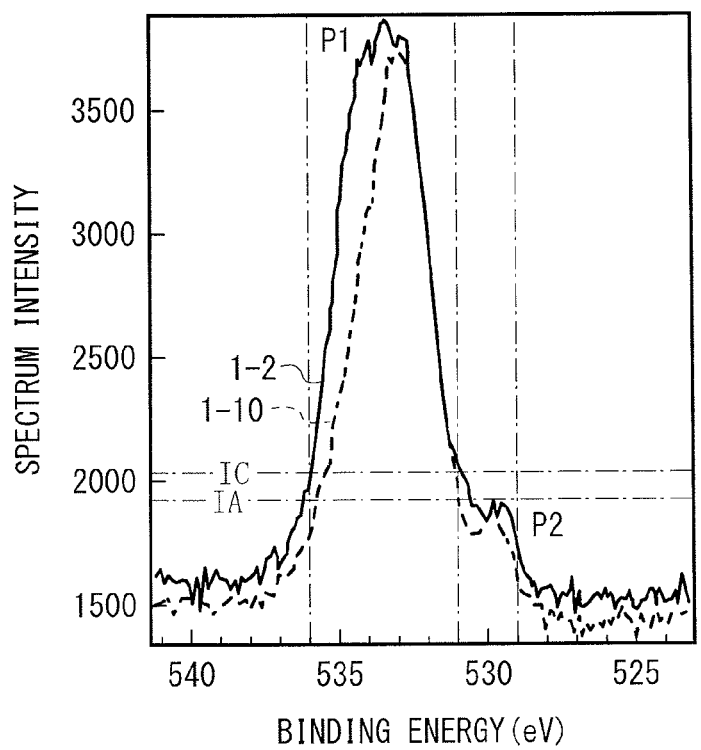
FIG. 15 illustrates photoelectron spectrums of oxygen 1s (Examples 1-2 and 1-10).
Figure 16:
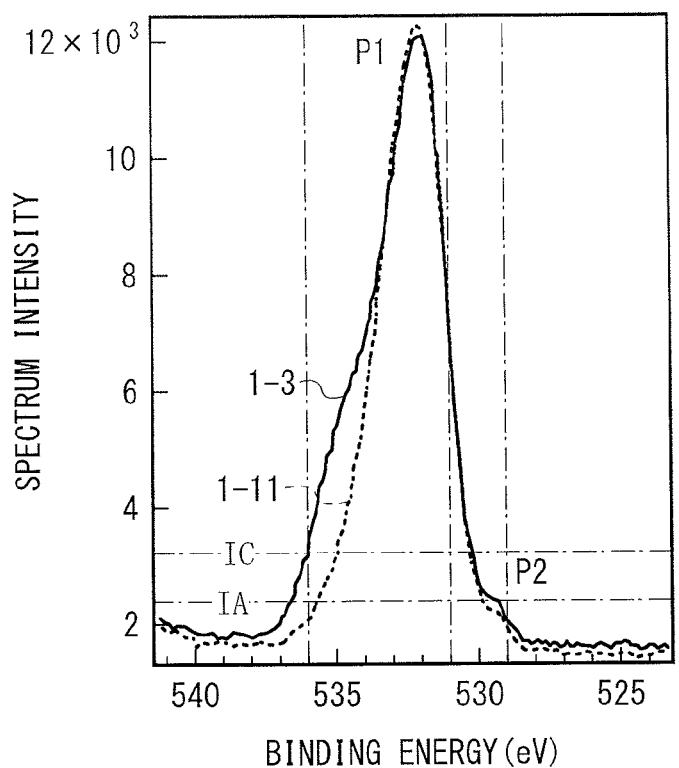
FIG. 16 illustrates photoelectron spectrums of oxygen 1s (Examples 1-3.
Figure 17:
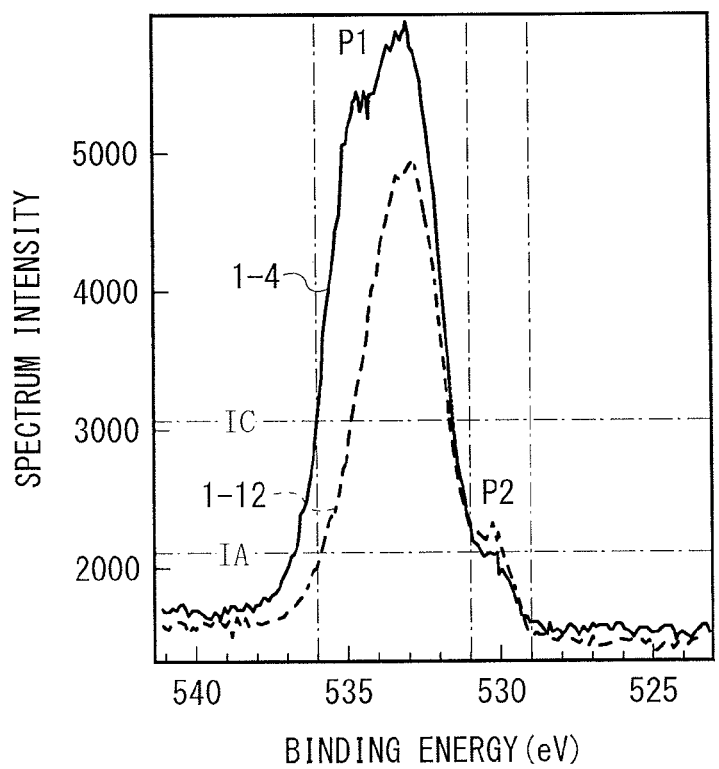
FIG. 17 illustrates photoelectron spectrums of oxygen 1s (Examples 1-4 and 1-12).

Specifically, in the photoelectron spectrums (O1s) illustrated in FIG. 14, first, attention is focused on the spectrum shape in the range in which the binding energy E is equal to or larger than 529 eV, and is less than 531 eV. In this case, in the case where the bedded salt-type lithium-containing composite oxide is used as a cathode active material, the specific peak P2 attributable to the bedded salt-type lithium-containing composite oxide is detected in the foregoing range. Next, attention is focused on the whole spectrum shape. In this case, in the case where the coat 21C is formed, the whole spectrum shape is deformed to expand to the side where the binding energy is large.

Therefore, attention is focused on the binding energy reflected by the foregoing deformation of the whole spectrum shape, specifically, attention is focused on the spectrum intensity in the binding energy of 535 eV. The spectrum intensity in the binding energy is largely increased according to formation of the coat 21C. More specifically, the foregoing spectrum intensity IA of the peak P2 is regarded as the reference. The spectrum intensity IB in the binding energy of 535 eV is sufficiently small with respect to the reference (IA) in the case where the coat 21C is not formed. In contrast, the spectrum intensity IB in the binding energy of 535 eV is sufficiently large with respect to the reference (IA) in the case where the coat 21C is formed.

In this case, as is clear from the result illustrated in Table 1, in the case where IB is larger than IA (the ratio IB/IA is larger than 1), both the cycle retention ratio and the conservation retention ratio are significantly increased compared to a case in which IB is smaller than IA (the ratio IB/IA is equal to or less than 1).

From the foregoing results, the ratio IB/IA is an index to determine presence or absence of the coat 21C capable of contributing to increase of each of the cycle retention ratio and the conservation retention ratio. Specifically, in the case where the coat 21C is not formed, the ratio IB/IA is equal to or less than 1, and therefore, both the cycle retention ratio and the conservation retention ratio are kept low. In contrast, in the case where the coat 21C is formed, the ratio IB/IA is larger than 1, and therefore, both the cycle retention ratio and the conservation retention ratio are largely increased.

Therefore, both the cycle retention ratio and the conservation retention ratio are improved according to formation of the coat 21C. In addition thereto, presence or absence of the coat 21C is allowed to be determined according to a value of the ratio IB/IA. It is to be noted that the foregoing contents of the correspondence relation between the photoelectron spectrums (O1s) illustrated in FIG. 14 and the results (the ratio IB/IA) illustrated in Table 1 are similarly applicable to correspondence relation between the photoelectron spectrums (O1s) illustrated in FIG. 15 to FIG. 17 and the results (the ratio IC/IA) illustrated in Table 1.

Examples 2-1 to 2-3

Secondary batteries were fabricated by a procedure similar to those of Examples 1-1 to 1-12, except that an olivine-type lithium-containing phosphate compound (LiO2) was used as a cathode active material as illustrated in Table 2, and the various characteristics of the secondary batteries were examined. Further, surface analysis of the coat 21C was performed with the use of XPS, and thereby, the photoelectron spectrums (O1s) illustrated in FIG. 18 were obtained. In this case, after the spectrum intensities ID and IE were examined with the use of the photoelectron spectrums (O1s), the ratio IE/ID was obtained. Results illustrated in Table 2 were obtained.

TABLE 2

| | Cathode active material | | Coat | | Ratio IB/IA | Cycle retention ratio (%) | Conservation retention ratio (%) |
|---------|------|-------------|---------------|--------------|-------|-----|-----|
| Example | Type | Composition | Type | Molar weight | | | |
| 2-1 | LiO2 | $LiFePO_4$ | Formula (3-1) | 50000 | 0.50 | 93 | 94 |

TABLE 2-continued

| Example | Cathode active material Type | Cathode active material Composition | Coat Type | Coat Molar weight | Ratio IB/IA | Cycle retention ratio (%) | Conservation retention ratio (%) |
|---|---|---|---|---|---|---|---|
| 2-2 | | LiFePO$_4$ | Formula (3-1) | 100000 | 0.53 | 92 | 94 |
| 2-3 | | LiFePO$_4$ | — | — | 0.12 | 90 | 92 |

LiO2: olivine-type lithium-containing phosphate compound

In the case where the olivine-type lithium-containing phosphate compound was used as a cathode active material, a result similar to that of the case in which the bedded salt-type lithium-containing composite oxide was used was obtained. That is, the cycle retention ratio and the conservation retention ratio were significantly increased without depending on the molecular weight of the formation material (the polymer compound) of the coat 21C when the ratio IE/ID was larger than ¼, compared to a case in which the ratio IE/ID was equal to or less than ¼.

The foregoing result shows the following tendency. As is clear from correspondence relation between the photoelectron spectrums (O1s) illustrated in FIG. 18 and the results illustrated in Table 2, the ratio IE/ID largely affects the cycle retention ratio and the conservation retention ratio.

Figure 18:
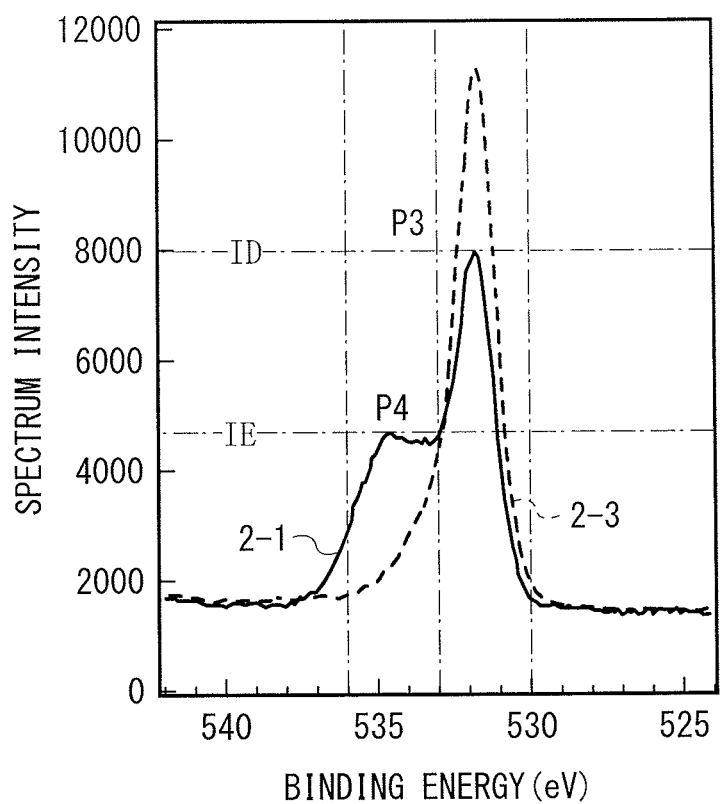
FIG. 18 illustrates photoelectron spectrums of oxygen 1s (Examples 2-1 and 2-3).

Specifically, in the photoelectron spectrums (O1s) illustrated in FIG. 18, first, attention is focused on the spectrum shape in the range in which the binding energy is equal to or larger than 530 eV and is less than 533 eV. In this case, in the case where the olivine-type lithium-containing phosphate compound is used as a cathode active material, the specific peak P3 attributable to the olivine-type lithium-containing phosphate compound is detected in the foregoing range. Next, attention is focused on the spectrum shape in the range in which the binding energy is equal to or larger than 533 eV and is equal to or less than 536 eV. In this case, in the case where the coat 21C is formed, the specific peak P4 attributable to formation of the coat 21C is detected in the foregoing range, and therefore, the spectrum intensity is locally increased in such a range.

Therefore, attention is focused on the spectrum intensity IE of the peak P4. When the spectrum intensity ID of the foregoing peak P3 is regarded as the reference, the spectrum intensity IE of the peak P4 is sufficiently small with respect to the reference (ID) in the case where the coat 21C is not formed, while the spectrum intensity IE of the peak P4 is sufficiently large in the case where the coat 21C is formed.

In this case, as is clear from the results illustrated in Table 2, in the case where IE is larger than ¼ of ID (the ratio IE/ID is larger than ¼), both the cycle retention ratio and the conservation retention ratio are significantly increased compared to a case in which IE is equal to or less than ¼ of ID (the ratio IE/ID is equal to or less than ¼).

From the foregoing results, the ratio IE/ID is an index to determine presence or absence of the coat 21C capable of contributing to increase of each of the cycle retention ratio and the conservation retention ratio, as the foregoing ratio IB/IA and the foregoing ratio IC/IA are. Specifically, in the case where the coat 21C is not formed, the ratio IE/ID is equal to or less than ¼, and therefore, both the cycle retention ratio and the conservation retention ratio are kept low. In contrast, in the case where the coat 21C is formed, the ratio IE/ID is larger than ¼, and therefore, both the cycle retention ratio and the conservation retention ratio are largely increased.

Therefore, both the cycle retention ratio and the conservation retention ratio are improved according to formation of the coat 21C. In addition thereto, presence or absence of the coat 21C is allowed to be determined according to a value of the ratio IE/ID.

Examples 3-1 to 3-8

Square-type lithium ion secondary batteries were fabricated by a procedure similar to those of Examples 1-1 to 1-12, except that an unsaturated cyclic compound was contained in the electrolytic solution instead of formation of the coat 21C, and the secondary batteries after assembly were conserved in a fully-discharged state, and the various characteristics of the secondary batteries were examined.

Upon preparing the electrolytic solution, an electrolyte salt (LiPF$_6$) was dissolved in a solvent (ethylene carbonate and dimethyl carbonate), and thereafter, the unsaturated cyclic compound was added thereto. Types of the unsaturated cyclic compound were as illustrated in Table 3. In this case, the solvent composition at a weight ratio was ethylene carbonate:dimethyl carbonate=30:70, the content of the electrolyte salt with respect to the solvent was 1 mol/kg, and the content of the unsaturated cyclic compound in the electrolytic solution was 2 wt %.

In a conservation step, two cycles of charge and discharge were performed on the assembled secondary battery to obtain a fully-discharged state, and such a secondary battery in the fully-discharged state was conserved in the ambient temperature environment (23 deg C.). Conservation conditions (the lower limit discharging voltage and conservation time) were as illustrated in Table 3. It is to be noted that charge-discharge conditions were similar to the charge-discharge conditions in the case of examining the cycle characteristics, except that the lower limit discharging voltages were set to voltages illustrated in Table 3. By such a conservation step, the coat 21D was formed on the surface of the cathode active material layer 21B. It is to be noted that, for comparison, secondary batteries were fabricated by a similar procedure, except that the secondary batteries were not conserved (the coat 21D was not formed).

For the conserved secondary batteries, surface analysis was performed on the cathode 21 with the use of XPS, and results similar to those of the photoelectron spectrums (O1s) illustrated in FIG. 14 to FIG. 17 were obtained. Details of the analyzer and the analytical conditions were as described above. Spectrum intensities IA to IC were examined with the photoelectron spectrums (O1s), and thereafter, the ratio IB/IA and the ratio IC/IA were obtained. Results illustrated in Table 3 were obtained.

TABLE 3

| Example | Cathode active material Type | Cathode active material Composition | Electrolytic solution Type | Electrolytic solution Conservation conditions | Ratio IB/IA | Ratio IC/IA | Cycle retention ratio (%) | Conservation retention ratio (%) |
|---|---|---|---|---|---|---|---|---|
| 3-1 | LiO1 | $LiCo_{0.98}Al_{0.01}Mg_{0.01}O_2$ | Formula (8-1) | 3 V, 1 week | 1.58 | 0.52 | 86 | 90 |
| 3-2 | | $LiNi_{0.5}Co_{0.2}Mn_{0.3}O_2$ | | | 4.81 | 1.66 | 86 | 92 |
| 3-3 | | $LiNi_{0.8}Co_{0.15}Al_{0.05}O_2$ | | 2.5 V, 1 week | 5.45 | 2.88 | 83 | 93 |
| 3-4 | | $Li_{1.2}Mn_{0.525}Ni_{0.175}Co_{0.1}O_2$ | | | 4.24 | 1.35 | 82 | 88 |
| 3-5 | | $LiCo_{0.98}Al_{0.01}Mg_{0.01}O_2$ | Formula (8-1) | — | 0.58 | 0.22 | 80 | 85 |
| 3-6 | | $LiNi_{0.5}Co_{0.2}Mn_{0.3}O_2$ | | | 2.61 | 0.88 | 82 | 83 |
| 3-7 | | $LiNi_{0.8}Co_{0.15}Mn_{0.05}O_2$ | | | 2.68 | 0.84 | 78 | 82 |
| 3-8 | | $Li_{1.2}Mn_{0.525}Ni_{0.175}Co_{0.1}O_2$ | | | 0.99 | 0.32 | 75 | 80 |

LiO1: bedded salt-type lithium-containing composite oxide

In the case where the unsaturated cyclic compound was contained in the electrolytic solution and the coat 21D was formed subsequently in the conservation step, results similar to those of the case (Table 1) in which the coat 21C was previously formed were obtained as well. That is, the cycle retention ratio and the conservation retention ratio were significantly increased without depending on the voltage value in the fully-discharged state when each of the ratio IB/IA and the ratio IC/IA was larger than 1, compared to a case in which each of the ratio IB/IA and the ratio IC/IA was equal to or less than 1.

Examples 4-1 and 4-2

Secondary batteries were fabricated by a procedure similar to those of Examples 3-1 to 3-8, except that an olivine-type lithium-containing phosphate compound was used as a cathode active material as illustrated in Table 4, and the various characteristics of the secondary batteries were examined. Further, surface analysis of the cathode 21 was performed with the use of XPS, and thereby, results similar to the photoelectron spectrums (O1s) illustrated in FIG. 18 were obtained. In this case, after the spectrum intensities ID and IE were examined with the use of the photoelectron spectrums (O1s), the ratio IE/ID was obtained. Results illustrated in Table 4 were obtained.

TABLE 4

| Example | Cathode active material Type | Cathode active material Composition | Coat Type | Coat Conservation conditions | Ratio IE/ID | Cycle retention ratio (%) | Conservation retention ratio (%) |
|---|---|---|---|---|---|---|---|
| 4-1 | LiO2 | $LiFePO_4$ | Formula (8-1) | 2.5 V, 1 week | 0.51 | 94 | 94 |
| 4-2 | | $LiFePO_4$ | — | — | 0.13 | 90 | 93 |

LiO2: olivine-type lithium-containing phosphate compound

In the case where the olivine-type lithium-containing phosphate compound was used as a cathode active material, a result similar to that of the case in which the bedded salt-type lithium-containing composite oxide was used was obtained as well. That is, the cycle retention ratio and the conservation retention ratio were significantly increased when the ratio IE/ID was larger than $1/4$, compared to a case in which the ratio IE/ID was equal to or less than $1/4$.

Examples 5-1 to 5-5

For reference, secondary batteries were fabricated by a procedure similar to those of Examples 3-1 to 3-8, except that other compounds were contained in electrolytic solutions instead of the unsaturated cyclic compound, and the various characteristics of the secondary batteries were examined. Such other compounds used here were vinylene carbonate (VC) as an unsaturated cyclic ester carbonate and 4-fluoro-1,3-dioxole-2-one (FEC) as halogenated ester carbonate.

TABLE 5

| Example | Cathode active material Type | Cathode active material Composition | Electrolytic solution Type | Electrolytic solution Conservation conditions | Ratio IB/IA | Ratio IC/IA | Cycle retention ratio (%) | Conservation retention ratio (%) |
|---|---|---|---|---|---|---|---|---|
| 5-1 | LiO1 | $LiCo_{0.98}Al_{0.01}Mg_{0.01}O_2$ | VC | 3 V, 1 week | 0.68 | 0.34 | 77 | 82 |
| 5-2 | | $LiNi_{0.5}Co_{0.2}Mn_{0.3}O_2$ | | | 2.82 | 0.91 | 78 | 82 |
| 5-3 | | $LiNi_{0.8}Co_{0.15}Al_{0.05}O_2$ | | 2.5 V, 1 week | 2.80 | 0.94 | 76 | 80 |
| 5-4 | | $Li_{1.2}Mn_{0.525}Ni_{0.175}Co_{0.1}O_2$ | | | 0.98 | 0.39 | 72 | 79 |
| 5-5 | | $LiCo_{0.98}Al_{0.01}Mg_{0.01}O_2$ | FEC | 3 V, 1 week | 0.58 | 0.24 | 73 | 80 |
| 5-6 | | $LiNi_{0.5}Co_{0.2}Mn_{0.3}O_2$ | | | 2.68 | 0.89 | 76 | 80 |

TABLE 5-continued

| | Cathode active material | | Electrolytic solution | | Ratio IB/IA | Ratio IC/IA | Cycle retention ratio (%) | Conservation retention ratio (%) |
|---|---|---|---|---|---|---|---|---|
| Example | Type | Composition | Type | Conservation conditions | | | | |
| 5-7 | | $LiNi_{0.8}Co_{0.15}Mn_{0.05}O_2$ | | 2.5 V, 1 week | 2.78 | 0.90 | 74 | 78 |
| 5-8 | | $Li_{1.2}Mn_{0.525}Ni_{0.175}Co_{0.1}O_2$ | | | 0.97 | 0.32 | 70 | 75 |
| 5-9 | | $LiCo_{0.98}Al_{0.01}Mg_{0.01}O_2$ | VC | — | 0.62 | 0.30 | 78 | 83 |
| 5-10 | | $LiNi_{0.5}Co_{0.2}Mn_{0.3}O_2$ | | | 2.77 | 0.90 | 80 | 84 |
| 5-11 | | $LiNi_{0.8}Co_{0.15}Al_{0.05}O_2$ | | | 2.80 | 0.93 | 76 | 81 |
| 5-12 | | $Li_{1.2}Mn_{0.525}Ni_{0.175}Co_{0.1}O_2$ | | | 0.98 | 0.35 | 72 | 80 |
| 5-13 | | $LiCo_{0.98}Al_{0.01}Mg_{0.01}O_2$ | FEC | — | 0.58 | 0.23 | 74 | 81 |
| 5-14 | | $LiNi_{0.5}Co_{0.2}Mn_{0.3}O_2$ | | | 2.62 | 0.89 | 77 | 81 |
| 5-15 | | $LiNi_{0.8}Co_{0.15}Mn_{0.05}O_2$ | | | 2.77 | 0.90 | 74 | 79 |
| 5-16 | | $Li_{1.2}Mn_{0.525}Ni_{0.175}Co_{0.1}O_2$ | | | 0.96 | 0.31 | 70 | 78 |

LiO1: bedded salt-type lithium-containing composite oxide

As illustrated in Table 4, in the case where the secondary battery in which the unsaturated cyclic compound was contained in the electrolytic solution was conserved in the fully-discharged state, the coat 21D was formed in the conservation step. Therefore, it might be that when a compound (VC or FEC) other than the unsaturated cyclic compound is used, the 21D would be formed in the conservation step similarly.

However, as illustrated in Table 5, in the case where other compound (VC or FEC) was contained in the electrolytic solution, both the ratio IB/IA and the ratio IC/IA became equal to or less than 1 without depending on presence or absence of the conservation step. On the contrary, when the conservation step was performed, the cycle retention ratio was equal to or less than that in the case where the conservation step was not performed, and the conservation retention ratio was decreased compared to that in the case where the conservation step was not performed. Such a result shows the following fact. That is, the advantageous tendency that due to formation of the coat 21D in the conservation step, the cycle retention ratio and the conservation retention ratio were increased with the use of the protective function of the coat 21D is an advantage that is obtainable only when the unsaturated cyclic compound is used, and that is not obtainable when other compound is used.

From the results of Table 1 to Table 5, in the case where a photoelectron spectrum (O1s) obtained by surface analysis of a cathode with the use of XPS satisfied the foregoing first condition and the foregoing second condition, superior battery characteristics were obtained.

The present application has been described with reference to the embodiment and Examples. However, the present application is not limited to the examples described in the embodiment and Examples, and various modifications may be made. For example, the description has been given with the specific examples of the case in which the battery structure is the square-type, the cylindrical-type, or the laminated-film-type, and the battery element has the spirally wound structure. However, applicable structures are not limited thereto. The secondary battery of the present application is similarly applicable to a battery having other battery structure such as a coin-type battery and a button-type battery, or a battery in which the battery element has other structure such as a laminated structure.

Further, the electrode of the present application is applicable not only to a secondary battery, but also to other electrochemical devices. Examples of such other electrochemical devices may include a capacitor.

Further, with regard to the ratio IB/IA, the description has been given of the appropriate range derived from the results of Examples. However, the description does not totally deny a possibility that the ratio IB/IA is out of the foregoing appropriate range. That is, the foregoing appropriate range is a range particularly preferable for obtaining the effects of the present application. Therefore, as long as the effects of the present application are obtained, the ratio IB/IA may be out of the foregoing appropriate range in some degrees. The same is similarly applicable to the ratio IC/IA and the ratio IE/ID.

It is possible to achieve at least the following configurations from the above-described example embodiments of the disclosure.

(1) A secondary battery including:
   a cathode;
   an anode; and
   a non-aqueous electrolytic solution, wherein
   (A) the cathode includes a first lithium-containing compound having a bedded salt-type crystal structure,
      the first lithium-containing compound includes one or more metal elements (M: one or more metal elements other than lithium (Li)) as constituent elements,
      a photoelectron spectrum (horizontal axis: binding energy (electron volt), vertical axis: spectrum intensity) of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak,
      when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and
      when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, or (B) the cathode includes a second lithium-containing compound having an olivine-type crystal structure,
a photoelectron spectrum (horizontal axis: binding energy (electron volt), vertical axis: spectrum intensity) of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and
a ratio IE/ID between a spectrum intensity ID of the third peak and a spectrum intensity IE of the fourth peak is larger than ¼.

(2) The secondary battery according to (1), wherein
the cathode includes a cathode active material layer and a coat provided on the cathode active material layer, and
the photoelectron spectrum of oxygen 1s in the (A) and the photoelectron spectrum of oxygen 1s in the (B) are obtained by surface analysis of the coat.

(3) The secondary battery according to (2), wherein
the coat includes a polymer compound, and
the polymer compound includes oxygen (O) as a constituent element in a repeating unit.

(4) The secondary battery according to (3), wherein
the polymer compound includes a carbonic acid bond (—O—C(=O)—O—) in the repeating unit.

(5) The secondary battery according to (4), wherein the polymer compound includes one or more of compounds each represented by a following Formula (1) and a following formula (2),

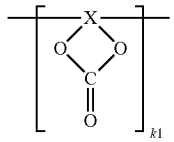
(1)

where X is a divalent group in which one number of ≡C—CH$_2$—, m-number of >C═CR1R2, and n-number of >CR3R4 are bound in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more of the hydrogen group, the halogen group, the monovalent hydrocarbon group, the monovalent oxygen-containing hydrocarbon group, the monovalent halogenated hydrocarbon group, and the monovalent halogenated oxygen-containing hydrocarbon group; any two or more of R1 to R4 may be bound to one another; and k1, m, and n satisfy k1≥1, m≥0 and n≥0,

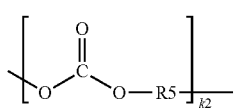
(2)

where R5 is one of a divalent hydrocarbon group, a divalent oxygen-containing hydrocarbon group, a divalent halogenated hydrocarbon group, a divalent halogenated oxygen-containing hydrocarbon group, and a group obtained by binding two or more of the divalent hydrocarbon group, the divalent oxygen-containing hydrocarbon group, the divalent halogenated hydrocarbon group, and the divalent halogenated oxygen-containing hydrocarbon group; and k2 satisfies k2≥1.

(6) The secondary battery according to (5), wherein
the halogen group is any of a fluorine group, a chlorine group, a bromine group, and an iodine group,
the monovalent hydrocarbon group is any of an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive,
the monovalent oxygen-containing hydrocarbon group is an alkoxy group with carbon number from 1 to 12 both inclusive,
the monovalent halogenated hydrocarbon group is a group obtained by substituting each of part or all of hydrogen groups out of the monovalent hydrocarbon group by the halogen group,
the monovalent halogenated oxygen-containing hydrocarbon group is a group obtained by substituting each of part or all of hydrogen groups out of the monovalent oxygen-containing hydrocarbon group by the halogen group,
the divalent hydrocarbon group is any of an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, and a cycloalkylene group with carbon number from 3 to 18 both inclusive,
the divalent oxygen-containing hydrocarbon group is a group obtained by binding one or more divalent hydrocarbon groups to one or more oxygen bonds (—O—) in any order,
the divalent halogenated hydrocarbon group is a group obtained by substituting each of part or all of hydrogen groups of the divalent hydrocarbon group by the halogen group, and,
the divalent halogenated oxygen-containing hydrocarbon group is a group obtained by substituting each of part or all of hydrogen groups of the divalent oxygen-containing hydrocarbon group by the halogen group.

(7) The secondary battery according to (5) or (6), wherein the compound shown in the Formula (1) is a compound represented by a Formula (3),

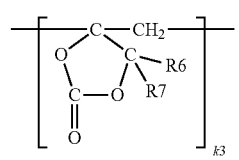
(3)

where each of R6 and R7 is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by binding two or more of the hydrogen group, the halogen group, the monovalent hydrocarbon group, the monovalent halogenated hydrocarbon group, the monovalent oxygen-containing hydrocarbon group, and the monovalent halogenated oxygen-containing hydrocarbon group; R6 and R7 may be bound to each other; and k3 satisfies k3≥1.

(8) The secondary battery according to (1), wherein the nonaqueous electrolytic solution includes an unsaturated cyclic compound represented by a following Formula (8), and the photoelectron spectrum of oxygen 1s in the (A) and the photoelectron spectrum of oxygen 1s in the (B) are obtained by the surface analysis of the cathode,

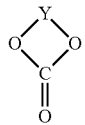
(8)

where Y is a divalent group in which p-number of >C=CR8R9 and q-number of >CR10R11 are bound in any order; each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more of the hydrogen group, the halogen group, the monovalent hydrocarbon group, the monovalent oxygen-containing hydrocarbon group, the monovalent halogenated hydrocarbon group, and the monovalent halogenated oxygen-containing hydrocarbon group; any two or more of R8 to R11 may be bound to one another; and p and q satisfy p≥1 and q≥0.

(9) The secondary battery according to (8), wherein the halogen group is any of a fluorine group, a chlorine group, a bromine group, and an iodine group, the monovalent hydrocarbon group is any of an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive, the monovalent oxygen-containing hydrocarbon group is an alkoxy group with carbon number from 1 to 12 both inclusive, the monovalent halogenated hydrocarbon group is a group obtained by substituting each of part or all of hydrogen groups out of the monovalent hydrocarbon group by the halogen group, and the monovalent halogenated oxygen-containing hydrocarbon group is a group obtained by substituting each of part or all of hydrogen groups out of the monovalent oxygen-containing hydrocarbon group by the halogen group.

(10) The secondary battery according to (8) or (9), wherein the compound represented by the Formula (8) includes one or more of compounds represented by a Formula (9) and a Formula (10),

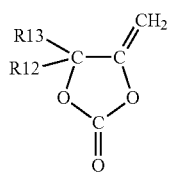
(9)

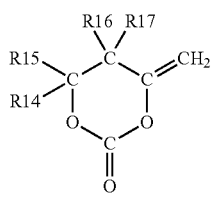
(10)

where each of R12 to R17 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more thereof; R12 and R13 may be bound to each other; and any two or more of R14 to R17 may be bound to one another.

(11) The secondary battery according to any one of (1) to (10), wherein the first lithium-containing compound includes one or more of compounds represented by a following Formula (4), and the second lithium-containing compound includes a compound represented by a following Formula (5), $$Li_aNi_{(1-b-c)}Mn_bM1_cO_{(2-d)}X_e \quad (4)$$

where M1 is one or more of elements (other than nickel (Ni) and manganese (Mn)) belonging to Group 2 to Group 15 in long-period periodic table; X is one or more of elements (other than oxygen (O)) belonging to Group 16 and Group 17 in the long-period periodic table; and a to e satisfy 0≤a≤1.5, 0≤b≤1, 0≤c≤1, −0.1≤d≤0.2, and 0≤e≤0.2, $$Li_aM2_bPO_4 \quad (5)$$

where M2 is one or more of elements belonging to Group 2 to Group 15 in the long-period periodic table; and a and b satisfy 0≤a≤2 and 0.5≤b≤2.

(12) The secondary battery according to (11), wherein the M1 includes cobalt (Co).

(13) The secondary battery according to any one of (1) to (12), wherein the secondary battery is a lithium secondary battery.

(14) An electrode, wherein (A) the electrode includes a first lithium-containing compound having a bedded salt-type crystal structure, the first lithium-containing compound includes one or more metal elements (M: one or more metal elements other than lithium (Li)) as constituent elements, a photoelectron spectrum (horizontal axis: binding energy (electron volt), vertical axis: spectrum intensity) of oxygen 1s obtained by surface analysis with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, or (B) the electrode includes a second lithium-containing compound having an olivine-type crystal structure, a photoelectron spectrum (horizontal axis: binding energy (electron volt), vertical axis: spectrum intensity) of oxygen 1s obtained by surface analysis with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

(15) A battery pack including:
the secondary battery according to any one of (1) to (13);
a control section configured to control operation of the secondary battery; and
a switch section configured to switch the operation of the secondary battery according to an instruction of the control section.

(16) An electric vehicle including:
the secondary battery according to any one of (1) to (13);
a conversion section configured to convert electric power supplied from the secondary battery into drive power;
a drive section configured to operate according to the drive power; and
a control section configured to control operation of the secondary battery.

(17) An electric power storage system including:
the secondary battery according to any one of (1) to (13);
one or more electric devices configured to be supplied with electric power from the secondary battery; and
a control section configured to control the supplying of the electric power from the secondary battery to the one or more electric devices.

(18) An electric power tool including:
the secondary battery according to any one of (1) to (13); and
a movable section configured to be supplied with electric power from the secondary battery.

(19) An electronic apparatus including the secondary battery according to any one of (1) to (13) as an electric power supply source.

(20) A method of manufacturing a secondary battery, the method including:
discharging the secondary battery until a fully-discharged state, the secondary battery including a cathode, an anode, and a non-aqueous electrolytic solution that includes an unsaturated cyclic compound; and
conserving the secondary battery in the fully-discharged state,
wherein the unsaturated cyclic compound is represented by the following formula (8):

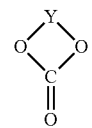
(8)

where Y is a divalent group in which p-number of $>C=CR8R9$ and q-number of $>CR10R11$ are bound in any order; each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more of the hydrogen group, the halogen group, the monovalent hydrocarbon group, the monovalent oxygen-containing hydrocarbon group, the monovalent halogenated hydrocarbon group, and the monovalent halogenated oxygen-containing hydrocarbon group; any two or more of R8 to R11 may be bound to one another; and p and q satisfy $p \geq 1$ and $q \geq 0$.

(21) The method of manufacturing a secondary battery according to (20), wherein the secondary battery is discharge until a voltage reaches equal to or less than 3.3 V.

(22) A secondary battery comprising:
a cathode;
an anode; and
a non-aqueous electrolytic solution, wherein
the cathode includes any one of a first lithium-containing compound and a second lithium-containing compound, the first lithium-containing compound having a bedded salt-type crystal structure,
the first lithium-containing compound includes one or more metal elements (M) other than lithium (Li),
a photoelectron spectrum of oxygen 1s associated with the first-lithium containing compound and having a horizontal axis representative of binding energy in electron volt and a vertical axis representative of spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak,
when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and
when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1,
wherein the second lithium-containing compound having an olivine-type crystal structure,
a photoelectron spectrum of oxygen 1s associated with the second lithium-containing compound and having a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

(23) The secondary battery according to claim (22), wherein the cathode includes a cathode active material layer and a coat provided on the cathode active material layer, and the photoelectron spectrum of oxygen 1s associated with the first lithium-containing compound and the photoelectron spectrum of oxygen 1s associated with the second lithium-containing compound are obtained by surface analysis of the coat.

(24) The secondary battery according to (23), wherein
the coat includes a polymer compound, and
the polymer compound includes a repeating unit that includes oxygen.

(25) The secondary battery according to (24), wherein
the polymer compound includes a carbonic acid bond (—O—C(=O)—O—) in the repeating unit.

(26) The secondary battery according to (25), wherein the polymer compound includes one or more of compounds each represented by a Formula (1) and Formula (2) as follows:

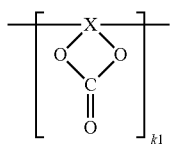

(1)

where X is a divalent group in which one number of =C—CH$_2$—, m-number of >C=CR1R2, and n-number of >CR3R4 are bound in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more of the hydrogen group, the halogen group, the monovalent hydrocarbon group, the monovalent oxygen-containing hydrocarbon group, the monovalent halogenated hydrocarbon group, and the monovalent halogenated oxygen-containing hydrocarbon group; any two or more of R1 to R4 are optionally bound to one another; and k1, m, and n satisfy k1≥1, m≥0 and n≥0,

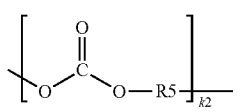

(2)

where R5 is one of a divalent hydrocarbon group, a divalent oxygen-containing hydrocarbon group, a divalent halogenated hydrocarbon group, a divalent halogenated oxygen-containing hydrocarbon group, and a group obtained by binding two or more of the divalent hydrocarbon group, the divalent oxygen-containing hydrocarbon group, the divalent halogenated hydrocarbon group, and the divalent halogenated oxygen-containing hydrocarbon group; and k2 satisfies k2≥1.

(27) The secondary battery according to (26) wherein
the halogen group is any of a fluorine group, a chlorine group, a bromine group, and an iodine group, the monovalent hydrocarbon group is any of an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive, the monovalent oxygen-containing hydrocarbon group is an alkoxy group with carbon number from 1 to 12 both inclusive, the monovalent halogenated hydrocarbon group is a group obtained by substituting each of part or all of hydrogen groups out of the monovalent hydrocarbon group by the halogen group, the monovalent halogenated oxygen-containing hydrocarbon group is a group obtained by substituting each of part or all of hydrogen groups out of the monovalent oxygen-containing hydrocarbon group by the halogen group, the divalent hydrocarbon group is any of an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, and a cycloalkylene group with carbon number from 3 to 18 both inclusive, the divalent oxygen-containing hydrocarbon group is a group obtained by binding one or more divalent hydrocarbon groups to one or more oxygen bonds (—O—) in any order, the divalent halogenated hydrocarbon group is a group obtained by substituting each of part or all of hydrogen groups of the divalent hydrocarbon group by the halogen group, and, the divalent halogenated oxygen-containing hydrocarbon group is a group obtained by substituting each of part or all of hydrogen groups of the divalent oxygen-containing hydrocarbon group by the halogen group.

(28) The secondary battery according to (26), wherein the compound shown in the Formula (1) is a compound represented by a Formula (3) as follows:

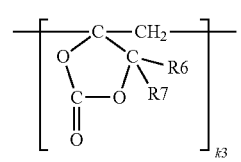

(3)

where each of R6 and R7 is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by binding two or more of the hydrogen group, the halogen group, the monovalent hydrocarbon group, the monovalent halogenated hydrocarbon group, the monovalent oxygen-containing hydrocarbon group, and the monovalent halogenated oxygen-containing hydrocarbon group; R6 and R7 may be bound to each other; and k3 satisfies k3≥1.

(29) The secondary battery according to (22), wherein
the nonaqueous electrolytic solution includes an unsaturated cyclic compound represented by a following Formula (8), and
the photoelectron spectrum of oxygen 1s associated with the first lithium-containing compound and the photoelectron spectrum of oxygen 1s associated with the second lithium-containing compound are obtained by the surface analysis of the cathode,

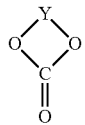

(8)

where Y is a divalent group in which p-number of >C=CR8R9 and q-number of >CR10R11 are bound in any order; each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more of the hydrogen group, the halogen group, the monovalent hydrocarbon group, the monovalent oxygen-containing hydrocarbon group, the monovalent halogenated hydrocarbon group, and the monovalent halogenated oxygen-containing hydrocarbon group; any two or more of R8 to R11 may be bound to one another; and p and q satisfy p≥1 and q≥0.

(30) The secondary battery according to (22), wherein
the first lithium-containing compound includes one or more of compounds represented by a following Formula (4), and
the second lithium-containing compound includes a compound represented by a following Formula (5),

(4)

where M1 is one or more of elements, other than nickel (Ni) and manganese (Mn), belonging to Group 2 to Group 15 in long-period periodic table; X is one or more of elements, other than oxygen (O), belonging to Group 16 and Group 17 in the long-period periodic table; and a to e satisfy 0≤a≤1.5, 0≤b≤1, 0≤c≤1, −0.1≤d≤0.2, and 0≤e≤0.2,

(5)

where M2 is one or more of elements belonging to Group 2 to Group 15 in the long-period periodic table; and a and b satisfy 0≤a≤2 and 0.5≤b≤2.

(31) The secondary battery according to (30), wherein the M1 includes cobalt (Co).

(32) The secondary battery according to (22), wherein the secondary battery is a lithium secondary battery.

(33) An electrode comprising any one of a first lithium-containing compound and a second lithium-containing compound, wherein
the first lithium-containing compound having a bedded salt-type crystal structure,
the first lithium-containing compound includes one or more metal elements (M) other than lithium (Li),
a photoelectron spectrum of oxygen 1s associated with the first lithium-containing compound and including a horizontal axis representative of a binding energy in electron volt and a vertical axis representative of a spectrum intensity, the photoelectron spectrum of oxygen is obtained by surface analysis with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak,
when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and
when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure,
a photoelectron spectrum of oxygen 1s associated with the second lithium-containing compound and including a horizontal axis representative of a binding energy in electron volts and a vertical axis representative of a spectrum intensity, the photoelectron spectrum of oxygen 1s obtained by surface analysis with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and
a ratio IE/ID between a spectrum intensity ID of the third peak and a spectrum intensity IE of the fourth peak is larger than ¼.

(34) A battery pack comprising:
a secondary battery;
a control section configured to control operation of the secondary battery; and
a switch section configured to switch the operation of the secondary battery according to an instruction of the control section, wherein
the secondary battery includes a cathode, an anode, and a nonaqueous electrolytic solution, and
the cathode includes any one of a first lithium-containing compound and a second lithium-containing compound, the first lithium-containing compound having a bedded salt-type crystal structure,
the first lithium-containing compound includes one or more metal elements (M) other than lithium,
a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1 wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

(35) An electric vehicle comprising:
a secondary battery;
a conversion section configured to convert electric power supplied from the secondary battery into drive power;
a drive section configured to operate according to the drive power; and
a control section configured to control operation of the secondary battery, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

(36) An electric power storage system comprising:
a secondary battery;
one or more electric devices configured to be supplied with electric power from the secondary battery; and
a control section configured to control the supplying of the electric power from the secondary battery to the one or more electric devices, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of binding energy in electron volt and a vertical axis representative of a spectrum intensity, the photoelectron spectrum of oxygen is obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than $1/4$.

(37) An electric power tool comprising:
a secondary battery; and
a movable section configured to be supplied with electric power from the secondary battery, wherein
the secondary battery includes a cathode, an anode, and a nonaqueous electrolytic solution, and
the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, the second lithium-containing compound having an olivine-type crystal structure, a photoelectron spectrum of oxygen 1s associated with second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than $1/4$.

(38) An electronic apparatus comprising a secondary battery as an electric power supply source, wherein
the secondary battery includes a cathode, an anode, and a nonaqueous electrolytic solution, and
the cathode includes any one of a first lithium-containing compound and a second lithium-containing compound the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen is obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
    a cathode;
    an anode; and
    a non-aqueous electrolytic solution, wherein
    the cathode includes any one of a first lithium-containing compound and a second lithium-containing compound, the first lithium-containing compound having a bedded salt-type crystal structure,
        the first lithium-containing compound includes one or more metal elements (M) other than lithium (Li),
        a photoelectron spectrum of oxygen 1s associated with the first-lithium containing compound and having a horizontal axis representative of binding energy in electron volt and a vertical axis representative of spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak,
        when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and
        when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1,
    wherein the second lithium-containing compound having an olivine-type crystal structure,
        a photoelectron spectrum of oxygen 1s associated with the second lithium-containing compound and having a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and
        a ratio IE/ID between a spectrum intensity ID of the third peak and a spectrum intensity IE of the fourth peak is larger than ¼;
    wherein the cathode includes a cathode active material layer and a coat provided on the cathode active material layer;
    wherein the photoelectron spectrum of oxygen 1s associated with the first lithium-containing compound and the photoelectron spectrum of oxygen 1s associated with the second lithium-containing compound are obtained by surface analysis of the coat;
    wherein the coat includes a polymer compound;
    wherein the polymer compound includes a repeating unit that includes oxygen; and
    wherein the polymer compound includes a carbonic acid bond (—O—C(=O)—O—) in the repeating unit.

2. The secondary battery according to claim 1, wherein the polymer compound includes one or more of compounds each represented by a Formula (1) and Formula (2) as follows:

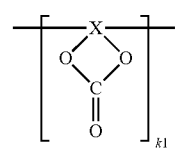

where X is a divalent group in which one number of =C—CH$_2$—, m-number of >C=CR1R2, and n-number of >CR3R4 are bound in any order; each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more of the hydrogen group, the halogen group, the monovalent hydrocarbon group, the monovalent oxygen-containing hydrocarbon group, the monovalent halogenated hydrocarbon group, and the monovalent halogenated oxygen-containing hydrocarbon group; any two or more of R1 to R4 are optionally bound to one another; and k1, m, and n satisfy k1≥1, m≥0 and n≥0,

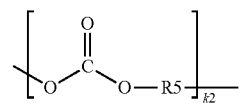

where R5 is one of a divalent hydrocarbon group, a divalent oxygen-containing hydrocarbon group, a divalent halogenated hydrocarbon group, a divalent halogenated oxygen-containing hydrocarbon group, and a group obtained by binding two or more of the divalent hydrocarbon group, the divalent oxygen-containing hydrocarbon group, the divalent halogenated hydrocarbon group, and the divalent halogenated oxygen-containing hydrocarbon group; and k2 satisfies k2≥1.

3. The secondary battery according to claim 2, wherein the halogen group is any of a fluorine group, a chlorine group, a bromine group, and an iodine group,
the monovalent hydrocarbon group is any of an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and a cycloalkyl group with carbon number from 3 to 18 both inclusive, the monovalent oxygen-containing hydrocarbon group is an alkoxy group with carbon number from 1 to 12 both inclusive, the monovalent halogenated hydrocarbon group is a group obtained by substituting each of part or all of hydrogen groups out of the monovalent hydrocarbon group by the halogen group, the monovalent halogenated oxygen-containing hydrocarbon group is a group obtained by substituting each of part or all of hydrogen groups out of the monovalent oxygen-containing hydrocarbon group by the halogen group, the divalent hydrocarbon group is any of an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, and a cycloalkylene group with carbon number from 3 to 18 both inclusive, the divalent oxygen-containing hydrocarbon group is a group obtained by binding one or more divalent hydrocarbon groups to one or more oxygen bonds (—O—) in any order, the divalent halogenated hydrocarbon group is a group obtained by substituting each of part or all of hydrogen groups of the divalent hydrocarbon group by the halogen group, and, the divalent halogenated oxygen-containing hydrocarbon group is a group obtained by substituting each of part or all of hydrogen groups of the divalent oxygen-containing hydrocarbon group by the halogen group.

4. The secondary battery according to claim 2, wherein the compound shown in the Formula (1) is a compound represented by a Formula (3) as follows:

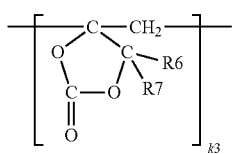

(3)

where each of R6 and R7 is one of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a group obtained by binding two or more of the hydrogen group, the halogen group, the monovalent hydrocarbon group, the monovalent halogenated hydrocarbon group, the monovalent oxygen-containing hydrocarbon group, and the monovalent halogenated oxygen-containing hydrocarbon group; R6 and R7 may be bound to each other; and k3 satisfies k3≥1.

5. The secondary battery according to claim 1, wherein the nonaqueous electrolytic solution includes an unsaturated cyclic compound represented by a following Formula (8), and the photoelectron spectrum of oxygen 1s associated with the first lithium-containing compound and the photoelectron spectrum of oxygen 1s associated with the second lithium-containing compound are obtained by the surface analysis of the cathode,

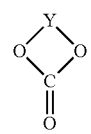

(8)

where Y is a divalent group in which p-number of >C=CR8R9 and q-number of >CR10R11 are bound in any order; each of R8 to R11 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group obtained by binding two or more of the hydrogen group, the halogen group, the monovalent hydrocarbon group, the monovalent oxygen-containing hydrocarbon group, the monovalent halogenated hydrocarbon group, and the monovalent halogenated oxygen-containing hydrocarbon group; any two or more of R8 to R11 may be bound to one another; and p and q satisfy p≥1 and q≥0.

6. The secondary battery according to claim 1, wherein the first lithium-containing compound includes one or more of compounds represented by a following Formula (4), and the second lithium-containing compound includes a compound represented by a following Formula (5), $$Li_aNi_{(1-b-c)}Mn_bM1_cO_{(2-d)}X_e \quad (4)$$

where M1 is one or more of elements, other than nickel (Ni) and manganese (Mn), belonging to Group 2 to Group 15 in long-period periodic table; X is one or more of elements, other than oxygen (O), belonging to Group 16 and Group 17 in the long-period periodic table; and a to e satisfy 0≤a≤1.5, 0≤b≤1, 0≤c≤1, −0.1≤d≤0.2, and 0≤e≤0.2, $$Li_aM2_bPO_4 \quad (5)$$

where M2 is one or more of elements belonging to Group 2 to Group 15 in the long-period periodic table; and a and b satisfy 0≤a≤2 and 0.5≤b≤2.

7. The secondary battery according to claim 6, wherein the M1 includes cobalt (Co).

8. The secondary battery according to claim 1, wherein the secondary battery is a lithium secondary battery.

9. An electrode comprising any one of a first lithium-containing compound and a second lithium-containing compound, wherein the first lithium-containing compound having a bedded salt-type crystal structure, the first lithium-containing compound includes one or more metal elements (M) other than lithium (Li), a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volts and a vertical axis representative of a spectrum intensity, the photoelectron spectrum of oxygen 1s obtained by surface analysis with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼;

wherein the electrode includes an electrode active material layer and a coat provided on the electrode active material layer;

wherein the photoelectron spectrum of oxygen 1s associated with the first lithium-containing compound and the photoelectron spectrum of oxygen 1s associated with the second lithium-containing compound are obtained by surface analysis of the coat;

wherein the coat includes a polymer compound;

wherein the polymer compound includes a repeating unit that includes oxygen; and wherein the polymer compound includes a carbonic acid bond (—O—C(=O)—O—) in the repeating unit.

10. A battery pack comprising:

a secondary battery;

a control section configured to control operation of the secondary battery; and a switch section configured to switch the operation of the secondary battery according to an instruction of the control section, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1 wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼;

wherein the cathode includes a cathode active material layer and a coat provided on the cathode active material layer;

wherein the photoelectron spectrum of oxygen 1s associated with the first lithium-containing compound and the photoelectron spectrum of oxygen 1s associated with the second lithium-containing compound are obtained by surface analysis of the coat;

wherein the coat includes a polymer compound;

wherein the polymer compound includes a repeating unit that includes oxygen; and wherein the polymer compound includes a carbonic acid bond (—O—C(=O)—O—) in the repeating unit.

11. An electric vehicle comprising:

a secondary battery;

a conversion section configured to convert electric power supplied from the secondary battery into drive power;

a drive section configured to operate according to the drive power; and a control section configured to control operation of the secondary battery, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼;

wherein the cathode includes a cathode active material layer and a coat provided on the cathode active material layer;

wherein the photoelectron spectrum of oxygen 1s associated with the first lithium-containing compound and the photoelectron spectrum of oxygen 1s associated with the second lithium-containing compound are obtained by surface analysis of the coat;

wherein the coat includes a polymer compound;

wherein the polymer compound includes a repeating unit that includes oxygen; and wherein the polymer compound includes a carbonic acid bond (—O—C(=O)—O—) in the repeating unit.

12. An electric power storage system comprising:
a secondary battery;
one or more electric devices configured to be supplied with electric power from the secondary battery; and
a control section configured to control the supplying of the electric power from the secondary battery to the one or more electric devices, wherein the secondary battery includes a cathode, an anode, and a nonaqueous electrolytic solution, and the cathode includes any one of a first lithium-containing compound and a second lithium-containing compound, the first lithium-containing compound having a bedded salt-type crystal structure, the first lithium-containing compound includes one or more metal elements (M) other than lithium, a photoelectron spectrum of oxygen 1s associated with the first lithium-containing compound and including a horizontal axis representative of binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak, when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure, a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and a ratio IE/ID between a spectrum intensity ID of the third peak and a spectrum intensity IE of the fourth peak is larger than ¼;

wherein the cathode includes a cathode active material layer and a coat provided on the cathode active material layer;

wherein the photoelectron spectrum of oxygen 1s associated with the first lithium-containing compound and the photoelectron spectrum of oxygen 1s associated with the second lithium-containing compound are obtained by surface analysis of the coat;

wherein the coat includes a polymer compound;

wherein the polymer compound includes a repeating unit that includes oxygen; and
wherein the polymer compound includes a carbonic acid bond (—O—C(=O)—O—) in the repeating unit.

13. An electric power tool comprising:
a secondary battery; and
a movable section configured to be supplied with electric power from the secondary battery, wherein
the secondary battery includes a cathode, an anode, and a nonaqueous electrolytic solution, and
the cathode includes any one of a first lithium-containing compound and a second lithium-containing compound,
the first lithium-containing compound having a bedded salt-type crystal structure,
the first lithium-containing compound includes one or more metal elements (M) other than lithium,
a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak,
when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and
when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, the second lithium-containing compound having an olivine-type crystal structure,
a photoelectron spectrum of oxygen 1s associated with second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and
a ratio IE/ID between a spectrum intensity ID of the third peak and a spectrum intensity IE of the fourth peak is larger than ¼;
wherein the cathode includes a cathode active material layer and a coat provided on the cathode active material layer;
wherein the photoelectron spectrum of oxygen 1s associated with the first lithium-containing compound and the photoelectron spectrum of oxygen 1s associated with the second lithium-containing compound are obtained by surface analysis of the coat;
wherein the coat includes a polymer compound;
wherein the polymer compound includes a repeating unit that includes oxygen; and
wherein the polymer compound includes a carbonic acid bond (—O—C(=O)—O—) in the repeating unit.

14. An electronic apparatus comprising a secondary battery as an electric power supply source, wherein
the secondary battery includes a cathode, an anode, and a nonaqueous electrolytic solution, and
the cathode includes any one of a first lithium-containing compound and a second lithium-containing compound
the first lithium-containing compound having a bedded salt-type crystal structure,
the first lithium-containing compound includes one or more metal elements (M) other than lithium,
a photoelectron spectrum of oxygen 1s associated with the first lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a first peak and a second peak, the first peak having an apex in a range in which binding energy is from 531 electron volts to 535 electron volts both inclusive, and the second peak having an apex in a range in which binding energy is equal to or larger than 529 electron volts and less than 531 electron volts and having spectrum intensity smaller than spectrum intensity of the first peak,
when an atomic ratio (Co/M) of cobalt in the metal element is equal to or larger than 0.5, a ratio IB/IA between a spectrum intensity IA of the second peak and a spectrum intensity IB in the case where binding energy is 535 electron volts is larger than 1, and
when the atomic ratio (Co/M) of cobalt in the metal element is less than 0.5, a ratio IC/IA between the spectrum intensity IA of the second peak and a spectrum intensity IC in the case where binding energy is 536 electron volts is larger than 1, wherein the second lithium-containing compound having an olivine-type crystal structure,
a photoelectron spectrum of oxygen 1s associated with the second lithium-containing compound and including a horizontal axis representative of a binding energy in electron volt and a vertical axis representative of a spectrum intensity, the photoelectron spectrum of oxygen 1s obtained by surface analysis of the cathode with the use of X-ray photoelectron spectroscopy includes a third peak and a fourth peak, the third peak having an apex in a range in which binding energy is equal to or larger than 530 electron volts and less than 533 electron volts, and the fourth peak having an apex in a range in which binding energy is from 533 electron volts to 536 electron volts both inclusive and having spectrum intensity smaller than spectrum intensity of the third peak, and
a ratio IE/ID between a spectrum intensity ID of the third peak and a spectrum intensity IE of the fourth peak is larger than ¼;
wherein the cathode includes a cathode active material layer and a coat provided on the cathode active material layer;
wherein the photoelectron spectrum of oxygen 1s associated with the first lithium-containing compound and the photoelectron spectrum of oxygen 1s associated with the second lithium-containing compound are obtained by surface analysis of the coat;

wherein the coat includes a polymer compound;

wherein the polymer compound includes a repeating unit that includes oxygen; and wherein the polymer compound includes a carbonic acid bond (—O—C(=O)—O—) in the repeating unit.

* * * * *